United States Patent
Li et al.

(10) Patent No.: US 12,534,532 B2
(45) Date of Patent: Jan. 27, 2026

(54) CLL1-TARGETING ANTIBODY AND APPLICATION THEREOF

(71) Applicant: CRAGE medical Co., Limited, Hong Kong (CN)

(72) Inventors: Zonghai Li, Shanghai (CN); Peng Wang, Shanghai (CN); Huamao Wang, Shanghai (CN)

(73) Assignee: CRAGE MEDICAL CO., LIMITED, Hong Kong (CN)

( * ) Notice: Subject to any disclaimer, the term of this patent is extended or adjusted under 35 U.S.C. 154(b) by 1312 days.

(21) Appl. No.: 17/288,189

(22) PCT Filed: Oct. 28, 2019

(86) PCT No.: PCT/CN2019/113767
§ 371 (c)(1),
(2) Date: Apr. 23, 2021

(87) PCT Pub. No.: WO2020/083406
PCT Pub. Date: Apr. 30, 2020

(65) Prior Publication Data
US 2021/0324087 A1 Oct. 21, 2021

(30) Foreign Application Priority Data
Oct. 26, 2018 (CN) .......................... 201811260687.7

(51) Int. Cl.
| | | |
|---|---|---|
| C07K 16/28 | (2006.01) | |
| A61K 39/00 | (2006.01) | |
| A61K 40/11 | (2025.01) | |
| A61K 40/31 | (2025.01) | |
| A61K 40/42 | (2025.01) | |
| A61K 47/68 | (2017.01) | |
| A61P 35/00 | (2006.01) | |
| C07K 14/705 | (2006.01) | |
| C07K 14/725 | (2006.01) | |
| C12N 5/0783 | (2010.01) | |

(52) U.S. Cl.
CPC .......... *C07K 16/2851* (2013.01); *A61K 40/11* (2025.01); *A61K 40/31* (2025.01); *A61K 40/4202* (2025.01); *A61K 47/6849* (2017.08); *A61P 35/00* (2018.01); *C07K 14/7051* (2013.01); *C07K 14/70517* (2013.01); *C07K 14/70521* (2013.01); *C12N 5/0636* (2013.01); *A61K 2039/505* (2013.01); *A61K 2239/48* (2023.05); *C07K 2317/21* (2013.01); *C07K 2317/565* (2013.01); *C07K 2317/622* (2013.01); *C07K 2317/73* (2013.01); *C07K 2317/92* (2013.01); *C07K 2319/02* (2013.01); *C07K 2319/03* (2013.01); *C07K 2319/33* (2013.01)

(58) Field of Classification Search
CPC ............ C07K 16/2851; C07K 14/7051; C07K 14/70517; C07K 14/70521; C07K 14/70578; C07K 2317/21; C07K 2317/565; C07K 2317/622; C07K 2317/73; C07K 2317/92; C07K 2319/02; C07K 2319/03; C07K 2319/30; C07K 2319/33; A61K 35/17; A61K 47/6849; A61K 2039/505; A61K 40/11; A61K 40/31; A61K 40/4202; A61K 2239/48; A61P 35/00; C12N 5/0636
See application file for complete search history.

(56) References Cited

U.S. PATENT DOCUMENTS

| | | | | |
|---|---|---|---|---|
| 7,329,737 | B2 * | 2/2008 | Sexton | ................... A61P 37/00 424/130.1 |
| 9,163,090 | B2 | 10/2015 | Jiang et al. | |
| 10,266,597 | B2 * | 4/2019 | Zheng | ................ A61K 47/6817 |
| 10,501,545 | B2 * | 12/2019 | Kelley | ............... C07K 16/2851 |
| 11,072,662 | B2 * | 7/2021 | Jiang | ...................... A61K 35/15 |
| 2010/0285037 | A1 * | 11/2010 | Abo | .................... C07K 16/3061 536/23.53 |
| 2018/0000914 | A1 | 1/2018 | Valton et al. | |
| 2021/0188954 | A1 * | 6/2021 | Lantz | ..................... A61K 47/22 |

FOREIGN PATENT DOCUMENTS

| | | | |
|---|---|---|---|
| CN | 104736562 A | 6/2015 | |
| CN | 107406516 A | 11/2017 | |
| WO | 2016040868 A1 | 3/2016 | |
| WO | WO-2017152102 A2 * | 9/2017 | ......... C07K 16/2803 |
| WO | WO-2020052542 A1 * | 3/2020 | ............. A61K 35/17 |

OTHER PUBLICATIONS

Blythe et al. 2005. Protein Science 14:246-248. (Year: 2005).*
Gershoni et al. 2007. Biodrugs 21(3): 145-156 (Year: 2007).*
Schroeder and Cavacini. 2010. Journal of Allergy and Clinical Immunology 125(2, Suppl.2): S41-S52. (Year: 2010).*
Sela-Culang et al. 2013. Frontiers in Immunology 4: 302 (Year: 2013).*
International Search Report mailed Feb. 11, 2020 corresponding to PCT/CN2019/113767 filed Oct. 28, 2019; 5 pages.
Zhao, Xiaoxian et al., "Targeting C-type lectin-like molecule-1 for antibody-mediated immunotherapy in acute myeloid leukemia," *Haematoligica* (Jan. 31, 2010); 95(1):71-77.

* cited by examiner

*Primary Examiner* — Julie Wu
*Assistant Examiner* — Elizabeth A Shupe

(57) ABSTRACT

Provided are a CLL1-targeting antibody and an application thereof. The CLL1-specific antibody has high affinity for CLL1, and after being prepared into a chimeric antigen receptor-modified T cells, has a significant killing effect on cells expressing CLL1.

20 Claims, 8 Drawing Sheets

Specification includes a Sequence Listing.

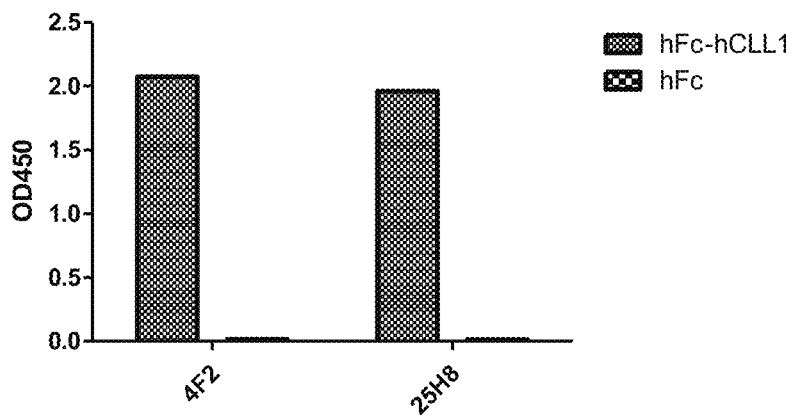
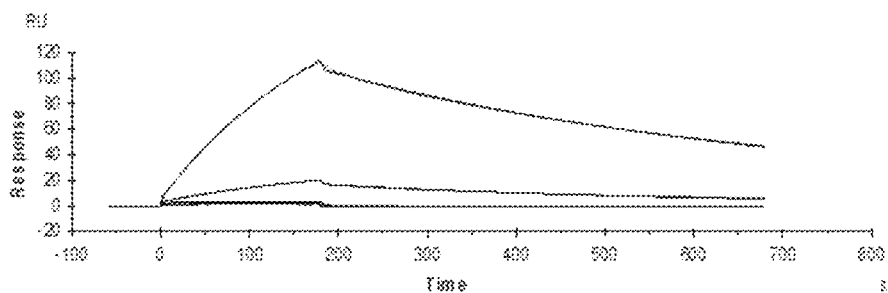
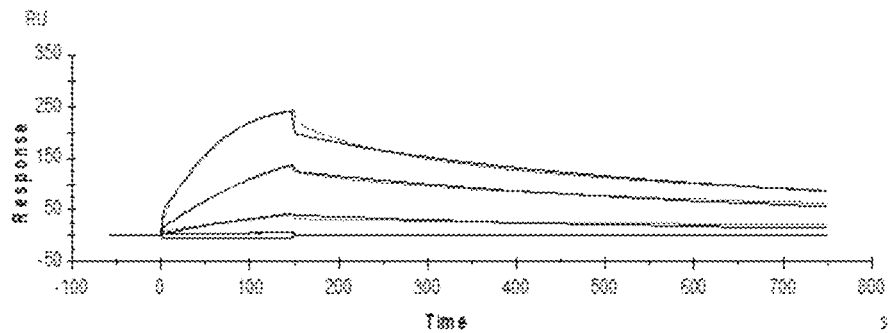
Fig. 2

SEQUENCE LISTING

<160> NUMBER OF SEQ ID NOS: 81

<210> SEQ ID NO 1
<211> LENGTH: 121
<212> TYPE: PRT
<213> ORGANISM: Artificial sequence
<220> FEATURE:
<223> OTHER INFORMATION: Synthesized polypeptide

<400> SEQUENCE: 1

```
Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Lys Glu Tyr Tyr Phe Gly Tyr Tyr Gly Tyr Leu Asp Tyr Trp Gly
            100                 105                 110

Gln Gly Thr Leu Val Thr Val Ser Ser
        115                 120
```

<210> SEQ ID NO 2
<211> LENGTH: 363
<212> TYPE: DNA
<213> ORGANISM: Artificial sequence
<220> FEATURE:
<223> OTHER INFORMATION: Synthesized polynucleotide

<400> SEQUENCE: 2

```
gaggtgcaat tgctggagtc tgggggaggc ttggtacagc ctgggggtc cctgagactc      60 tcctgtgcag cctccggatt cacctttagc agttatgcca tgagctgggt ccgccaggct    120
ccagggaagg ggctggagtg gtctcagct attagtggta gtggtggtag cacatactac    180
gcagactccg tgaagggccg gttcaccatc tccagagaca attccaagaa cacgctgtat    240
ctgcagatga acagcctgag agccgaggac acggccgtat attactgtgc gaaagaatac    300
tacttcggtt actacggtta cctggactac tggggccaag gaaccctggt caccgtctcg    360
agt                                                                   363
```

<210> SEQ ID NO 3
<211> LENGTH: 109
<212> TYPE: PRT
<213> ORGANISM: Artificial sequence
<220> FEATURE:
<223> OTHER INFORMATION: Synthesized polypeptide

<400> SEQUENCE: 3

```
Asp Ile Gln Met Thr Gln Ser Pro Ser Thr Leu Ser Ala Ser Val Gly
1               5                   10                  15

Asp Arg Val Thr Ile Thr Cys Arg Ala Ser Gln Ser Ile Ser Ser Trp
            20                  25                  30

Leu Ala Trp Tyr Gln Gln Lys Pro Gly Lys Ala Pro Lys Leu Leu Ile
        35                  40                  45
```

```
Tyr Asp Ala Ser Ser Leu Glu Ser Gly Val Pro Ser Arg Phe Ser Gly
        50                  55                  60

Ser Gly Ser Gly Thr Glu Phe Thr Leu Thr Ile Ser Ser Leu Gln Pro
65                  70                  75                  80

Asp Asp Phe Ala Thr Tyr Tyr Cys Gln Gln Tyr Ser Tyr Pro Met
                85                  90                  95

Ile Thr Phe Gly Gln Gly Thr Lys Val Glu Ile Lys Arg
            100                 105
```

<210> SEQ ID NO 4
<211> LENGTH: 327
<212> TYPE: DNA
<213> ORGANISM: Artificial sequence
<220> FEATURE:
<223> OTHER INFORMATION: Synthesized polynucleotide

<400> SEQUENCE: 4

```
gacatccaga tgacccagtc tccttccacc ctgtctgcat ctgtaggaga ccgtgtcacc      60
atcacttgcc gtgccagtca gagtattagt agctggttgg cctggtatca gcagaaacca     120
gggaaagccc ctaagctcct gatctatgat gcctccagtt tggaaagtgg ggtcccatca     180
cgtttcagcg gcagtggatc cgggacagaa ttcactctca ccatcagcag cttgcagcct     240
gatgattttg caacttatta ctgccaacag tactactctt acccaatgat cacgtttggc     300
cagggcacca agtcgagat caagcgt                                           327
```

<210> SEQ ID NO 5
<211> LENGTH: 118
<212> TYPE: PRT
<213> ORGANISM: Artificial sequence
<220> FEATURE:
<223> OTHER INFORMATION: Synthesized polypeptide

<400> SEQUENCE: 5

```
Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
                20                  25                  30

Tyr Met His Trp Val Arg Gln Ala Pro Gly Gln Gly Leu Glu Trp Met
            35                  40                  45

Gly Ile Phe Asn Pro Ser Gly Gly Ser Thr Ser Tyr Ala Gln Lys Phe
        50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
            100                 105                 110

Met Val Thr Val Ser Ser
        115
```

<210> SEQ ID NO 6
<211> LENGTH: 354
<212> TYPE: DNA
<213> ORGANISM: Artificial sequence
<220> FEATURE:
<223> OTHER INFORMATION: Synthesized polynucleotide

<400> SEQUENCE: 6

```
gaggtgcagc tggtgcagtc tggggctgag gtgaagaagc ctggggcctc agtgaaggtt      60
tcctgcaagg catctggata caccttcaac agctactata tgcactgggt gcgacaggcc     120
cctggacaag gcttgagtg gatgggaata ttcaacccta gtggtggtag cacaagctac      180
gcacagaagt tccagggcag agtcaccatg accaggaca cgtccacgag cacagtctac      240
atggagctga gcagcctgag atctgaggac acggccgtgt attactgtgc gagaggaact     300
acatccgatg cttttgatat ctggggccaa gggacaatgg tcaccgtctc gagt           354
```

<210> SEQ ID NO 7
<211> LENGTH: 108
<212> TYPE: PRT
<213> ORGANISM: Artificial sequence
<220> FEATURE:
<223> OTHER INFORMATION: Synthesized polypeptide

<400> SEQUENCE: 7

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Leu
                85                  90                  95

Thr Phe Gly Gly Gly Thr Lys Val Glu Ile Lys Arg
            100                 105

<210> SEQ ID NO 8
<211> LENGTH: 324
<212> TYPE: DNA
<213> ORGANISM: Artificial sequence
<220> FEATURE:
<223> OTHER INFORMATION: Synthesized polynucleotide

<400> SEQUENCE: 8

```
gacatccaga tgacccagtc tccatcctcc ctgtctgcat ctgtaggaga cagagtcacc      60
atcacttgcc gggcaagtca gagcattagc agctatttaa attggtatca gcagaaacca     120
gggaaagccc ctaagctcct gatctatgct gcatccagtt tgcaaagtgg ggtcccatca     180
aggttcagtg gcagtggatc tgggacagat ttcactctca ccatcagcag tctgcaacct     240
gaagattttg caacttacta ctgtcaacag agttacagta cccctctcac tttcggcgga     300
gggaccaagg tggagatcaa acgt                                            324
```

<210> SEQ ID NO 9
<211> LENGTH: 464
<212> TYPE: PRT
<213> ORGANISM: Artificial sequence
<220> FEATURE:
<223> OTHER INFORMATION: Synthesized polypeptide

<400> SEQUENCE: 9

| | | | | | | | | | | | | | | |
|---|---|---|---|---|---|---|---|---|---|---|---|---|---|---|
|Glu|Val|Gln|Leu|Val|Gln|Ser|Gly|Ala|Glu|Val|Lys|Lys|Pro|Gly|Ala|
|1| | | |5| | | | |10| | | | |15| |

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
        35                  40                  45

Gly Ile Phe Asn Pro Gly Gly Ser Thr Ser Tyr Ala Gln Lys Phe
50                      55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
                100                 105                 110

Leu Val Thr Val Ser Ser Gly Gly Gly Ser Gly Gly Gly Gly Ser
            115                 120                 125

Gly Gly Gly Gly Ser Asp Ile Gln Met Thr Gln Ser Pro Ser Ser Leu
130                     135                 140

Ser Ala Ser Val Gly Asp Arg Val Thr Ile Thr Cys Arg Ala Ser Gln
145                 150                 155                 160

Ser Ile Ser Ser Tyr Leu Asn Trp Tyr Gln Gln Lys Pro Gly Lys Ala
                165                 170                 175

Pro Lys Leu Leu Ile Asp Val Ala Ser Ser Leu Gln Ser Gly Val Pro
            180                 185                 190

Ser Arg Phe Ser Gly Ser Gly Ser Gly Thr Asp Phe Thr Leu Thr Ile
            195                 200                 205

Ser Ser Leu Gln Pro Glu Asp Phe Ala Thr Tyr Tyr Cys Gln Gln Ser
210                 215                 220

Tyr Ser Thr Pro Leu Thr Phe Gly Gly Gly Thr Lys Val Glu Ile Lys
225                 230                 235                 240

Arg Thr Thr Thr Pro Ala Pro Arg Pro Pro Thr Pro Ala Pro Thr Ile
            245                 250                 255

Ala Ser Gln Pro Leu Ser Leu Arg Pro Glu Ala Cys Arg Pro Ala Ala
            260                 265                 270

Gly Gly Ala Val His Thr Arg Gly Leu Asp Phe Ala Cys Asp Ile Tyr
            275                 280                 285

Ile Trp Ala Pro Leu Ala Gly Thr Cys Gly Val Leu Leu Leu Ser Leu
290                 295                 300

Val Ile Thr Leu Tyr Cys Lys Arg Gly Arg Lys Leu Leu Tyr Ile
305                 310                 315                 320

Phe Lys Gln Pro Phe Met Arg Pro Val Gln Thr Thr Gln Glu Glu Asp
            325                 330                 335

Gly Cys Ser Cys Arg Phe Pro Glu Glu Glu Glu Gly Gly Cys Glu Leu
            340                 345                 350

Arg Val Lys Phe Ser Arg Ser Ala Asp Ala Pro Ala Tyr Lys Gln Gly
            355                 360                 365

Gln Asn Gln Leu Tyr Asn Glu Leu Asn Leu Gly Arg Arg Glu Glu Tyr
            370                 375                 380

Asp Val Leu Asp Lys Arg Arg Gly Arg Asp Pro Glu Met Gly Gly Lys
385                 390                 395                 400

```
Pro Arg Arg Lys Asn Pro Gln Glu Gly Leu Tyr Asn Glu Leu Gln Lys
            405                 410                 415

Asp Lys Met Ala Glu Ala Tyr Ser Glu Ile Gly Met Lys Gly Glu Arg
            420                 425                 430

Arg Arg Gly Lys Gly His Asp Gly Leu Tyr Gln Gly Leu Ser Thr Ala
            435                 440                 445

Thr Lys Asp Thr Tyr Asp Ala Leu His Met Gln Ala Leu Pro Pro Arg
450                 455                 460

<210> SEQ ID NO 10
<211> LENGTH: 509
<212> TYPE: PRT
<213> ORGANISM: Artificial sequence
<220> FEATURE:
<223> OTHER INFORMATION: Synthesized polypeptide

<400> SEQUENCE: 10

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
        35                  40                  45

Gly Ile Phe Asn Pro Gly Gly Ser Thr Ser Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
            100                 105                 110

Leu Val Thr Val Ser Ser Gly Gly Gly Ser Gly Gly Gly Gly Ser
        115                 120                 125

Gly Gly Gly Gly Ser Asp Ile Gln Met Thr Gln Ser Pro Ser Ser Leu
    130                 135                 140

Ser Ala Ser Val Gly Asp Arg Val Thr Ile Thr Cys Arg Ala Ser Gln
145                 150                 155                 160

Ser Ile Ser Ser Tyr Leu Asn Trp Tyr Gln Gln Lys Pro Gly Lys Ala
                165                 170                 175

Pro Lys Leu Leu Ile Asp Val Ala Ser Ser Leu Gln Ser Gly Val Pro
            180                 185                 190

Ser Arg Phe Ser Gly Ser Gly Ser Gly Thr Asp Phe Thr Leu Thr Ile
        195                 200                 205

Ser Ser Leu Gln Pro Glu Asp Phe Ala Thr Tyr Tyr Cys Gln Gln Ser
    210                 215                 220

Tyr Ser Thr Pro Leu Thr Phe Gly Gly Gly Thr Lys Val Glu Ile Lys
225                 230                 235                 240

Arg Thr Thr Thr Pro Ala Pro Arg Pro Pro Thr Pro Ala Pro Thr Ile
                245                 250                 255

Ala Ser Gln Pro Leu Ser Leu Arg Pro Glu Ala Cys Arg Pro Ala Ala
            260                 265                 270

Gly Gly Ala Val His Thr Arg Gly Leu Asp Phe Ala Cys Asp Phe Trp
        275                 280                 285

Val Leu Val Val Val Gly Gly Val Leu Ala Cys Tyr Ser Leu Leu Val
    290                 295                 300
```

-continued

Thr Val Ala Phe Ile Ile Phe Trp Val Arg Ser Lys Arg Ser Arg Leu
305                 310                 315                 320

Leu His Ser Asp Tyr Met Asn Met Thr Pro Arg Arg Pro Gly Pro Thr
                325                 330                 335

Arg Lys His Tyr Gln Pro Tyr Ala Pro Pro Arg Asp Phe Ala Ala Tyr
            340                 345                 350

Arg Ser Lys Arg Gly Arg Lys Lys Leu Leu Tyr Ile Phe Lys Gln Pro
        355                 360                 365

Phe Met Arg Pro Val Gln Thr Thr Gln Glu Glu Asp Gly Cys Ser Cys
370                 375                 380

Arg Phe Pro Glu Glu Glu Glu Gly Gly Cys Glu Leu Arg Val Lys Phe
385                 390                 395                 400

Ser Arg Ser Ala Asp Ala Pro Ala Tyr Gln Gln Gly Gln Asn Gln Leu
                405                 410                 415

Tyr Asn Glu Leu Asn Leu Gly Arg Arg Glu Glu Tyr Asp Val Leu Asp
            420                 425                 430

Lys Arg Arg Gly Arg Asp Pro Glu Met Gly Gly Lys Pro Gln Arg Arg
        435                 440                 445

Lys Asn Pro Gln Glu Gly Leu Tyr Asn Glu Leu Gln Lys Asp Lys Met
450                 455                 460

Ala Glu Ala Tyr Ser Glu Ile Gly Met Lys Gly Glu Arg Arg Arg Gly
465                 470                 475                 480

Lys Gly His Asp Gly Leu Tyr Gln Gly Leu Ser Thr Ala Thr Lys Asp
                485                 490                 495

Thr Tyr Asp Ala Leu His Met Gln Ala Leu Pro Pro Arg
            500                 505

<210> SEQ ID NO 11
<211> LENGTH: 109
<212> TYPE: PRT
<213> ORGANISM: Artificial sequence
<220> FEATURE:
<223> OTHER INFORMATION: Synthesized polypeptide

<400> SEQUENCE: 11

Asp Ile Gln Met Thr Gln Ser Pro Ser Thr Leu Ser Ala Ser Val Gly
1               5                   10                  15

Asp Arg Val Thr Ile Thr Cys Arg Ala Ser Gln Trp Ile Ala Arg Trp
            20                  25                  30

Leu Ala Trp Tyr Gln Gln Lys Pro Gly Lys Ala Pro Lys Leu Leu Ile
        35                  40                  45

Lys Asp Ala Ser Asn Leu Glu Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Asp Asp Phe Ala Thr Tyr Tyr Cys Gln Gln Tyr Tyr Ser Tyr Pro Met
                85                  90                  95

Ile Thr Phe Gly Gln Gly Thr Lys Val Glu Ile Lys Arg
            100                 105

<210> SEQ ID NO 12
<211> LENGTH: 327
<212> TYPE: DNA
<213> ORGANISM: Artificial sequence
<220> FEATURE:
<223> OTHER INFORMATION: Synthesized polynucleotide

<400> SEQUENCE: 12

```
gacatccaga tgacccagtc tccttccacc ctgtctgcat ctgtaggaga ccgtgtcacc    60
atcacttgcc gtgccagtca gtggattgct cgatggttgg cctggtatca gcagaaacca   120
gggaaagccc ctaagctcct gatcaaggac gcttccaatt tggaaagtgg ggtcccatca   180
cgtttcagcg gcagtggatc cgggacagaa ttcactctca ccatcagcag cttgcagcct   240
gatgattttg caacttatta ctgccaacag tactactctt acccaatgat cacgtttggc   300
cagggcacca aagtcgagat caagcgt                                       327
```

<210> SEQ ID NO 13
<211> LENGTH: 118
<212> TYPE: PRT
<213> ORGANISM: Artificial sequence
<220> FEATURE:
<223> OTHER INFORMATION: Synthesized polypeptide

<400> SEQUENCE: 13

```
Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
        35                  40                  45

Gly Ile Phe Asn Pro Gly Gly Gly Ser Thr Ser Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
            100                 105                 110

Met Val Thr Val Ser Ser
        115
```

<210> SEQ ID NO 14
<211> LENGTH: 354
<212> TYPE: DNA
<213> ORGANISM: Artificial sequence
<220> FEATURE:
<223> OTHER INFORMATION: Synthesized polynucleotide

<400> SEQUENCE: 14

```
gaggtgcagc tggtgcagtc tggggctgag gtgaagaagc tggggcctc agtgaaggtt    60 tcctgcaagg catctggata caccttcaac agctactata tgcactgggt gcgacaggcc   120
cctggacaag gcttgagtg gatgggaata ttcaaccctg gtggtggtag cacaagctac   180
gcacagaagt tccagggcag agtcaccatg accaggaca cgtccacgag cacagtctac   240
atggagctga gcagcctgag atctgaggac acggccgtgt attactgtgc gagaggaact   300
acatccgatg cttttgatat ctggggccaa gggacaatgg tcaccgtctc gagt         354
```

<210> SEQ ID NO 15
<211> LENGTH: 108
<212> TYPE: PRT
<213> ORGANISM: Artificial sequence
<220> FEATURE:
<223> OTHER INFORMATION: Synthesized polypeptide

<400> SEQUENCE: 15

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Asp Val Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65              70                  75                  80

Glu Asp Phe Ala Thr Tyr Tyr Cys Gln Gln Ser Tyr Ser Thr Pro Leu
                85                  90                  95

Thr Phe Gly Gly Gly Thr Lys Val Glu Ile Lys Arg
            100                 105

<210> SEQ ID NO 16
<211> LENGTH: 324
<212> TYPE: DNA
<213> ORGANISM: Artificial sequence
<220> FEATURE:
<223> OTHER INFORMATION: Synthesized polynucleotide

<400> SEQUENCE: 16
gacatccaga tgacccagtc tccatcctcc ctgtctgcat ctgtaggaga cagagtcacc      60
atcacttgcc gggcaagtca gagcattagc agctatttaa attggtatca gcagaaacca    120
gggaaagccc ctaagctcct gatcgatgtc gcatccagtt tgcaaagtgg ggtcccatca    180
aggttcagtg gcagtggatc tgggacagat ttcactctca ccatcagcag tctgcaacct    240
gaagattttg caacttacta ctgtcaacag agttacagta cccctctcac tttcggcgga    300
gggaccaagg tggagatcaa acgt                                           324

<210> SEQ ID NO 17
<211> LENGTH: 21
<212> TYPE: PRT
<213> ORGANISM: Artificial sequence
<220> FEATURE:
<223> OTHER INFORMATION: Synthesized polypeptide

<400> SEQUENCE: 17

Met Ala Leu Pro Val Thr Ala Leu Leu Leu Pro Leu Ala Leu Leu Leu
1               5                   10                  15

His Ala Ala Arg Pro
            20

<210> SEQ ID NO 18
<211> LENGTH: 63
<212> TYPE: DNA
<213> ORGANISM: Artificial sequence
<220> FEATURE:
<223> OTHER INFORMATION: Synthesized polynucleotide

<400> SEQUENCE: 18
atggccttac cagtgaccgc cttgctcctg ccgctggcct tgctgctcca cgccgccagg      60
ccg                                                                    63

<210> SEQ ID NO 19
<211> LENGTH: 45

```
<212> TYPE: PRT
<213> ORGANISM: Artificial sequence
<220> FEATURE:
<223> OTHER INFORMATION: Synthesized polypeptide

<400> SEQUENCE: 19

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
                20                  25                  30

Gly Ala Val His Thr Arg Gly Leu Asp Phe Ala Cys Asp
                35                  40                  45

<210> SEQ ID NO 20
<211> LENGTH: 135
<212> TYPE: DNA
<213> ORGANISM: Artificial sequence
<220> FEATURE:
<223> OTHER INFORMATION: Synthesized polynucleotide

<400> SEQUENCE: 20
accacgacgc cagcgccgcg accaccaaca ccggcgccca ccatcgcgtc gcagcccctg    60
tccctgcgcc cagaggcgtg ccggccagcg gcggggggcg cagtgcacac gagggggctg   120
gacttcgcct gtgat                                                    135

<210> SEQ ID NO 21
<211> LENGTH: 21
<212> TYPE: PRT
<213> ORGANISM: Artificial sequence
<220> FEATURE:
<223> OTHER INFORMATION: Synthesized polypeptide

<400> SEQUENCE: 21

Ile Tyr Ile Trp Ala Pro Leu Ala Gly Thr Cys Gly Val Leu Leu Leu
1               5                   10                  15

Ser Leu Val Ile Thr
                20

<210> SEQ ID NO 22
<211> LENGTH: 63
<212> TYPE: DNA
<213> ORGANISM: Artificial sequence
<220> FEATURE:
<223> OTHER INFORMATION: Synthesized polynucleotide

<400> SEQUENCE: 22
atctacatct gggcgcccct ggccgggact tgtggggtcc ttctcctgtc actggttatc    60
acc                                                                 63

<210> SEQ ID NO 23
<211> LENGTH: 42
<212> TYPE: PRT
<213> ORGANISM: Artificial sequence
<220> FEATURE:
<223> OTHER INFORMATION: Synthesized polypeptide

<400> SEQUENCE: 23

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
                20                  25                  30
```

Pro Glu Glu Glu Glu Gly Gly Cys Glu Leu
          35                  40

<210> SEQ ID NO 24
<211> LENGTH: 126
<212> TYPE: DNA
<213> ORGANISM: Artificial sequence
<220> FEATURE:
<223> OTHER INFORMATION: Synthesized polynucleotide

<400> SEQUENCE: 24
aaacggggca gaaagaaact cctgtatata ttcaaacaac catttatgag accagtacaa    60
actactcaag aggaagatgg ctgtagctgc cgatttccag aagaagaaga aggaggatgt   120
gaactg                                                             126

<210> SEQ ID NO 25
<211> LENGTH: 113
<212> TYPE: PRT
<213> ORGANISM: Artificial sequence
<220> FEATURE:
<223> OTHER INFORMATION: Synthesized polypeptide

<400> SEQUENCE: 25

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Gln Arg Arg Lys Asn Pro Gln Glu Gly Leu Tyr Asn Glu Leu Gln
    50                  55                  60

Lys Asp Lys Met Ala Glu Ala Tyr Ser Glu Ile Gly Met Lys Gly Glu
65                  70                  75                  80

Arg Arg Arg Gly Lys Gly His Asp Gly Leu Tyr Gln Gly Leu Ser Thr
                85                  90                  95

Ala Thr Lys Asp Thr Tyr Asp Ala Leu His Met Gln Ala Leu Pro Pro
            100                 105                 110

Arg

<210> SEQ ID NO 26
<211> LENGTH: 339
<212> TYPE: DNA
<213> ORGANISM: Artificial sequence
<220> FEATURE:
<223> OTHER INFORMATION: Synthesized polynucleotide

<400> SEQUENCE: 26
agagtgaagt tcagcaggag cgcagacgcc ccgcgtacc agcagggcca gaaccagctc    60
tataacgagc tcaatctagg acgaagagag gagtacgatg ttttggacaa gagacgtggc   120
cgggaccctg agatgggggg aaagccgcag agaaggaaga accctcagga aggcctgtac   180
aatgaactgc agaaagataa gatggcggag gcctacagtg agattgggat gaaaggcgag   240
cgccggaggg gcaaggggca cgatggcctt taccagggtc tcagtacagc caccaaggac   300
acctacgacg cccttcacat gcaggccctg cccctcgc                          339

<210> SEQ ID NO 27
<211> LENGTH: 245
<212> TYPE: PRT

<213> ORGANISM: Artificial sequence
<220> FEATURE:
<223> OTHER INFORMATION: Synthesized polypeptide

<400> SEQUENCE: 27

```
Glu Val Gln Leu Leu Glu Ser Gly Gly Gly Leu Val Gln Pro Gly Gly
1               5                   10                  15
Ser Leu Arg Leu Ser Cys Ala Ala Ser Gly Phe Thr Phe Ser Ser Tyr
            20                  25                  30
Ala Met Ser Trp Val Arg Gln Ala Pro Gly Lys Gly Leu Glu Trp Val
        35                  40                  45
Ser Ala Ile Ser Gly Ser Gly Gly Ser Thr Tyr Tyr Ala Asp Ser Val
    50                  55                  60
Lys Gly Arg Phe Thr Ile Ser Arg Asp Asn Ser Lys Asn Thr Leu Tyr
65                  70                  75                  80
Leu Gln Met Asn Ser Leu Arg Ala Glu Asp Thr Ala Val Tyr Tyr Cys
                85                  90                  95
Ala Lys Glu Tyr Tyr Phe Gly Tyr Tyr Gly Tyr Leu Asp Tyr Trp Gly
            100                 105                 110
Gln Gly Thr Leu Val Thr Val Ser Ser Gly Gly Gly Ser Gly Gly
        115                 120                 125
Gly Gly Ser Gly Gly Gly Ser Asp Ile Gln Met Thr Gln Ser Pro
    130                 135                 140
Ser Thr Leu Ser Ala Ser Val Gly Asp Arg Val Thr Ile Thr Cys Arg
145                 150                 155                 160
Ala Ser Gln Ser Ile Ser Ser Trp Leu Ala Trp Tyr Gln Gln Lys Pro
                165                 170                 175
Gly Lys Ala Pro Lys Leu Leu Ile Tyr Asp Ala Ser Ser Leu Glu Ser
            180                 185                 190
Gly Val Pro Ser Arg Phe Ser Gly Ser Gly Ser Gly Thr Glu Phe Thr
        195                 200                 205
Leu Thr Ile Ser Ser Leu Gln Pro Asp Asp Phe Ala Thr Tyr Tyr Cys
    210                 215                 220
Gln Gln Tyr Tyr Ser Tyr Pro Met Ile Thr Phe Gly Gln Gly Thr Lys
225                 230                 235                 240
Val Glu Ile Lys Arg
                245
```

<210> SEQ ID NO 28
<211> LENGTH: 735
<212> TYPE: DNA
<213> ORGANISM: Artificial sequence
<220> FEATURE:
<223> OTHER INFORMATION: Synthesized polynucleotide

<400> SEQUENCE: 28

```
gaggtgcaat tgctggagtc tgggggaggc ttggtacagc ctggggggtc cctgagactc      60
tcctgtgcag cctccggatt cacctttagc agttatgcca tgagctgggt ccgccaggct     120
ccagggaagg gctggagtg gtctcagct attagtggta gtggtggtag cacatactac       180
gcagactccg tgaagggccg gttcaccatc tccagagaca attccaagaa cacgctgtat     240
ctgcagatga acagcctgag agccgaggac acggccgtat attactgtgc gaaagaatac     300
tacttcggtt actacggtta cctggactac tggggccaag gaaccctggt caccgtctcg     360
agtggtggag gcggttcagg cggaggtggt tctggcggtg cggatcgga catccagatg      420
acccagtctc cttccaccct gtctgcatct gtaggagacc gtgtcaccat cacttgccgt     480
```

```
gccagtcaga gtattagtag ctggttggcc tggtatcagc agaaaccagg gaaagcccct        540
aagctcctga tctatgatgc ctccagtttg gaaagtgggg tcccatcacg tttcagcggc        600
agtggatccg ggacagaatt cactctcacc atcagcagct gcagcctga tgattttgca         660 acttattact gccaacagta ctactcttac ccaatgatca cgtttggcca gggcaccaaa        720
gtcgagatca agcgt                                                         735
```

<210> SEQ ID NO 29
<211> LENGTH: 241
<212> TYPE: PRT
<213> ORGANISM: Artificial sequence
<220> FEATURE:
<223> OTHER INFORMATION: Synthesized polypeptide

<400> SEQUENCE: 29

```
Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
        35                  40                  45

Gly Ile Phe Asn Pro Ser Gly Gly Ser Thr Ser Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
            100                 105                 110

Met Val Thr Val Ser Ser Gly Gly Gly Gly Ser Gly Gly Gly Gly Ser
        115                 120                 125

Gly Gly Gly Gly Ser Asp Ile Gln Met Thr Gln Ser Pro Ser Ser Leu
    130                 135                 140

Ser Ala Ser Val Gly Asp Arg Val Thr Ile Thr Cys Arg Ala Ser Gln
145                 150                 155                 160

Ser Ile Ser Ser Tyr Leu Asn Trp Tyr Gln Gln Lys Pro Gly Lys Ala
                165                 170                 175

Pro Lys Leu Leu Ile Tyr Ala Ala Ser Ser Leu Gln Ser Gly Val Pro
            180                 185                 190

Ser Arg Phe Ser Gly Ser Gly Ser Gly Thr Asp Phe Thr Leu Thr Ile
        195                 200                 205

Ser Ser Leu Gln Pro Glu Asp Phe Ala Thr Tyr Tyr Cys Gln Gln Ser
    210                 215                 220

Tyr Ser Thr Pro Leu Thr Phe Gly Gly Gly Thr Lys Val Glu Ile Lys
225                 230                 235                 240

Arg
```

<210> SEQ ID NO 30
<211> LENGTH: 723
<212> TYPE: DNA
<213> ORGANISM: Artificial sequence
<220> FEATURE:
<223> OTHER INFORMATION: Synthesized polynucleotide

<400> SEQUENCE: 30

```
gaggtgcagc tggtgcagtc tggggctgag gtgaagaagc ctggggcctc agtgaaggtt      60
tcctgcaagg catctggata caccttcaac agctactata tgcactgggt gcgacaggcc     120
cctggacaag gcttgagtg gatgggaata ttcaaccctc gtggtggtag cacaagctac     180
gcacagaagt tccagggcag agtcaccatg accagggaca cgtccacgag cacagtctac     240
atggagctga gcagcctgag atctgaggac acggccgtgt attactgtgc gagaggaact     300
acatccgatg cttttgatat ctggggccaa gggacaatgg tcaccgtctc gagtggtgga     360
ggcggttcag gcggaggtgg ttctggcggt ggcggatcgg acatccagat gacccagtct     420
ccatcctccc tgtctgcatc tgtaggagac agagtcacca tcacttgccg ggcaagtcag     480
agcattagca gctatttaaa ttggtatcag cagaaaccag gaaagcccc taagctcctg     540
atctatgctg catccagttt gcaaagtggg gtcccatcaa ggttcagtgg cagtggatct     600
gggacagatt tcactctcac catcagcagt ctgcaacctg aagattttgc aacttactac     660
tgtcaacaga gttacagtac ccctctcact ttcggcggag ggaccaaggt ggagatcaaa     720
cgt                                                                   723
```

<210> SEQ ID NO 31
<211> LENGTH: 245
<212> TYPE: PRT
<213> ORGANISM: Artificial sequence
<220> FEATURE:
<223> OTHER INFORMATION: Synthesized polypeptide

<400> SEQUENCE: 31

```
Glu Val Gln Leu Leu Glu Ser Gly Gly Gly Leu Val Gln Pro Gly Gly
  1               5                  10                  15

Ser Leu Arg Leu Ser Cys Ala Ala Ser Gly Phe Thr Phe Ser Ser Tyr
             20                  25                  30

Ala Met Ser Trp Val Arg Gln Ala Pro Gly Lys Gly Leu Glu Trp Val
         35                  40                  45

Ser Ala Ile Ser Gly Ser Gly Gly Ser Thr Tyr Tyr Ala Asp Ser Val
     50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
             85                  90                  95

Ala Lys Glu Tyr Tyr Phe Gly Tyr Tyr Gly Tyr Leu Asp Tyr Trp Gly
            100                 105                 110

Gln Gly Thr Leu Val Thr Val Ser Ser Gly Gly Gly Ser Gly Gly
            115                 120                 125

Gly Gly Ser Gly Gly Gly Gly Ser Asp Ile Gln Met Thr Gln Ser Pro
        130                 135                 140

Ser Thr Leu Ser Ala Ser Val Gly Asp Arg Val Thr Ile Thr Cys Arg
145                 150                 155                 160

Ala Ser Gln Trp Ile Ala Arg Trp Leu Ala Trp Tyr Gln Gln Lys Pro
                165                 170                 175

Gly Lys Ala Pro Lys Leu Leu Ile Lys Asp Ala Ser Asn Leu Glu Ser
            180                 185                 190

Gly Val Pro Ser Arg Phe Ser Gly Ser Gly Ser Gly Thr Glu Phe Thr
        195                 200                 205
```

Leu Thr Ile Ser Ser Leu Gln Pro Asp Asp Phe Ala Thr Tyr Tyr Cys
            210                 215                 220

Gln Gln Tyr Tyr Ser Tyr Pro Met Ile Thr Phe Gly Gln Gly Thr Lys
225                 230                 235                 240

Val Glu Ile Lys Arg
            245

<210> SEQ ID NO 32
<211> LENGTH: 735
<212> TYPE: DNA
<213> ORGANISM: Artificial sequence
<220> FEATURE:
<223> OTHER INFORMATION: Synthesized polynucleotide

<400> SEQUENCE: 32
gaggtgcaat tgctggagtc tgggggaggc ttggtacagc ctgggggtc cctgagactc        60 tcctgtgcag cctccggatt cacctttagc agttatgcca tgagctgggt ccgccaggct      120
ccagggaagg ggctggagtg ggtctcagct attagtggta gtggtggtag cacatactac      180
gcagactccg tgaagggccg gttcaccatc tccagagaca attccaagaa cacgctgtat      240
ctgcagatga acagcctgag agccgaggac acggccgtat attactgtgc gaaagaatac      300
tacttcggtt actacggtta cctggactac tggggccaag gaaccctggt caccgtctcg      360
agtggtggag gcggttcagg cggaggtggt tctggcggtg gcggatcgga catccagatg      420
acccagtctc cttccaccct gtctgcatct gtaggagacc gtgtcaccat cacttgccgt      480
gccagtcagt ggattgctcg atggttggcc tggtatcagc agaaaccagg gaaagcccct      540
aagctcctga tcaaggacgc ttccaatttg gaaagtgggg tcccatcacg tttcagcggc      600
agtggatccg ggacagaatt cactctcacc atcagcagct gcagcctga tgattttgca       660 acttattact gccaacagta ctactcttac ccaatgatca cgtttggcca gggcaccaaa      720
gtcgagatca agcgt                                                       735

<210> SEQ ID NO 33
<211> LENGTH: 241
<212> TYPE: PRT
<213> ORGANISM: Artificial sequence
<220> FEATURE:
<223> OTHER INFORMATION: Synthesized polypeptide

<400> SEQUENCE: 33

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
        35                  40                  45

Gly Ile Phe Asn Pro Gly Gly Gly Ser Thr Ser Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
            100                 105                 110

Met Val Thr Val Ser Ser Gly Gly Gly Gly Ser Gly Gly Gly Gly Ser
        115                 120                 125

Gly Gly Gly Gly Ser Asp Ile Gln Met Thr Gln Ser Pro Ser Ser Leu
            130                 135                 140

Ser Ala Ser Val Gly Asp Arg Val Thr Ile Thr Cys Arg Ala Ser Gln
145                 150                 155                 160

Ser Ile Ser Ser Tyr Leu Asn Trp Tyr Gln Gln Lys Pro Gly Lys Ala
                165                 170                 175

Pro Lys Leu Leu Ile Asp Val Ala Ser Ser Leu Gln Ser Gly Val Pro
            180                 185                 190

Ser Arg Phe Ser Gly Ser Gly Ser Gly Thr Asp Phe Thr Leu Thr Ile
        195                 200                 205

Ser Ser Leu Gln Pro Glu Asp Phe Ala Thr Tyr Tyr Cys Gln Gln Ser
    210                 215                 220

Tyr Ser Thr Pro Leu Thr Phe Gly Gly Gly Thr Lys Val Glu Ile Lys
225                 230                 235                 240

Arg

<210> SEQ ID NO 34
<211> LENGTH: 723
<212> TYPE: DNA
<213> ORGANISM: Artificial sequence
<220> FEATURE:
<223> OTHER INFORMATION: Synthesized polynucleotide

<400> SEQUENCE: 34
gaggtgcagc tggtgcagtc tggggctgag gtgaagaagc ctggggcctc agtgaaggtt      60
tcctgcaagg catctggata caccttcaac agctactata tgcactgggt gcgacaggcc     120
cctggacaag gcttgagtg gatgggaata ttcaaccctg gtggtggtag cacaagctac     180
gcacagaagt tccagggcag agtcaccatg accaggaca cgtccacgag cacagtctac      240
atggagctga gcagcctgag atctgaggac acggccgtgt attactgtgc gagaggaact     300
acatccgatg cttttgatat ctggggccaa gggacaatgg tcaccgtctc gagtggtgga     360
ggcggttcag gcggaggtgg ttctggcggt ggcggatcgg acatccagat gacccagtct     420
ccatcctccc tgtctgcatc tgtaggagac agagtcacca tcacttgccg ggcaagtcag     480
agcattagca gctatttaaa ttggtatcag cagaaaccag ggaaagcccc taagctcctg     540
atcgatgtcg catccagttt gcaaagtggg gtcccatcaa ggttcagtgg cagtggatct     600
gggacagatt tcactctcac catcagcagt ctgcaacctg aagattttgc aacttactac     660
tgtcaacaga gttacagtac ccctctcact ttcggcggag ggaccaaggt ggagatcaaa     720
cgt                                                                    723

<210> SEQ ID NO 35
<211> LENGTH: 5
<212> TYPE: PRT
<213> ORGANISM: Artificial sequence
<220> FEATURE:
<223> OTHER INFORMATION: Synthesized polypeptide

<400> SEQUENCE: 35

Ser Tyr Ala Met Ser
1               5

<210> SEQ ID NO 36
<211> LENGTH: 5
<212> TYPE: PRT
<213> ORGANISM: Artificial sequence
<220> FEATURE:

<223> OTHER INFORMATION: Synthesized polypeptide

<400> SEQUENCE: 36

Ser Tyr Tyr Met His
1               5

<210> SEQ ID NO 37
<211> LENGTH: 17
<212> TYPE: PRT
<213> ORGANISM: Artificial sequence
<220> FEATURE:
<223> OTHER INFORMATION: Synthesized polypeptide

<400> SEQUENCE: 37

Ala Ile Ser Gly Ser Gly Gly Ser Thr Tyr Tyr Ala Asp Ser Val Lys
1               5                   10                  15

Gly

<210> SEQ ID NO 38
<211> LENGTH: 17
<212> TYPE: PRT
<213> ORGANISM: Artificial sequence
<220> FEATURE:
<223> OTHER INFORMATION: Synthesized polypeptide

<400> SEQUENCE: 38

Ile Phe Asn Pro Ser Gly Gly Ser Thr Ser Tyr Ala Gln Lys Phe Gln
1               5                   10                  15

Gly

<210> SEQ ID NO 39
<211> LENGTH: 17
<212> TYPE: PRT
<213> ORGANISM: Artificial sequence
<220> FEATURE:
<223> OTHER INFORMATION: Synthesized polypeptide

<400> SEQUENCE: 39

Ile Phe Asn Pro Gly Gly Gly Ser Thr Ser Tyr Ala Gln Lys Phe Gln
1               5                   10                  15

Gly

<210> SEQ ID NO 40
<211> LENGTH: 12
<212> TYPE: PRT
<213> ORGANISM: Artificial sequence
<220> FEATURE:
<223> OTHER INFORMATION: Synthesized polypeptide

<400> SEQUENCE: 40

Glu Tyr Tyr Phe Gly Tyr Tyr Gly Tyr Leu Asp Tyr
1               5                   10

<210> SEQ ID NO 41
<211> LENGTH: 9
<212> TYPE: PRT
<213> ORGANISM: Artificial sequence
<220> FEATURE:
<223> OTHER INFORMATION: Synthesized polypeptide

<400> SEQUENCE: 41

Gly Thr Thr Ser Asp Ala Phe Asp Ile
1               5

```
<210> SEQ ID NO 42
<211> LENGTH: 11
<212> TYPE: PRT
<213> ORGANISM: Artificial sequence
<220> FEATURE:
<223> OTHER INFORMATION: Synthesized polypeptide

<400> SEQUENCE: 42

Arg Ala Ser Gln Ser Ile Ser Ser Trp Leu Ala
1               5                   10

<210> SEQ ID NO 43
<211> LENGTH: 11
<212> TYPE: PRT
<213> ORGANISM: Artificial sequence
<220> FEATURE:
<223> OTHER INFORMATION: Synthesized polypeptide

<400> SEQUENCE: 43

Arg Ala Ser Gln Ser Ile Ser Ser Tyr Leu Asn
1               5                   10

<210> SEQ ID NO 44
<211> LENGTH: 11
<212> TYPE: PRT
<213> ORGANISM: Artificial sequence
<220> FEATURE:
<223> OTHER INFORMATION: Synthesized polypeptide

<400> SEQUENCE: 44

Arg Ala Ser Gln Trp Ile Ala Arg Trp Leu Ala
1               5                   10

<210> SEQ ID NO 45
<211> LENGTH: 7
<212> TYPE: PRT
<213> ORGANISM: Artificial sequence
<220> FEATURE:
<223> OTHER INFORMATION: Synthesized polypeptide

<400> SEQUENCE: 45

Asp Ala Ser Ser Leu Glu Ser
1               5

<210> SEQ ID NO 46
<211> LENGTH: 7
<212> TYPE: PRT
<213> ORGANISM: Artificial sequence
<220> FEATURE:
<223> OTHER INFORMATION: Synthesized polypeptide

<400> SEQUENCE: 46

Ala Ala Ser Ser Leu Gln Ser
1               5

<210> SEQ ID NO 47
<211> LENGTH: 7
<212> TYPE: PRT
<213> ORGANISM: Artificial sequence
<220> FEATURE:
<223> OTHER INFORMATION: Synthesized polypeptide

<400> SEQUENCE: 47

Asp Ala Ser Asn Leu Glu Ser
1               5

<210> SEQ ID NO 48
```

```
<211> LENGTH: 7
<212> TYPE: PRT
<213> ORGANISM: Artificial sequence
<220> FEATURE:
<223> OTHER INFORMATION: Synthesized polypeptide

<400> SEQUENCE: 48

Val Ala Ser Ser Leu Gln Ser
1               5

<210> SEQ ID NO 49
<211> LENGTH: 10
<212> TYPE: PRT
<213> ORGANISM: Artificial sequence
<220> FEATURE:
<223> OTHER INFORMATION: Synthesized polypeptide

<400> SEQUENCE: 49

Gln Gln Tyr Tyr Ser Tyr Pro Met Ile Thr
1               5                   10

<210> SEQ ID NO 50
<211> LENGTH: 9
<212> TYPE: PRT
<213> ORGANISM: Artificial sequence
<220> FEATURE:
<223> OTHER INFORMATION: Synthesized polypeptide

<400> SEQUENCE: 50

Gln Gln Ser Tyr Ser Thr Pro Leu Thr
1               5

<210> SEQ ID NO 51
<211> LENGTH: 27
<212> TYPE: PRT
<213> ORGANISM: Artificial sequence
<220> FEATURE:
<223> OTHER INFORMATION: Synthesized polypeptide

<400> SEQUENCE: 51

Phe Trp Val Leu Val Val Val Gly Gly Val Leu Ala Cys Tyr Ser Leu
1               5                   10                  15

Leu Val Thr Val Ala Phe Ile Ile Phe Trp Val
            20                  25

<210> SEQ ID NO 52
<211> LENGTH: 81
<212> TYPE: DNA
<213> ORGANISM: Artificial sequence
<220> FEATURE:
<223> OTHER INFORMATION: Synthesized polynucleotide

<400> SEQUENCE: 52
ttttgggtgc tggtggtggt tggtggagtc ctggcttgct atagcttgct agtaacagtg      60
gcctttatta ttttctgggt g                                               81

<210> SEQ ID NO 53
<211> LENGTH: 41
<212> TYPE: PRT
<213> ORGANISM: Artificial sequence
<220> FEATURE:
<223> OTHER INFORMATION: Synthesized polypeptide

<400> SEQUENCE: 53

Arg Ser Lys Arg Ser Arg Leu Leu His Ser Asp Tyr Met Asn Met Thr
1               5                   10                  15
```

Pro Arg Arg Pro Gly Pro Thr Arg Lys His Tyr Gln Pro Tyr Ala Pro
            20                  25                  30

Pro Arg Asp Phe Ala Ala Tyr Arg Ser
            35                  40

<210> SEQ ID NO 54
<211> LENGTH: 123
<212> TYPE: DNA
<213> ORGANISM: Artificial sequence
<220> FEATURE:
<223> OTHER INFORMATION: Synthesized polynucleotide

<400> SEQUENCE: 54
aggagtaaga ggagcaggct cctgcacagt gactacatga acatgactcc ccgccgcccc      60
gggccaaccc gcaagcatta ccagccctat gccccaccac gcgacttcgc agcctatcgc     120
tcc                                                                    123

<210> SEQ ID NO 55
<211> LENGTH: 471
<212> TYPE: PRT
<213> ORGANISM: Artificial sequence
<220> FEATURE:
<223> OTHER INFORMATION: Synthesized polypeptide

<400> SEQUENCE: 55

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Lys Glu Tyr Tyr Phe Gly Tyr Tyr Gly Tyr Leu Asp Tyr Trp Gly
            100                 105                 110

Gln Gly Thr Leu Val Thr Val Ser Ser Gly Gly Gly Ser Gly Gly
        115                 120                 125

Gly Gly Ser Gly Gly Gly Gly Ser Asp Ile Gln Met Thr Gln Ser Pro
    130                 135                 140

Ser Thr Leu Ser Ala Ser Val Gly Asp Arg Val Thr Ile Thr Cys Arg
145                 150                 155                 160

Ala Ser Gln Ser Ile Ser Ser Trp Leu Ala Trp Tyr Gln Gln Lys Pro
                165                 170                 175

Gly Lys Ala Pro Lys Leu Leu Ile Tyr Asp Ala Ser Ser Leu Glu Ser
            180                 185                 190

Gly Val Pro Ser Arg Phe Ser Gly Ser Gly Ser Gly Thr Glu Phe Thr
        195                 200                 205

Leu Thr Ile Ser Ser Leu Gln Pro Asp Asp Phe Ala Thr Tyr Tyr Cys
    210                 215                 220

Gln Gln Tyr Tyr Ser Tyr Pro Met Ile Thr Phe Gly Gln Gly Thr Lys
225                 230                 235                 240

Val Glu Ile Lys Arg Thr Thr Thr Pro Ala Pro Arg Pro Pro Thr Pro
            245                 250                 255

Ala Pro Thr Ile Ala Ser Gln Pro Leu Ser Leu Arg Pro Glu Ala Cys
            260                 265                 270

Arg Pro Ala Ala Gly Gly Ala Val His Thr Arg Gly Leu Asp Phe Ala
            275                 280                 285

Cys Asp Phe Trp Val Leu Val Val Gly Val Leu Ala Cys Tyr
290                 295                 300

Ser Leu Leu Val Thr Val Ala Phe Ile Ile Phe Trp Val Arg Ser Lys
305                 310                 315                 320

Arg Ser Arg Leu Leu His Ser Asp Tyr Met Asn Met Thr Pro Arg Arg
                325                 330                 335

Pro Gly Pro Thr Arg Lys His Tyr Gln Pro Tyr Ala Pro Pro Arg Asp
                340                 345                 350

Phe Ala Ala Tyr Arg Ser Arg Val Lys Phe Ser Arg Ser Ala Asp Ala
                355                 360                 365

Pro Ala Tyr Gln Gln Gly Gln Asn Gln Leu Tyr Asn Glu Leu Asn Leu
                370                 375                 380

Gly Arg Arg Glu Glu Tyr Asp Val Leu Asp Lys Arg Arg Gly Arg Asp
385                 390                 395                 400

Pro Glu Met Gly Gly Lys Pro Gln Arg Arg Lys Asn Pro Gln Glu Gly
                405                 410                 415

Leu Tyr Asn Glu Leu Gln Lys Asp Lys Met Ala Glu Ala Tyr Ser Glu
                420                 425                 430

Ile Gly Met Lys Gly Glu Arg Arg Arg Gly Lys Gly His Asp Gly Leu
                435                 440                 445

Tyr Gln Gly Leu Ser Thr Ala Thr Lys Asp Thr Tyr Asp Ala Leu His
                450                 455                 460

Met Gln Ala Leu Pro Pro Arg
465                 470

<210> SEQ ID NO 56
<211> LENGTH: 468
<212> TYPE: PRT
<213> ORGANISM: Artificial sequence
<220> FEATURE:
<223> OTHER INFORMATION: Synthesized polypeptide

<400> SEQUENCE: 56

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
                20                  25                  30

Ala Met Ser Trp Val Arg Gln Ala Pro Gly Lys Gly Leu Glu Trp Val
            35                  40                  45

Ser Ala Ile Ser Gly Ser Gly Gly Ser Thr Tyr Tyr Ala Asp Ser Val
        50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Lys Glu Tyr Tyr Phe Gly Tyr Tyr Gly Tyr Leu Asp Tyr Trp Gly
                100                 105                 110

Gln Gly Thr Leu Val Thr Val Ser Ser Gly Gly Gly Gly Ser Gly Gly
            115                 120                 125

Gly Gly Ser Gly Gly Gly Ser Asp Ile Gln Met Thr Gln Ser Pro
        130             135                 140

Ser Thr Leu Ser Ala Ser Val Gly Asp Arg Val Thr Ile Thr Cys Arg
145             150                 155                 160

Ala Ser Gln Ser Ile Ser Ser Trp Leu Ala Trp Tyr Gln Gln Lys Pro
                165                 170                 175

Gly Lys Ala Pro Lys Leu Leu Ile Tyr Asp Ala Ser Ser Leu Glu Ser
        180                 185                 190

Gly Val Pro Ser Arg Phe Ser Gly Ser Gly Ser Gly Thr Glu Phe Thr
    195                 200                 205

Leu Thr Ile Ser Ser Leu Gln Pro Asp Asp Phe Ala Thr Tyr Tyr Cys
210                 215                 220

Gln Gln Tyr Tyr Ser Tyr Pro Met Ile Thr Phe Gly Gln Gly Thr Lys
225                 230                 235                 240

Val Glu Ile Lys Arg Thr Thr Pro Ala Pro Arg Pro Pro Thr Pro
            245                 250                 255

Ala Pro Thr Ile Ala Ser Gln Pro Leu Ser Leu Arg Pro Glu Ala Cys
            260                 265                 270

Arg Pro Ala Ala Gly Gly Ala Val His Thr Arg Gly Leu Asp Phe Ala
        275                 280                 285

Cys Asp Ile Tyr Ile Trp Ala Pro Leu Ala Gly Thr Cys Gly Val Leu
290                 295                 300

Leu Leu Ser Leu Val Ile Thr Leu Tyr Cys Lys Arg Gly Arg Lys Lys
305                 310                 315                 320

Leu Leu Tyr Ile Phe Lys Gln Pro Phe Met Arg Pro Val Gln Thr Thr
                325                 330                 335

Gln Glu Glu Asp Gly Cys Ser Cys Arg Phe Pro Glu Glu Glu Glu Gly
            340                 345                 350

Gly Cys Glu Leu Arg Val Lys Phe Ser Arg Ser Ala Asp Ala Pro Ala
        355                 360                 365

Tyr Lys Gln Gly Gln Asn Gln Leu Tyr Asn Glu Leu Asn Leu Gly Arg
        370                 375                 380

Arg Glu Glu Tyr Asp Val Leu Asp Lys Arg Arg Gly Arg Asp Pro Glu
385                 390                 395                 400

Met Gly Gly Lys Pro Arg Arg Lys Asn Pro Gln Glu Gly Leu Tyr Asn
                405                 410                 415

Glu Leu Gln Lys Asp Lys Met Ala Glu Ala Tyr Ser Glu Ile Gly Met
            420                 425                 430

Lys Gly Glu Arg Arg Arg Gly Lys Gly His Asp Gly Leu Tyr Gln Gly
        435                 440                 445

Leu Ser Thr Ala Thr Lys Asp Thr Tyr Asp Ala Leu His Met Gln Ala
    450                 455                 460

Leu Pro Pro Arg
465

<210> SEQ ID NO 57
<211> LENGTH: 513
<212> TYPE: PRT
<213> ORGANISM: Artificial sequence
<220> FEATURE:
<223> OTHER INFORMATION: Synthesized polypeptide

<400> SEQUENCE: 57

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Lys Glu Tyr Tyr Phe Gly Tyr Tyr Gly Tyr Leu Asp Tyr Trp Gly
            100                 105                 110

Gln Gly Thr Leu Val Thr Val Ser Ser Gly Gly Gly Ser Gly Gly
        115                 120                 125

Gly Gly Ser Gly Gly Gly Ser Asp Ile Gln Met Thr Gln Ser Pro
130                 135                 140

Ser Thr Leu Ser Ala Ser Val Gly Asp Arg Val Thr Ile Thr Cys Arg
145                 150                 155                 160

Ala Ser Gln Ser Ile Ser Ser Trp Leu Ala Trp Tyr Gln Gln Lys Pro
            165                 170                 175

Gly Lys Ala Pro Lys Leu Leu Ile Tyr Asp Ala Ser Ser Leu Glu Ser
        180                 185                 190

Gly Val Pro Ser Arg Phe Ser Gly Ser Gly Ser Gly Thr Glu Phe Thr
    195                 200                 205

Leu Thr Ile Ser Ser Leu Gln Pro Asp Asp Phe Ala Thr Tyr Tyr Cys
    210                 215                 220

Gln Gln Tyr Tyr Ser Tyr Pro Met Ile Thr Phe Gly Gln Gly Thr Lys
225                 230                 235                 240

Val Glu Ile Lys Arg Thr Thr Thr Pro Ala Pro Arg Pro Pro Thr Pro
            245                 250                 255

Ala Pro Thr Ile Ala Ser Gln Pro Leu Ser Leu Arg Pro Glu Ala Cys
        260                 265                 270

Arg Pro Ala Ala Gly Gly Ala Val His Thr Arg Gly Leu Asp Phe Ala
    275                 280                 285

Cys Asp Phe Trp Val Leu Val Val Val Gly Gly Val Leu Ala Cys Tyr
290                 295                 300

Ser Leu Leu Val Thr Val Ala Phe Ile Ile Phe Trp Val Arg Ser Lys
305                 310                 315                 320

Arg Ser Arg Leu Leu His Ser Asp Tyr Met Asn Met Thr Pro Arg Arg
            325                 330                 335

Pro Gly Pro Thr Arg Lys His Tyr Gln Pro Tyr Ala Pro Pro Arg Asp
        340                 345                 350

Phe Ala Ala Tyr Arg Ser Lys Arg Gly Arg Lys Lys Leu Leu Tyr Ile
    355                 360                 365

Phe Lys Gln Pro Phe Met Arg Pro Val Gln Thr Thr Gln Glu Glu Asp
    370                 375                 380

Gly Cys Ser Cys Arg Phe Pro Glu Glu Glu Glu Gly Gly Cys Glu Leu
385                 390                 395                 400

Arg Val Lys Phe Ser Arg Ser Ala Asp Ala Pro Ala Tyr Gln Gln Gly
            405                 410                 415

Gln Asn Gln Leu Tyr Asn Glu Leu Asn Leu Gly Arg Arg Glu Glu Tyr
        420                 425                 430

Asp Val Leu Asp Lys Arg Gly Arg Asp Pro Glu Met Gly Gly Lys
            435                 440                 445

Pro Gln Arg Arg Lys Asn Pro Gln Glu Gly Leu Tyr Asn Glu Leu Gln
450                 455                 460

Lys Asp Lys Met Ala Glu Ala Tyr Ser Glu Ile Gly Met Lys Gly Glu
465                 470                 475                 480

Arg Arg Arg Gly Lys Gly His Asp Gly Leu Tyr Gln Gly Leu Ser Thr
                485                 490                 495

Ala Thr Lys Asp Thr Tyr Asp Ala Leu His Met Gln Ala Leu Pro Pro
            500                 505                 510

Arg

<210> SEQ ID NO 58
<211> LENGTH: 467
<212> TYPE: PRT
<213> ORGANISM: Artificial sequence
<220> FEATURE:
<223> OTHER INFORMATION: Synthesized polypeptide

<400> SEQUENCE: 58

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
        35                  40                  45

Gly Ile Phe Asn Pro Ser Gly Gly Ser Thr Ser Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
            100                 105                 110

Met Val Thr Val Ser Ser Gly Gly Gly Ser Gly Gly Gly Gly Ser
        115                 120                 125

Gly Gly Gly Gly Ser Asp Ile Gln Met Thr Gln Ser Pro Ser Ser Leu
    130                 135                 140

Ser Ala Ser Val Gly Asp Arg Val Thr Ile Thr Cys Arg Ala Ser Gln
145                 150                 155                 160

Ser Ile Ser Ser Tyr Leu Asn Trp Tyr Gln Gln Lys Pro Gly Lys Ala
                165                 170                 175

Pro Lys Leu Leu Ile Tyr Ala Ala Ser Ser Leu Gln Ser Gly Val Pro
            180                 185                 190

Ser Arg Phe Ser Gly Ser Gly Ser Gly Thr Asp Phe Thr Leu Thr Ile
        195                 200                 205

Ser Ser Leu Gln Pro Glu Asp Phe Ala Thr Tyr Tyr Cys Gln Gln Ser
    210                 215                 220

Tyr Ser Thr Pro Leu Thr Phe Gly Gly Gly Thr Lys Val Glu Ile Lys
225                 230                 235                 240

Arg Thr Thr Thr Pro Ala Pro Arg Pro Pro Thr Pro Ala Pro Thr Ile
                245                 250                 255

Ala Ser Gln Pro Leu Ser Leu Arg Pro Glu Ala Cys Arg Pro Ala Ala
            260                 265                 270

```
Gly Gly Ala Val His Thr Arg Gly Leu Asp Phe Ala Cys Asp Phe Trp
            275                 280                 285

Val Leu Val Val Val Gly Gly Val Leu Ala Cys Tyr Ser Leu Leu Val
            290                 295                 300

Thr Val Ala Phe Ile Ile Phe Trp Val Arg Ser Lys Arg Ser Arg Leu
305                 310                 315                 320

Leu His Ser Asp Tyr Met Asn Met Thr Pro Arg Arg Pro Gly Pro Thr
                325                 330                 335

Arg Lys His Tyr Gln Pro Tyr Ala Pro Pro Arg Asp Phe Ala Ala Tyr
            340                 345                 350

Arg Ser Arg Val Lys Phe Ser Arg Ser Ala Asp Ala Pro Ala Tyr Gln
            355                 360                 365

Gln Gly Gln Asn Gln Leu Tyr Asn Glu Leu Asn Leu Gly Arg Arg Glu
            370                 375                 380

Glu Tyr Asp Val Leu Asp Lys Arg Arg Gly Arg Asp Pro Glu Met Gly
385                 390                 395                 400

Gly Lys Pro Gln Arg Arg Lys Asn Pro Gln Glu Gly Leu Tyr Asn Glu
                405                 410                 415

Leu Gln Lys Asp Lys Met Ala Glu Ala Tyr Ser Glu Ile Gly Met Lys
            420                 425                 430

Gly Glu Arg Arg Arg Gly Lys Gly His Asp Gly Leu Tyr Gln Gly Leu
            435                 440                 445

Ser Thr Ala Thr Lys Asp Thr Tyr Asp Ala Leu His Met Gln Ala Leu
            450                 455                 460

Pro Pro Arg
465

<210> SEQ ID NO 59
<211> LENGTH: 464
<212> TYPE: PRT
<213> ORGANISM: Artificial sequence
<220> FEATURE:
<223> OTHER INFORMATION: Synthesized polypeptide

<400> SEQUENCE: 59

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
            35                  40                  45

Gly Ile Phe Asn Pro Ser Gly Gly Ser Thr Ser Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
            100                 105                 110

Met Val Thr Val Ser Ser Gly Gly Gly Gly Ser Gly Gly Gly Gly Ser
            115                 120                 125

Gly Gly Gly Gly Ser Asp Ile Gln Met Thr Gln Ser Pro Ser Ser Leu
        130                 135                 140

Ser Ala Ser Val Gly Asp Arg Val Thr Ile Thr Cys Arg Ala Ser Gln
145                 150                 155                 160
```

```
Ser Ile Ser Ser Tyr Leu Asn Trp Tyr Gln Gln Lys Pro Gly Lys Ala
            165                 170                 175

Pro Lys Leu Leu Ile Tyr Ala Ala Ser Ser Leu Gln Ser Gly Val Pro
        180                 185                 190

Ser Arg Phe Ser Gly Ser Gly Ser Gly Thr Asp Phe Thr Leu Thr Ile
    195                 200                 205

Ser Ser Leu Gln Pro Glu Asp Phe Ala Thr Tyr Tyr Cys Gln Gln Ser
210                 215                 220

Tyr Ser Thr Pro Leu Thr Phe Gly Gly Gly Thr Lys Val Glu Ile Lys
225                 230                 235                 240

Arg Thr Thr Thr Pro Ala Pro Arg Pro Pro Thr Pro Ala Pro Thr Ile
                245                 250                 255

Ala Ser Gln Pro Leu Ser Leu Arg Pro Glu Ala Cys Arg Pro Ala Ala
            260                 265                 270

Gly Gly Ala Val His Thr Arg Gly Leu Asp Phe Ala Cys Asp Ile Tyr
        275                 280                 285

Ile Trp Ala Pro Leu Ala Gly Thr Cys Gly Val Leu Leu Leu Ser Leu
    290                 295                 300

Val Ile Thr Leu Tyr Cys Lys Arg Gly Arg Lys Lys Leu Leu Tyr Ile
305                 310                 315                 320

Phe Lys Gln Pro Phe Met Arg Pro Val Gln Thr Thr Gln Glu Glu Asp
                325                 330                 335

Gly Cys Ser Cys Arg Phe Pro Glu Glu Glu Gly Gly Cys Glu Leu
            340                 345                 350

Arg Val Lys Phe Ser Arg Ser Ala Asp Ala Pro Ala Tyr Lys Gln Gly
        355                 360                 365

Gln Asn Gln Leu Tyr Asn Glu Leu Asn Leu Gly Arg Arg Glu Glu Tyr
    370                 375                 380

Asp Val Leu Asp Lys Arg Arg Gly Arg Asp Pro Glu Met Gly Gly Lys
385                 390                 395                 400

Pro Arg Arg Lys Asn Pro Gln Glu Gly Leu Tyr Asn Glu Leu Gln Lys
                405                 410                 415

Asp Lys Met Ala Glu Ala Tyr Ser Glu Ile Gly Met Lys Gly Glu Arg
            420                 425                 430

Arg Arg Gly Lys Gly His Asp Gly Leu Tyr Gln Gly Leu Ser Thr Ala
        435                 440                 445

Thr Lys Asp Thr Tyr Asp Ala Leu His Met Gln Ala Leu Pro Pro Arg
    450                 455                 460

<210> SEQ ID NO 60
<211> LENGTH: 509
<212> TYPE: PRT
<213> ORGANISM: Artificial sequence
<220> FEATURE:
<223> OTHER INFORMATION: Synthesized polypeptide

<400> SEQUENCE: 60

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
        35                  40                  45

Gly Ile Phe Asn Pro Ser Gly Gly Ser Thr Ser Tyr Ala Gln Lys Phe
    50                  55                  60
```

```
Gln Gly Arg Val Thr Met Thr Arg Asp Thr Ser Thr Ser Thr Val Tyr
 65                  70                  75                  80

Met Glu Leu Ser Ser Leu Arg Ser Glu Asp Thr Ala Val Tyr Tyr Cys
             85                  90                  95

Ala Arg Gly Thr Thr Ser Asp Ala Phe Asp Ile Trp Gly Gln Gly Thr
            100                 105                 110

Met Val Thr Val Ser Ser Gly Gly Gly Ser Gly Gly Gly Gly Ser
        115                 120                 125

Gly Gly Gly Gly Ser Asp Ile Gln Met Thr Gln Ser Pro Ser Ser Leu
130                 135                 140

Ser Ala Ser Val Gly Asp Arg Val Thr Ile Thr Cys Arg Ala Ser Gln
145                 150                 155                 160

Ser Ile Ser Ser Tyr Leu Asn Trp Tyr Gln Gln Lys Pro Gly Lys Ala
                165                 170                 175

Pro Lys Leu Leu Ile Tyr Ala Ala Ser Ser Leu Gln Ser Gly Val Pro
            180                 185                 190

Ser Arg Phe Ser Gly Ser Gly Ser Gly Thr Asp Phe Thr Leu Thr Ile
        195                 200                 205

Ser Ser Leu Gln Pro Glu Asp Phe Ala Thr Tyr Tyr Cys Gln Gln Ser
210                 215                 220

Tyr Ser Thr Pro Leu Thr Phe Gly Gly Gly Thr Lys Val Glu Ile Lys
225                 230                 235                 240

Arg Thr Thr Thr Pro Ala Pro Arg Pro Pro Thr Pro Ala Pro Thr Ile
                245                 250                 255

Ala Ser Gln Pro Leu Ser Leu Arg Pro Glu Ala Cys Arg Pro Ala Ala
            260                 265                 270

Gly Gly Ala Val His Thr Arg Gly Leu Asp Phe Ala Cys Asp Phe Trp
        275                 280                 285

Val Leu Val Val Val Gly Gly Val Leu Ala Cys Tyr Ser Leu Leu Val
290                 295                 300

Thr Val Ala Phe Ile Ile Phe Trp Val Arg Ser Lys Arg Ser Arg Leu
305                 310                 315                 320

Leu His Ser Asp Tyr Met Asn Met Thr Pro Arg Arg Pro Gly Pro Thr
                325                 330                 335

Arg Lys His Tyr Gln Pro Tyr Ala Pro Pro Arg Asp Phe Ala Ala Tyr
            340                 345                 350

Arg Ser Lys Arg Gly Arg Lys Lys Leu Leu Tyr Ile Phe Lys Gln Pro
        355                 360                 365

Phe Met Arg Pro Val Gln Thr Thr Gln Glu Glu Asp Gly Cys Ser Cys
370                 375                 380

Arg Phe Pro Glu Glu Glu Glu Gly Gly Cys Glu Leu Arg Val Lys Phe
385                 390                 395                 400

Ser Arg Ser Ala Asp Ala Pro Ala Tyr Gln Gln Gly Gln Asn Gln Leu
                405                 410                 415

Tyr Asn Glu Leu Asn Leu Gly Arg Arg Glu Glu Tyr Asp Val Leu Asp
            420                 425                 430

Lys Arg Arg Gly Arg Asp Pro Glu Met Gly Gly Lys Pro Gln Arg Arg
        435                 440                 445

Lys Asn Pro Gln Glu Gly Leu Tyr Asn Glu Leu Gln Lys Asp Lys Met
450                 455                 460

Ala Glu Ala Tyr Ser Glu Ile Gly Met Lys Gly Glu Arg Arg Arg Gly
465                 470                 475                 480
```

-continued

Lys Gly His Asp Gly Leu Tyr Gln Gly Leu Ser Thr Ala Thr Lys Asp
                    485                 490                 495

Thr Tyr Asp Ala Leu His Met Gln Ala Leu Pro Pro Arg
            500                 505

<210> SEQ ID NO 61
<211> LENGTH: 471
<212> TYPE: PRT
<213> ORGANISM: Artificial sequence
<220> FEATURE:
<223> OTHER INFORMATION: Synthesized polypeptide

<400> SEQUENCE: 61

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Lys Glu Tyr Tyr Phe Gly Tyr Tyr Gly Tyr Leu Asp Tyr Trp Gly
            100                 105                 110

Gln Gly Thr Leu Val Thr Val Ser Ser Gly Gly Gly Ser Gly Gly
        115                 120                 125

Gly Gly Ser Gly Gly Gly Ser Asp Ile Gln Met Thr Gln Ser Pro
    130                 135                 140

Ser Thr Leu Ser Ala Ser Val Gly Asp Arg Val Thr Ile Thr Cys Arg
145                 150                 155                 160

Ala Ser Gln Trp Ile Ala Arg Trp Leu Ala Trp Tyr Gln Gln Lys Pro
                165                 170                 175

Gly Lys Ala Pro Lys Leu Leu Ile Lys Asp Ala Ser Asn Leu Glu Ser
            180                 185                 190

Gly Val Pro Ser Arg Phe Ser Gly Ser Gly Ser Gly Thr Glu Phe Thr
        195                 200                 205

Leu Thr Ile Ser Ser Leu Gln Pro Asp Asp Phe Ala Thr Tyr Tyr Cys
    210                 215                 220

Gln Gln Tyr Tyr Ser Tyr Pro Met Ile Thr Phe Gly Gln Gly Thr Lys
225                 230                 235                 240

Val Glu Ile Lys Arg Thr Thr Thr Pro Ala Pro Arg Pro Pro Thr Pro
                245                 250                 255

Ala Pro Thr Ile Ala Ser Gln Pro Leu Ser Leu Arg Pro Glu Ala Cys
            260                 265                 270

Arg Pro Ala Ala Gly Gly Ala Val His Thr Arg Gly Leu Asp Phe Ala
        275                 280                 285

Cys Asp Phe Trp Val Leu Val Val Val Gly Gly Val Leu Ala Cys Tyr
    290                 295                 300

Ser Leu Leu Val Thr Val Ala Phe Ile Ile Phe Trp Val Arg Ser Lys
305                 310                 315                 320

Arg Ser Arg Leu Leu His Ser Asp Tyr Met Asn Met Thr Pro Arg Arg
                325                 330                 335

Pro Gly Pro Thr Arg Lys His Tyr Gln Pro Tyr Ala Pro Pro Arg Asp
              340                 345                 350

Phe Ala Ala Tyr Arg Ser Arg Val Lys Phe Ser Arg Ser Ala Asp Ala
          355                 360                 365

Pro Ala Tyr Gln Gln Gly Gln Asn Gln Leu Tyr Asn Glu Leu Asn Leu
      370                 375                 380

Gly Arg Arg Glu Glu Tyr Asp Val Leu Asp Lys Arg Arg Gly Arg Asp
385                 390                 395                 400

Pro Glu Met Gly Gly Lys Pro Gln Arg Arg Lys Asn Pro Gln Glu Gly
                405                 410                 415

Leu Tyr Asn Glu Leu Gln Lys Asp Lys Met Ala Glu Ala Tyr Ser Glu
              420                 425                 430

Ile Gly Met Lys Gly Glu Arg Arg Arg Gly Lys Gly His Asp Gly Leu
          435                 440                 445

Tyr Gln Gly Leu Ser Thr Ala Thr Lys Asp Thr Tyr Asp Ala Leu His
      450                 455                 460

Met Gln Ala Leu Pro Pro Arg
465                 470

<210> SEQ ID NO 62
<211> LENGTH: 468
<212> TYPE: PRT
<213> ORGANISM: Artificial sequence
<220> FEATURE:
<223> OTHER INFORMATION: Synthesized polypeptide

<400> SEQUENCE: 62

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
              20                  25                  30

Ala Met Ser Trp Val Arg Gln Ala Pro Gly Lys Gly Leu Glu Trp Val
          35                  40                  45

Ser Ala Ile Ser Gly Ser Gly Gly Ser Thr Tyr Tyr Ala Asp Ser Val
      50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
              85                  90                  95

Ala Lys Glu Tyr Tyr Phe Gly Tyr Tyr Gly Tyr Leu Asp Tyr Trp Gly
          100                 105                 110

Gln Gly Thr Leu Val Thr Val Ser Gly Gly Gly Ser Gly Gly
      115                 120                 125

Gly Gly Ser Gly Gly Gly Ser Asp Ile Gln Met Thr Gln Ser Pro
130                 135                 140

Ser Thr Leu Ser Ala Ser Val Gly Asp Arg Val Thr Ile Thr Cys Arg
145                 150                 155                 160

Ala Ser Gln Trp Ile Ala Arg Trp Leu Ala Trp Tyr Gln Gln Lys Pro
              165                 170                 175

Gly Lys Ala Pro Lys Leu Leu Ile Lys Asp Ala Ser Asn Leu Glu Ser
          180                 185                 190

Gly Val Pro Ser Arg Phe Ser Gly Ser Gly Ser Gly Thr Glu Phe Thr
      195                 200                 205

Leu Thr Ile Ser Ser Leu Gln Pro Asp Asp Phe Ala Thr Tyr Tyr Cys
      210                 215                 220

```
Gln Gln Tyr Tyr Ser Tyr Pro Met Ile Thr Phe Gly Gln Gly Thr Lys
225                 230                 235                 240

Val Glu Ile Lys Arg Thr Thr Thr Pro Ala Pro Arg Pro Pro Thr Pro
                245                 250                 255

Ala Pro Thr Ile Ala Ser Gln Pro Leu Ser Leu Arg Pro Glu Ala Cys
            260                 265                 270

Arg Pro Ala Ala Gly Gly Ala Val His Thr Arg Gly Leu Asp Phe Ala
        275                 280                 285

Cys Asp Ile Tyr Ile Trp Ala Pro Leu Ala Gly Thr Cys Gly Val Leu
    290                 295                 300

Leu Leu Ser Leu Val Ile Thr Leu Tyr Cys Lys Arg Gly Arg Lys Lys
305                 310                 315                 320

Leu Leu Tyr Ile Phe Lys Gln Pro Phe Met Arg Pro Val Gln Thr Thr
                325                 330                 335

Gln Glu Glu Asp Gly Cys Ser Cys Arg Phe Pro Glu Glu Glu Glu Gly
            340                 345                 350

Gly Cys Glu Leu Arg Val Lys Phe Ser Arg Ser Ala Asp Ala Pro Ala
        355                 360                 365

Tyr Lys Gln Gly Gln Asn Gln Leu Tyr Asn Glu Leu Asn Leu Gly Arg
    370                 375                 380

Arg Glu Glu Tyr Asp Val Leu Asp Lys Arg Arg Gly Arg Asp Pro Glu
385                 390                 395                 400

Met Gly Gly Lys Pro Arg Arg Lys Asn Pro Gln Glu Gly Leu Tyr Asn
                405                 410                 415

Glu Leu Gln Lys Asp Lys Met Ala Glu Ala Tyr Ser Glu Ile Gly Met
            420                 425                 430

Lys Gly Glu Arg Arg Arg Gly Lys Gly His Asp Gly Leu Tyr Gln Gly
        435                 440                 445

Leu Ser Thr Ala Thr Lys Asp Thr Tyr Asp Ala Leu His Met Gln Ala
    450                 455                 460

Leu Pro Pro Arg
465

<210> SEQ ID NO 63
<211> LENGTH: 513
<212> TYPE: PRT
<213> ORGANISM: Artificial sequence
<220> FEATURE:
<223> OTHER INFORMATION: Synthesized polypeptide

<400> SEQUENCE: 63

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
                20                  25                  30

Ala Met Ser Trp Val Arg Gln Ala Pro Gly Lys Gly Leu Glu Trp Val
            35                  40                  45

Ser Ala Ile Ser Gly Ser Gly Gly Ser Thr Tyr Tyr Ala Asp Ser Val
        50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Lys Glu Tyr Tyr Phe Gly Tyr Tyr Gly Tyr Leu Asp Tyr Trp Gly
            100                 105                 110
```

```
Gln Gly Thr Leu Val Thr Val Ser Ser Gly Gly Gly Ser Gly Gly
            115                 120                 125
Gly Gly Ser Gly Gly Gly Ser Asp Ile Gln Met Thr Gln Ser Pro
130                 135                 140
Ser Thr Leu Ser Ala Ser Val Gly Asp Arg Val Thr Ile Thr Cys Arg
145                 150                 155                 160
Ala Ser Gln Trp Ile Ala Arg Trp Leu Ala Trp Tyr Gln Gln Lys Pro
                165                 170                 175
Gly Lys Ala Pro Lys Leu Leu Ile Lys Asp Ala Ser Asn Leu Glu Ser
            180                 185                 190
Gly Val Pro Ser Arg Phe Ser Gly Ser Gly Ser Gly Thr Glu Phe Thr
            195                 200                 205
Leu Thr Ile Ser Ser Leu Gln Pro Asp Asp Phe Ala Thr Tyr Tyr Cys
210                 215                 220
Gln Gln Tyr Tyr Ser Tyr Pro Met Ile Thr Phe Gly Gln Gly Thr Lys
225                 230                 235                 240
Val Glu Ile Lys Arg Thr Thr Thr Pro Ala Pro Arg Pro Pro Thr Pro
                245                 250                 255
Ala Pro Thr Ile Ala Ser Gln Pro Leu Ser Leu Arg Pro Glu Ala Cys
            260                 265                 270
Arg Pro Ala Ala Gly Gly Ala Val His Thr Arg Gly Leu Asp Phe Ala
            275                 280                 285
Cys Asp Phe Trp Val Leu Val Val Gly Gly Val Leu Ala Cys Tyr
            290                 295                 300
Ser Leu Leu Val Thr Val Ala Phe Ile Ile Phe Trp Val Arg Ser Lys
305                 310                 315                 320
Arg Ser Arg Leu Leu His Ser Asp Tyr Met Asn Met Thr Pro Arg Arg
                325                 330                 335
Pro Gly Pro Thr Arg Lys His Tyr Gln Pro Tyr Ala Pro Pro Arg Asp
            340                 345                 350
Phe Ala Ala Tyr Arg Ser Lys Arg Gly Arg Lys Lys Leu Leu Tyr Ile
            355                 360                 365
Phe Lys Gln Pro Phe Met Arg Pro Val Gln Thr Thr Gln Glu Glu Asp
370                 375                 380
Gly Cys Ser Cys Arg Phe Pro Glu Glu Glu Gly Gly Cys Glu Leu
385                 390                 395                 400
Arg Val Lys Phe Ser Arg Ser Ala Asp Ala Pro Ala Tyr Gln Gln Gly
                405                 410                 415
Gln Asn Gln Leu Tyr Asn Glu Leu Asn Leu Gly Arg Arg Glu Glu Tyr
            420                 425                 430
Asp Val Leu Asp Lys Arg Arg Gly Arg Asp Pro Glu Met Gly Gly Lys
            435                 440                 445
Pro Gln Arg Arg Lys Asn Pro Gln Glu Gly Leu Tyr Asn Glu Leu Gln
450                 455                 460
Lys Asp Lys Met Ala Glu Ala Tyr Ser Glu Ile Gly Met Lys Gly Glu
465                 470                 475                 480
Arg Arg Arg Gly Lys Gly His Asp Gly Leu Tyr Gln Gly Leu Ser Thr
                485                 490                 495
Ala Thr Lys Asp Thr Tyr Asp Ala Leu His Met Gln Ala Leu Pro Pro
            500                 505                 510
Arg

<210> SEQ ID NO 64
```

<211> LENGTH: 467
<212> TYPE: PRT
<213> ORGANISM: Artificial sequence
<220> FEATURE:
<223> OTHER INFORMATION: Synthesized polypeptide

<400> SEQUENCE: 64

```
Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
        35                  40                  45

Gly Ile Phe Asn Pro Gly Gly Ser Thr Ser Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
            100                 105                 110

Met Val Thr Val Ser Ser Gly Gly Gly Gly Ser Gly Gly Gly Gly Ser
        115                 120                 125

Gly Gly Gly Gly Ser Asp Ile Gln Met Thr Gln Ser Pro Ser Ser Leu
    130                 135                 140

Ser Ala Ser Val Gly Asp Arg Val Thr Ile Thr Cys Arg Ala Ser Gln
145                 150                 155                 160

Ser Ile Ser Ser Tyr Leu Asn Trp Tyr Gln Gln Lys Pro Gly Lys Ala
                165                 170                 175

Pro Lys Leu Leu Ile Asp Val Ala Ser Ser Leu Gln Ser Gly Val Pro
            180                 185                 190

Ser Arg Phe Ser Gly Ser Gly Ser Gly Thr Asp Phe Thr Leu Thr Ile
        195                 200                 205

Ser Ser Leu Gln Pro Glu Asp Phe Ala Thr Tyr Tyr Cys Gln Gln Ser
    210                 215                 220

Tyr Ser Thr Pro Leu Thr Phe Gly Gly Gly Thr Lys Val Glu Ile Lys
225                 230                 235                 240

Arg Thr Thr Thr Pro Ala Pro Arg Pro Thr Pro Ala Pro Thr Ile
                245                 250                 255

Ala Ser Gln Pro Leu Ser Leu Arg Pro Glu Ala Cys Arg Pro Ala Ala
            260                 265                 270

Gly Gly Ala Val His Thr Arg Gly Leu Asp Phe Ala Cys Asp Phe Trp
        275                 280                 285

Val Leu Val Val Val Gly Gly Val Leu Ala Cys Tyr Ser Leu Leu Val
    290                 295                 300

Thr Val Ala Phe Ile Ile Phe Trp Val Arg Ser Lys Arg Ser Arg Leu
305                 310                 315                 320

Leu His Ser Asp Tyr Met Asn Met Thr Pro Arg Arg Pro Gly Pro Thr
                325                 330                 335

Arg Lys His Tyr Gln Pro Tyr Ala Pro Pro Arg Asp Phe Ala Ala Tyr
            340                 345                 350

Arg Ser Arg Val Lys Phe Ser Arg Ser Ala Asp Ala Pro Ala Tyr Gln
        355                 360                 365

Gln Gly Gln Asn Gln Leu Tyr Asn Glu Leu Asn Leu Gly Arg Arg Glu
    370                 375                 380
```

```
Glu Tyr Asp Val Leu Asp Lys Arg Arg Gly Arg Asp Pro Glu Met Gly
385                 390                 395                 400

Gly Lys Pro Gln Arg Arg Lys Asn Pro Gln Glu Gly Leu Tyr Asn Glu
                405                 410                 415

Leu Gln Lys Asp Lys Met Ala Glu Ala Tyr Ser Glu Ile Gly Met Lys
            420                 425                 430

Gly Glu Arg Arg Arg Gly Lys Gly His Asp Gly Leu Tyr Gln Gly Leu
        435                 440                 445

Ser Thr Ala Thr Lys Asp Thr Tyr Asp Ala Leu His Met Gln Ala Leu
    450                 455                 460

Pro Pro Arg
465
```

<210> SEQ ID NO 65
<211> LENGTH: 464
<212> TYPE: PRT
<213> ORGANISM: Artificial sequence
<220> FEATURE:
<223> OTHER INFORMATION: Synthesized polypeptide

<400> SEQUENCE: 65

```
Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
        35                  40                  45

Gly Ile Phe Asn Pro Gly Gly Gly Ser Thr Ser Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
            100                 105                 110

Met Val Thr Val Ser Ser Gly Gly Gly Gly Ser Gly Gly Gly Gly Ser
        115                 120                 125

Gly Gly Gly Gly Ser Asp Ile Gln Met Thr Gln Ser Pro Ser Ser Leu
    130                 135                 140

Ser Ala Ser Val Gly Asp Arg Val Thr Ile Thr Cys Arg Ala Ser Gln
145                 150                 155                 160

Ser Ile Ser Ser Tyr Leu Asn Trp Tyr Gln Gln Lys Pro Gly Lys Ala
                165                 170                 175

Pro Lys Leu Leu Ile Asp Val Ala Ser Ser Leu Gln Ser Gly Val Pro
            180                 185                 190

Ser Arg Phe Ser Gly Ser Gly Ser Gly Thr Asp Phe Thr Leu Thr Ile
        195                 200                 205

Ser Ser Leu Gln Pro Glu Asp Phe Ala Thr Tyr Tyr Cys Gln Gln Ser
    210                 215                 220

Tyr Ser Thr Pro Leu Thr Phe Gly Gly Gly Thr Lys Val Glu Ile Lys
225                 230                 235                 240

Arg Thr Thr Thr Pro Ala Pro Arg Pro Pro Thr Pro Ala Pro Thr Ile
                245                 250                 255

Ala Ser Gln Pro Leu Ser Leu Arg Pro Glu Ala Cys Arg Pro Ala Ala
            260                 265                 270
```

Gly Gly Ala Val His Thr Arg Gly Leu Asp Phe Ala Cys Asp Ile Tyr
              275                 280                 285

Ile Trp Ala Pro Leu Ala Gly Thr Cys Gly Val Leu Leu Leu Ser Leu
    290                 295                 300

Val Ile Thr Leu Tyr Cys Lys Arg Gly Lys Lys Leu Leu Tyr Ile
305                 310                 315                 320

Phe Lys Gln Pro Phe Met Arg Pro Val Gln Thr Thr Gln Glu Asp
                    325                 330                 335

Gly Cys Ser Cys Arg Phe Pro Glu Glu Glu Glu Gly Gly Cys Glu Leu
                    340                 345                 350

Arg Val Lys Phe Ser Arg Ser Ala Asp Ala Pro Ala Tyr Lys Gln Gly
                355                 360                 365

Gln Asn Gln Leu Tyr Asn Glu Leu Asn Leu Gly Arg Arg Glu Glu Tyr
    370                 375                 380

Asp Val Leu Asp Lys Arg Arg Gly Arg Asp Pro Glu Met Gly Gly Lys
385                 390                 395                 400

Pro Arg Arg Lys Asn Pro Gln Glu Gly Leu Tyr Asn Glu Leu Gln Lys
                    405                 410                 415

Asp Lys Met Ala Glu Ala Tyr Ser Glu Ile Gly Met Lys Gly Glu Arg
                420                 425                 430

Arg Arg Gly Lys Gly His Asp Gly Leu Tyr Gln Gly Leu Ser Thr Ala
                435                 440                 445

Thr Lys Asp Thr Tyr Asp Ala Leu His Met Gln Ala Leu Pro Pro Arg
450                 455                 460

<210> SEQ ID NO 66
<211> LENGTH: 509
<212> TYPE: PRT
<213> ORGANISM: Artificial sequence
<220> FEATURE:
<223> OTHER INFORMATION: Synthesized polypeptide

<400> SEQUENCE: 66

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
                20                  25                  30

Tyr Met His Trp Val Arg Gln Ala Pro Gly Gln Gly Leu Glu Trp Met
            35                  40                  45

Gly Ile Phe Asn Pro Gly Gly Ser Thr Tyr Ala Gln Lys Phe
        50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
                100                 105                 110

Met Val Thr Val Ser Ser Gly Gly Gly Gly Ser Gly Gly Gly Gly Ser
            115                 120                 125

Gly Gly Gly Gly Ser Asp Ile Gln Met Thr Gln Ser Pro Ser Ser Leu
        130                 135                 140

Ser Ala Ser Val Gly Asp Arg Val Thr Ile Thr Cys Arg Ala Ser Gln
145                 150                 155                 160

Ser Ile Ser Ser Tyr Leu Asn Trp Tyr Gln Gln Lys Pro Gly Lys Ala
                165                 170                 175

```
Pro Lys Leu Leu Ile Asp Val Ala Ser Ser Leu Gln Ser Gly Val Pro
            180                 185                 190

Ser Arg Phe Ser Gly Ser Gly Ser Gly Thr Asp Phe Thr Leu Thr Ile
        195                 200                 205

Ser Ser Leu Gln Pro Glu Asp Phe Ala Thr Tyr Tyr Cys Gln Gln Ser
    210                 215                 220

Tyr Ser Thr Pro Leu Thr Phe Gly Gly Gly Thr Lys Val Glu Ile Lys
225                 230                 235                 240

Arg Thr Thr Thr Pro Ala Pro Arg Pro Pro Thr Pro Ala Pro Thr Ile
                245                 250                 255

Ala Ser Gln Pro Leu Ser Leu Arg Pro Glu Ala Cys Arg Pro Ala Ala
            260                 265                 270

Gly Gly Ala Val His Thr Arg Gly Leu Asp Phe Ala Cys Asp Phe Trp
        275                 280                 285

Val Leu Val Val Val Gly Gly Val Leu Ala Cys Tyr Ser Leu Leu Val
    290                 295                 300

Thr Val Ala Phe Ile Ile Phe Trp Val Arg Ser Lys Arg Ser Arg Leu
305                 310                 315                 320

Leu His Ser Asp Tyr Met Asn Met Thr Pro Arg Arg Pro Gly Pro Thr
                325                 330                 335

Arg Lys His Tyr Gln Pro Tyr Ala Pro Pro Arg Asp Phe Ala Ala Tyr
            340                 345                 350

Arg Ser Lys Arg Gly Arg Lys Lys Leu Leu Tyr Ile Phe Lys Gln Pro
        355                 360                 365

Phe Met Arg Pro Val Gln Thr Thr Gln Glu Glu Asp Gly Cys Ser Cys
370                 375                 380

Arg Phe Pro Glu Glu Glu Glu Gly Gly Cys Glu Leu Arg Val Lys Phe
385                 390                 395                 400

Ser Arg Ser Ala Asp Ala Pro Ala Tyr Gln Gln Gly Gln Asn Gln Leu
            405                 410                 415

Tyr Asn Glu Leu Asn Leu Gly Arg Arg Glu Glu Tyr Asp Val Leu Asp
        420                 425                 430

Lys Arg Arg Gly Arg Asp Pro Glu Met Gly Gly Lys Pro Gln Arg Arg
        435                 440                 445

Lys Asn Pro Gln Glu Gly Leu Tyr Asn Glu Leu Gln Lys Asp Lys Met
    450                 455                 460

Ala Glu Ala Tyr Ser Glu Ile Gly Met Lys Gly Glu Arg Arg Arg Gly
465                 470                 475                 480

Lys Gly His Asp Gly Leu Tyr Gln Gly Leu Ser Thr Ala Thr Lys Asp
                485                 490                 495

Thr Tyr Asp Ala Leu His Met Gln Ala Leu Pro Pro Arg
            500                 505

<210> SEQ ID NO 67
<211> LENGTH: 118
<212> TYPE: PRT
<213> ORGANISM: Artificial sequence
<220> FEATURE:
<223> OTHER INFORMATION: Synthesized polypeptide

<400> SEQUENCE: 67

Glu Val Gln Leu Val Gln Ser Gly Pro Glu Val Lys Lys Pro Gly Ala
1               5                   10                  15

Ser Val Lys Val Ser Cys Lys Ala Ser Gly Tyr Thr Phe Asn Ser Tyr
            20                  25                  30
```

Tyr Met His Trp Val Arg Gln Ala Pro Gly Gln Gly Leu Glu Trp Met
            35                  40                  45

Gly Ile Phe Asn Pro Gly Gly Ser Thr Ser Tyr Ala Gln Lys Phe
        50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
            100                 105                 110

Met Val Thr Val Ser Ser
            115

<210> SEQ ID NO 68
<211> LENGTH: 118
<212> TYPE: PRT
<213> ORGANISM: Artificial sequence
<220> FEATURE:
<223> OTHER INFORMATION: Synthesized polypeptide

<400> SEQUENCE: 68

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
            35                  40                  45

Gly Ile Phe Asn Pro Gly Gly Ser Thr Ser Tyr Ala Gln Lys Phe
        50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Ile Tyr Tyr Cys
                85                  90                  95

Ala Arg Gly Thr Thr Ser Asp Ala Phe Asp Ile Trp Gly Gln Gly Thr
            100                 105                 110

Met Val Thr Val Ser Ser
            115

<210> SEQ ID NO 69
<211> LENGTH: 118
<212> TYPE: PRT
<213> ORGANISM: Artificial sequence
<220> FEATURE:
<223> OTHER INFORMATION: Synthesized polypeptide

<400> SEQUENCE: 69

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
            35                  40                  45

Gly Ile Phe Asn Pro Gly Gly Ser Thr Ser Tyr Ala Gln Lys Phe
        50                  55                  60

Gln Gly Arg Val Thr Met Thr Arg Asp Thr Ser Thr Ser Thr Val Tyr
65                  70                  75                  80

```
Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
            100                 105                 110

Leu Val Thr Val Ser Ser
        115
```

<210> SEQ ID NO 70
<211> LENGTH: 241
<212> TYPE: PRT
<213> ORGANISM: Artificial sequence
<220> FEATURE:
<223> OTHER INFORMATION: Synthesized polypeptide

<400> SEQUENCE: 70

```
Glu Val Gln Leu Val Gln Ser Gly Pro Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
        35                  40                  45

Gly Ile Phe Asn Pro Gly Gly Gly Ser Thr Ser Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
            100                 105                 110

Met Val Thr Val Ser Ser Gly Gly Gly Ser Gly Gly Gly Gly Ser
        115                 120                 125

Gly Gly Gly Gly Ser Asp Ile Gln Met Thr Gln Ser Pro Ser Ser Leu
    130                 135                 140

Ser Ala Ser Val Gly Asp Arg Val Thr Ile Thr Cys Arg Ala Ser Gln
145                 150                 155                 160

Ser Ile Ser Ser Tyr Leu Asn Trp Tyr Gln Gln Lys Pro Gly Lys Ala
                165                 170                 175

Pro Lys Leu Leu Ile Asp Val Ala Ser Ser Leu Gln Ser Gly Val Pro
            180                 185                 190

Ser Arg Phe Ser Gly Ser Gly Ser Gly Thr Asp Phe Thr Leu Thr Ile
        195                 200                 205

Ser Ser Leu Gln Pro Glu Asp Phe Ala Thr Tyr Tyr Cys Gln Gln Ser
    210                 215                 220

Tyr Ser Thr Pro Leu Thr Phe Gly Gly Gly Thr Lys Val Glu Ile Lys
225                 230                 235                 240

Arg
```

<210> SEQ ID NO 71
<211> LENGTH: 241
<212> TYPE: PRT
<213> ORGANISM: Artificial sequence
<220> FEATURE:
<223> OTHER INFORMATION: Synthesized polypeptide

<400> SEQUENCE: 71

```
Glu Val Gln Leu Val Gln Ser Gly Ala Glu Val Lys Lys Pro Gly Ala
1               5                   10                  15
```

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
        35                  40                  45

Gly Ile Phe Asn Pro Gly Gly Ser Thr Ser Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Ile Tyr Tyr Cys
                85                  90                  95

Ala Arg Gly Thr Thr Ser Asp Ala Phe Asp Ile Trp Gly Gln Gly Thr
            100                 105                 110

Met Val Thr Val Ser Ser Gly Gly Gly Ser Gly Gly Gly Gly Ser
            115                 120                 125

Gly Gly Gly Gly Ser Asp Ile Gln Met Thr Gln Ser Pro Ser Ser Leu
130                 135                 140

Ser Ala Ser Val Gly Asp Arg Val Thr Ile Thr Cys Arg Ala Ser Gln
145                 150                 155                 160

Ser Ile Ser Ser Tyr Leu Asn Trp Tyr Gln Gln Lys Pro Gly Lys Ala
                165                 170                 175

Pro Lys Leu Leu Ile Asp Val Ala Ser Ser Leu Gln Ser Gly Val Pro
            180                 185                 190

Ser Arg Phe Ser Gly Ser Gly Ser Gly Thr Asp Phe Thr Leu Thr Ile
            195                 200                 205

Ser Ser Leu Gln Pro Glu Asp Phe Ala Thr Tyr Tyr Cys Gln Gln Ser
210                 215                 220

Tyr Ser Thr Pro Leu Thr Phe Gly Gly Gly Thr Lys Val Glu Ile Lys
225                 230                 235                 240

Arg

<210> SEQ ID NO 72
<211> LENGTH: 241
<212> TYPE: PRT
<213> ORGANISM: Artificial sequence
<220> FEATURE:
<223> OTHER INFORMATION: Synthesized polypeptide

<400> SEQUENCE: 72

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
        35                  40                  45

Gly Ile Phe Asn Pro Gly Gly Ser Thr Ser Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
            100                 105                 110

Leu Val Thr Val Ser Ser Gly Gly Gly Gly Ser Gly Gly Gly Gly Ser
            115                 120                 125

```
Gly Gly Gly Gly Ser Asp Ile Gln Met Thr Gln Ser Pro Ser Ser Leu
        130                 135                 140

Ser Ala Ser Val Gly Asp Arg Val Thr Ile Thr Cys Arg Ala Ser Gln
145                 150                 155                 160

Ser Ile Ser Ser Tyr Leu Asn Trp Tyr Gln Gln Lys Pro Gly Lys Ala
                165                 170                 175

Pro Lys Leu Leu Ile Asp Val Ala Ser Ser Leu Gln Ser Gly Val Pro
                180                 185                 190

Ser Arg Phe Ser Gly Ser Gly Ser Gly Thr Asp Phe Thr Leu Thr Ile
            195                 200                 205

Ser Ser Leu Gln Pro Glu Asp Phe Ala Thr Tyr Tyr Cys Gln Gln Ser
        210                 215                 220

Tyr Ser Thr Pro Leu Thr Phe Gly Gly Gly Thr Lys Val Glu Ile Lys
225                 230                 235                 240

Arg

<210> SEQ ID NO 73
<211> LENGTH: 467
<212> TYPE: PRT
<213> ORGANISM: Artificial sequence
<220> FEATURE:
<223> OTHER INFORMATION: Synthesized polypeptide

<400> SEQUENCE: 73

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Tyr Met His Trp Val Arg Gln Ala Pro Gly Gln Gly Leu Glu Trp Met
        35                  40                  45

Gly Ile Phe Asn Pro Gly Gly Gly Ser Thr Ser Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Thr Thr Ser Asp Ala Phe Asp Ile Trp Gly Gln Gly Thr
            100                 105                 110

Leu Val Thr Val Ser Ser Gly Gly Gly Gly Ser Gly Gly Gly Gly Ser
        115                 120                 125

Gly Gly Gly Gly Ser Asp Ile Gln Met Thr Gln Ser Pro Ser Ser Leu
        130                 135                 140

Ser Ala Ser Val Gly Asp Arg Val Thr Ile Thr Cys Arg Ala Ser Gln
145                 150                 155                 160

Ser Ile Ser Ser Tyr Leu Asn Trp Tyr Gln Gln Lys Pro Gly Lys Ala
                165                 170                 175

Pro Lys Leu Leu Ile Asp Val Ala Ser Ser Leu Gln Ser Gly Val Pro
                180                 185                 190

Ser Arg Phe Ser Gly Ser Gly Ser Gly Thr Asp Phe Thr Leu Thr Ile
            195                 200                 205

Ser Ser Leu Gln Pro Glu Asp Phe Ala Thr Tyr Tyr Cys Gln Gln Ser
        210                 215                 220

Tyr Ser Thr Pro Leu Thr Phe Gly Gly Gly Thr Lys Val Glu Ile Lys
225                 230                 235                 240
```

Arg Thr Thr Thr Pro Ala Pro Arg Pro Thr Pro Ala Pro Thr Ile
                245                 250                 255

Ala Ser Gln Pro Leu Ser Leu Arg Pro Glu Ala Cys Arg Pro Ala Ala
            260                 265                 270

Gly Gly Ala Val His Thr Arg Gly Leu Asp Phe Ala Cys Asp Phe Trp
        275                 280                 285

Val Leu Val Val Val Gly Gly Val Leu Ala Cys Tyr Ser Leu Leu Val
    290                 295                 300

Thr Val Ala Phe Ile Ile Phe Trp Val Arg Ser Lys Arg Ser Arg Leu
305                 310                 315                 320

Leu His Ser Asp Tyr Met Asn Met Thr Pro Arg Arg Pro Gly Pro Thr
                325                 330                 335

Arg Lys His Tyr Gln Pro Tyr Ala Pro Pro Arg Asp Phe Ala Ala Tyr
            340                 345                 350

Arg Ser Arg Val Lys Phe Ser Arg Ser Ala Asp Ala Pro Ala Tyr Gln
        355                 360                 365

Gln Gly Gln Asn Gln Leu Tyr Asn Glu Leu Asn Leu Gly Arg Arg Glu
    370                 375                 380

Glu Tyr Asp Val Leu Asp Lys Arg Arg Gly Arg Asp Pro Glu Met Gly
385                 390                 395                 400

Gly Lys Pro Gln Arg Arg Lys Asn Pro Gln Glu Gly Leu Tyr Asn Glu
                405                 410                 415

Leu Gln Lys Asp Lys Met Ala Glu Ala Tyr Ser Glu Ile Gly Met Lys
            420                 425                 430

Gly Glu Arg Arg Arg Gly Lys Gly His Asp Gly Leu Tyr Gln Gly Leu
        435                 440                 445

Ser Thr Ala Thr Lys Asp Thr Tyr Asp Ala Leu His Met Gln Ala Leu
    450                 455                 460

Pro Pro Arg
465

<210> SEQ ID NO 74
<211> LENGTH: 17
<212> TYPE: PRT
<213> ORGANISM: Artificial sequence
<220> FEATURE:
<223> OTHER INFORMATION: Synthesized polypeptide
<220> FEATURE:
<221> NAME/KEY: MISC_FEATURE
<222> LOCATION: (1)..(1)
<223> OTHER INFORMATION: X is A or I
<220> FEATURE:
<221> NAME/KEY: MISC_FEATURE
<222> LOCATION: (2)..(2)
<223> OTHER INFORMATION: X is I or F
<220> FEATURE:
<221> NAME/KEY: MISC_FEATURE
<222> LOCATION: (3)..(3)
<223> OTHER INFORMATION: X is S or N
<220> FEATURE:
<221> NAME/KEY: misc_feature
<222> LOCATION: (4)..(4)
<223> OTHER INFORMATION: X is G or P
<220> FEATURE:
<221> NAME/KEY: MISC_FEATURE
<222> LOCATION: (10)..(10)
<223> OTHER INFORMATION: X is Y or S
<220> FEATURE:
<221> NAME/KEY: MISC_FEATURE
<222> LOCATION: (13)..(13)
<223> OTHER INFORMATION: X is D or Q
<220> FEATURE:
<221> NAME/KEY: MISC_FEATURE

```
<222> LOCATION: (14)..(14)
<223> OTHER INFORMATION: X is S or K
<220> FEATURE:
<221> NAME/KEY: MISC_FEATURE
<222> LOCATION: (15)..(15)
<223> OTHER INFORMATION: X is V or F
<220> FEATURE:
<221> NAME/KEY: MISC_FEATURE
<222> LOCATION: (16)..(16)
<223> OTHER INFORMATION: X is K or Q

<400> SEQUENCE: 74

Xaa Xaa Xaa Xaa Ser Gly Gly Ser Thr Xaa Tyr Ala Xaa Xaa Xaa Xaa
1               5                   10                  15
Gly

<210> SEQ ID NO 75
<211> LENGTH: 11
<212> TYPE: PRT
<213> ORGANISM: Artificial sequence
<220> FEATURE:
<223> OTHER INFORMATION: Synthesized polypeptide
<220> FEATURE:
<221> NAME/KEY: MISC_FEATURE
<222> LOCATION: (9)..(9)
<223> OTHER INFORMATION: X is W or Y
<220> FEATURE:
<221> NAME/KEY: MISC_FEATURE
<222> LOCATION: (11)..(11)
<223> OTHER INFORMATION: X is A or N

<400> SEQUENCE: 75

Arg Ala Ser Gln Ser Ile Ser Ser Xaa Leu Xaa
1               5                   10

<210> SEQ ID NO 76
<211> LENGTH: 4
<212> TYPE: PRT
<213> ORGANISM: Artificial sequence
<220> FEATURE:
<223> OTHER INFORMATION: Synthesized polypeptide

<400> SEQUENCE: 76

Ala Ile Ser Gly
1

<210> SEQ ID NO 77
<211> LENGTH: 4
<212> TYPE: PRT
<213> ORGANISM: Artificial sequence
<220> FEATURE:
<223> OTHER INFORMATION: Synthesized polypeptide

<400> SEQUENCE: 77

Ile Phe Asn Pro
1

<210> SEQ ID NO 78
<211> LENGTH: 17
<212> TYPE: PRT
<213> ORGANISM: Artificial sequence
<220> FEATURE:
<223> OTHER INFORMATION: Synthesized polypeptide
<220> FEATURE:
<221> NAME/KEY: MISC_FEATURE
<222> LOCATION: (1)..(1)
<223> OTHER INFORMATION: X is A or I
<220> FEATURE:
<221> NAME/KEY: MISC_FEATURE
<222> LOCATION: (2)..(2)
```

```
<223> OTHER INFORMATION: X is I or F.
<220> FEATURE:
<221> NAME/KEY: MISC_FEATURE
<222> LOCATION: (3)..(3)
<223> OTHER INFORMATION: X is S or N.
<220> FEATURE:
<221> NAME/KEY: MISC_FEATURE
<222> LOCATION: (4)..(4)
<223> OTHER INFORMATION: X is G or P.
<220> FEATURE:
<221> NAME/KEY: MISC_FEATURE
<222> LOCATION: (10)..(10)
<223> OTHER INFORMATION: X is Y or S.
<220> FEATURE:
<221> NAME/KEY: MISC_FEATURE
<222> LOCATION: (13)..(13)
<223> OTHER INFORMATION: X is D or Q.
<220> FEATURE:
<221> NAME/KEY: MISC_FEATURE
<222> LOCATION: (14)..(14)
<223> OTHER INFORMATION: X is S or K.
<220> FEATURE:
<221> NAME/KEY: MISC_FEATURE
<222> LOCATION: (15)..(15)
<223> OTHER INFORMATION: X is V or F.
<220> FEATURE:
<221> NAME/KEY: MISC_FEATURE
<222> LOCATION: (16)..(16)
<223> OTHER INFORMATION: X is K or Q.

<400> SEQUENCE: 78

Xaa Xaa Xaa Xaa Gly Gly Gly Ser Thr Xaa Tyr Ala Xaa Xaa Xaa Xaa
1               5                   10                  15

Gly

<210> SEQ ID NO 79
<211> LENGTH: 11
<212> TYPE: PRT
<213> ORGANISM: Artificial sequence
<220> FEATURE:
<223> OTHER INFORMATION: Synthesized polypeptide
<220> FEATURE:
<221> NAME/KEY: MISC_FEATURE
<222> LOCATION: (9)..(9)
<223> OTHER INFORMATION: X is W or Y.
<220> FEATURE:
<221> NAME/KEY: MISC_FEATURE
<222> LOCATION: (11)..(11)
<223> OTHER INFORMATION: X is A or N.

<400> SEQUENCE: 79

Arg Ala Ser Gln Trp Ile Ala Arg Xaa Leu Xaa
1               5                   10

<210> SEQ ID NO 80
<211> LENGTH: 7
<212> TYPE: PRT
<213> ORGANISM: Artificial sequence
<220> FEATURE:
<223> OTHER INFORMATION: Synthesized polypeptide
<220> FEATURE:
<221> NAME/KEY: MISC_FEATURE
<222> LOCATION: (1)..(1)
<223> OTHER INFORMATION: X is D or V.
<220> FEATURE:
<221> NAME/KEY: MISC_FEATURE
<222> LOCATION: (4)..(4)
<223> OTHER INFORMATION: X is N or S.
<220> FEATURE:
<221> NAME/KEY: MISC_FEATURE
<222> LOCATION: (6)..(6)
<223> OTHER INFORMATION: X is E or Q.
```

```
<400> SEQUENCE: 80

Xaa Ala Ser Xaa Leu Xaa Ser
1               5

<210> SEQ ID NO 81
<211> LENGTH: 10
<212> TYPE: PRT
<213> ORGANISM: Artificial sequence
<220> FEATURE:
<223> OTHER INFORMATION: Synthesized polypeptide
<220> FEATURE:
<221> NAME/KEY: MISC_FEATURE
<222> LOCATION: (3)..(3)
<223> OTHER INFORMATION: X is Y or S.
<220> FEATURE:
<221> NAME/KEY: MISC_FEATURE
<222> LOCATION: (6)..(6)
<223> OTHER INFORMATION: X is Y or T.
<220> FEATURE:
<221> NAME/KEY: MISC_FEATURE
<222> LOCATION: (8)..(8)
<223> OTHER INFORMATION: X is M or L.
<220> FEATURE:
<221> NAME/KEY: MISC_FEATURE
<222> LOCATION: (9)..(9)
<223> OTHER INFORMATION: X is I or absent.

<400> SEQUENCE: 81

Gln Gln Xaa Tyr Ser Xaa Pro Xaa Xaa Thr
1               5                   10
```

CLL1-TARGETING ANTIBODY AND APPLICATION THEREOF

CROSS REFERENCE TO RELATED APPLICATIONS

This application claims the benefit of the filing dates of PCT/CN2019/113767, filed Oct. 28, 2019, which claims priority to CN Provisional Application No. 201811260687.7, filed Oct. 26, 2018.

SEQUENCE LISTING

The instant application contains a Sequence Listing which has been filed electronically in ASCII format and is hereby incorporated by reference in its entirety. Said ASCII copy, created on Jun. 4, 2025, is named 050723-569N01US_Sub_SL.txt and is 111,531 bytes in size.

TECHNICAL FIELD

The present invention relates to the field of tumor immunotherapy or diagnosis; and in particular, the present invention relates to antibodies targeting CLL1 and uses thereof.

BACKGROUND

Acute myeloid leukemia (AML) is the most common type of adult acute leukemia. The traditional treatment is the allogeneic transplantation of hematopoietic stem cells. However, there are complications related to early or late transplantation, and there is a possibility of recurrence after surgery. The current chemotherapy drugs for treating AML mainly include daunorubicin (DNR), idarubicin (demethoxydaunomycin), and cytarabine, etc. Chemotherapy and radiotherapy have significant inhibitory effects on AML to some extent. However, clinical compliance is affected due to strong side effects and easy recurrence. Therefore, there is an urgent need for new treatment methods for AML.

Human C-type lectin-like molecule 1 (CLL1) is a type II transmembrane protein, the expression of which is restricted to myeloid cells and most AML cells. Moreover, CLL1 is expressed on leukemia stem cells (LSCs) instead of hematopoietic stem cells (HSCs). Therefore, CLL1 is a potential target for treating AML.

Researchers are currently conducting researches on anti-CLL1 antibodies. For example, CN104736562B disclosed anti-CLL1 antibodies. However, there are currently no anti-CLL1 antibodies on the market that can be used to treat AML.

SUMMARY OF THE INVENTION

The purpose of the present invention is to provide specific antibodies targeting CLL1.

In the first aspect, the present invention provides an antibody targeting CLL1, the antibody having:
HCDR1 shown in $SYX_1MX_2$, HCDR2 shown in $X_3X_4X_5X_6SGGSTX_7YAX_8X_9X_{10}X_{11}G$ (SEQ ID NO: 74), HCDR3 shown in SEQ ID NO: 40 or 41, and LCDR1 shown in $RASQSISSX_{12}LX_{13}$ (SEQ ID NO: 75), LCDR2 shown in $X_{14}ASX_{15}LX_{16}S$ (SEQ ID NO: 80), LCDR3 shown in $QQX_{17}YSX_{18}PX_{19}X_{20}T$ (SEQ ID NO: 81), Wherein, $X_1$ is selected from A or Y, $X_2$ is selected from S or H, $X_3$ is A or I, $X_4$ is selected from I or F, $X_5$ is selected from S or N, $X_6$ is selected from G or P, $X_7$ is selected from Y or S, $X_8$ is selected from D or Q, $X_9$ is selected from S or K, $X_{10}$ is selected from V or F, $X_{11}$ is selected from K or Q, $X_{12}$ is selected from W or Y, $X_{13}$ is selected from A or N, $X_{14}$ is selected from D or V, $X_{15}$ is selected from N or S, $X_{16}$ is selected from E or Q, $X_{17}$ is selected from Y or S, $X_{18}$ is selected from Y or T, $X_{19}$ is selected from M or L, and $X_{20}$ is I or absent.

In a preferred embodiment, the antibody is selected from the following group:
(1) an antibody, the heavy chain variable region of which comprises HCDR1 shown in SEQ ID NO: 35 or 36, and/or comprises HCDR2 shown in SEQ ID NO: 37, 38 or 39, and/or comprises HCDR3 shown in SEQ ID NO: 40 or 41;
(2) an antibody, the light chain variable region of which comprises LCDR1 shown in SEQ ID NO: 42, 43 or 44, and/or comprises LCDR2 shown in SEQ ID NO: 45, 46, 47 or 48, and/or comprises LCDR3 shown in SEQ ID NO: 49 or 50;
(3) an antibody, comprising the heavy chain variable region described in (1) and the light chain variable region described in (2);
(4) a variant of the antibody described in any one of (1) to (3), which has the same or similar activities as the antibody described in any one of (1) to (3).

In a preferred embodiment, the LCDR1 of the antibody is mutated from $RASQSISSX_{12}LX_{13}$ (SEQ ID NO. 75) to $RASQWIARX_{12}LX_{13}$ (SEQ ID NO. 79); preferably, the sequence of the mutated LCDR1 is shown in SEQ ID NO: 44.

In a preferred embodiment, the $X_3X_4X_5X_6$ of the HCDR2 of the antibody is AISG (SEQ ID NO: 76) or IFNP (SEQ ID NO. 77).

In a preferred embodiment, the HCDR2 of the antibody is mutated from $X_3X_4X_5X_6SGGSTX_7YAX_8X_9X_{10}X_{11}G$ (SEQ ID NO. 74) to $X_3X_4X_5X_6GGGSTX_7YAX_8X_9X_{10}X_{11}G$ (SEQ ID NO. 78); preferably, the sequence of the mutated HCDR2 is shown in SEQ ID NO: 39.

In a preferred embodiment, the antibody is selected from:
(1) An antibody comprising HCDR1 shown in SEQ ID NO: 35, HCDR2 shown in SEQ ID NO: 37, HCDR3 shown in SEQ ID NO: 40, and LCDR1 shown in SEQ ID NO: 42, LCDR2 shown in SEQ ID NO: 45 and LCDR3 shown in SEQ ID NO: 49;
(2) An antibody comprising the HCDR1 shown in SEQ ID NO: 36, HCDR2 shown in SEQ ID NO: 38, HCDR3 shown in SEQ ID NO: 41, and LCDR1 shown in SEQ ID NO: 43, LCDR2 shown in SEQ ID NO: 46, LCDR3 shown in SEQ ID NO: 50;
(3) An antibody comprising HCDR1 shown in SEQ ID NO: 35, HCDR2 shown in SEQ ID NO: 37, HCDR3 shown in SEQ ID NO: 40, and LCDR1 shown in SEQ ID NO: 44, LCDR2 shown in SEQ ID NO: 47, LCDR3 shown in SEQ ID NO: 49;
(4) An antibody comprising the HCDR1 shown in SEQ ID NO: 36, HCDR2 shown in SEQ ID NO: 38, HCDR3 shown in SEQ ID NO: 41, and LCDR1 shown in SEQ ID NO: 43, LCDR2 shown in SEQ ID NO: 48, LCDR3 shown in SEQ ID NO: 50;
(5) An antibody comprising the HCDR1 shown in SEQ ID NO: 36, HCDR2 shown in SEQ ID NO: 39, HCDR3 shown in SEQ ID NO: 41, and LCDR1 shown in SEQ ID NO: 43, LCDR2 shown in SEQ ID NO: 48, LCDR3 shown in SEQ ID NO: 50;

(6) An antibody, which is a variant of the antibody described in any one of (1) to (5), and has the same or similar activity as the antibody described in any one of (1) to (5).

In a preferred embodiment, the antibody is selected from:
(1) An antibody, wherein the heavy chain variable region of the antibody has the amino acid sequence shown in SEQ ID NO: 1, the amino acid sequence shown in SEQ ID NO: 5, the amino acid sequence shown in SEQ ID NO: 13, the amino acid sequence shown in SEQ ID NO: 67, the amino acid sequence shown in SEQ ID NO: 68, or the amino acid sequence shown in SEQ ID NO: 69;
(2) An antibody, wherein the light chain variable region of the antibody has the amino acid sequence shown in SEQ ID NO: 3, the amino acid sequence shown in SEQ ID NO: 7, the amino acid sequence shown in SEQ ID NO: 11, or the amino acid sequence shown in SEQ ID NO: 15;
(3) An antibody, comprising the heavy chain variable region of the antibody described in (1) and the light chain variable region of the antibody described in (2);
(4) A variant of the antibody described in any one of (1) to (3), which has the same or similar activity as the antibody described in any one of (1) to (3).

In a preferred embodiment, the antibody is selected from:
(1) An antibody, wherein the heavy chain variable region of the antibody has the amino acid sequence shown in SEQ ID NO: 1 and the light chain variable region of the antibody has the amino acid sequence shown in SEQ ID NO: 3;
(2) An antibody, wherein the heavy chain variable region of the antibody has the amino acid sequence shown in SEQ ID NO: 5 and the light chain variable region of the antibody has the amino acid sequence shown in SEQ ID NO: 7;
(3) An antibody, wherein the heavy chain variable region of the antibody has the amino acid sequence shown in SEQ ID NO: 1 and the light chain variable region of the antibody has the amino acid sequence shown in SEQ ID NO: 11;
(4) An antibody, wherein the heavy chain variable region of the antibody has the amino acid sequence shown in SEQ ID NO: 13 and the light chain variable region of the antibody has the amino acid sequence shown in SEQ ID NO: 15;
(5) An antibody, wherein the heavy chain variable region of the antibody has the amino acid sequence shown in SEQ ID NO: 5 and the light chain variable region of the antibody has the amino acid sequence shown in SEQ ID NO: 15;
(6) A variant of the antibody described in any one of (1) to (5), which has the same or similar activity as the antibody described in any one of (1) to (5).

In a preferred embodiment, the light chain variable region of the antibody has LCDR1 shown in SEQ ID NO: 43, LCDR2 shown in SEQ ID NO: 48, and LCDR3 shown in SEQ ID NO: 50;

Preferably, the light chain variable region has the amino acid sequence shown in SEQ ID NO: 15;

More preferably, the light chain variable region of the antibody has the amino acid sequence shown in SEQ ID NO: 15, and the heavy chain variable region of the antibody has the amino acid sequence shown in SEQ ID NO: 5, 13, 67, 68 or 69.

In a second aspect, the present invention provides an antibody that recognizes the same epitope as the antibody described in the first aspect of the present invention.

In a preferred embodiment, the antibody provided in the first aspect or the second aspect of the present invention is a fully human antibody.

In a preferred embodiment, the antibody provided in the first or second aspect of the present invention is a full antibody, scFv, single domain antibody, Fab fragment, Fv fragment, and F(ab')$_2$ fragment.

In a third aspect, the present invention provides a nucleic acid encoding the antibody according to the first or second aspect of the invention.

In the fourth aspect, the present invention provides an expression vector comprising the nucleic acid according to the third aspect of the present invention.

In the fifth aspect, the present invention provides a host cell comprising the expression vector of the fourth aspect of the present invention or having the nucleic acid of the third aspect of the present invention integrated into the genome.

In the sixth aspect, the present invention provides the use of the antibody described in the first or second aspect of the present invention for preparing a medicament for treating tumors or preparing a reagent for diagnosing tumors.

In a specific embodiment, the tumor is acute myeloid leukemia (AML), chronic myeloid leukemia (CML), chronic myelomonocytic leukemia (CMML), myelodysplastic syndrome (MDS), multiple myeloma or myelofibrosis.

In a specific embodiment, the tumor is a CLL1 positive tumor.

In a seventh aspect, the present invention provides an immunoconjugate, comprising:

The antibody of the first aspect or the second aspect of the present invention, and a functional molecule connected thereto; wherein the functional molecule is selected from: a molecule targeting tumor surface markers, a tumor-inhibiting molecule, a molecule targeting immune cell surface markers, and a detectable marker.

In a preferred embodiment, the tumor-inhibiting molecule is an anti-tumor cytokine or an anti-tumor toxin. Preferably, the cytokine includes one or more selected from: IL-12, IL-15, type I interferon and TNF-alpha.

In a preferred embodiment, the molecule targeting the immune cell surface markers is an antibody or ligand binding to the immune cell surface markers. Preferably, the immune cell surface marker includes one or more of selected from: CD3, CD16 and CD28, and more preferably, the antibody binding to the immune cell surface marker is an anti-CD3 antibody.

In a preferred embodiment, the molecule targeting the immune cell surface markers is an antibody binding to the surface marker of T cells, NK cells or NKT cells.

In the eighth aspect, the present invention provides a nucleic acid encoding the multifunctional immunoconjugate of the eighth aspect of the present invention.

In the ninth aspect, the use of the immunoconjugate of the eighth aspect of the present invention is provided for preparing a medicament for treating tumors or preparing a reagent for diagnosing tumors.

In a specific embodiment, the tumor is acute myeloid leukemia (AML), chronic myeloid leukemia (CML), chronic myelomonocytic leukemia (CMML), myelodysplastic syndrome (MDS), multiple myeloma or myelofibrosis.

In a specific embodiment, the tumor is a CLL1-positive tumor.

In a tenth aspect, the present invention provides a chimeric antigen receptor comprising an extracellular domain, a transmembrane domain and an intracellular signal domain, and the chimeric antigen receptor comprises the antibody of the first or second aspect of the present invention.

In a preferred embodiment, the antibody is a single-chain antibody or a single-domain antibody.

In a preferred embodiment, the intracellular signal domain of the chimeric antigen receptor includes one or more co-stimulatory signal domains and/or primary signal domains.

In a preferred embodiment, the chimeric antigen receptor further includes a hinge domain.

In a preferred embodiment, the transmembrane domain of the chimeric antigen receptor is one or more selected from the transmembrane region of the following molecules: alpha, beta, zeta chain of TCR, CD3ε, CD3ζ, CD4, CD5, CD8α, CD9, CD16, CD22, CD27, CD28, CD33, CD37, CD45, CD64, CD80, CD86, CD134, CD137, CD152, CD154 and PD1; and/or The co-stimulatory signal domain is one or more selected from the intracellular signal region of the following molecules: CARD11, CD2, CD7, CD27, CD28, CD30, CD40, CD54, CD83, OX40, CD137, CD134, CD150, CD152, CD223, CD270, PD-L2, PD-L1, CD278, DAP10, LAT, NKD2C SLP76, TRIM, FcεRIγ, MyD88 and 41BBL; and/or The primary signal domain is one or more selected from the primary signal domain of the following molecules: TCRζ, FcRγ, FcRβ, CD3γ, CD3δ, CD3ε, CD5, CD22, CD79a, CD79b, CD278, CD66d and CD3ζ.

In a preferred embodiment, the transmembrane domain is one or more selected from the transmembrane region of the following molecules: CD8a, CD4, CD45, PD1, CD154 and CD28; and/or The co-stimulatory signal domain is one or more selected from the intracellular signal region of the following molecules: CD137, CD134, CD28 and OX40; and/or The primary signal domain is selected from the primary signal domain of CD3ζ.

In a more preferred embodiment, the transmembrane domain is selected from the transmembrane region of CD8α or CD28, the costimulatory signal domain is selected from the intracellular signal region of CD137 or CD28, and the primary signal domain is selected from CD3ζ The primary signal domain.

In a preferred embodiment, the chimeric antigen receptor includes an antibody, a transmembrane region and an intracellular signal region connected in the following order:
  The antibody of the first or second aspect of the present invention, the transmembrane region of CD8, and the primary signal domain of CD3ζ;
  The antibody of the first or second aspect of the present invention, the transmembrane region of CD8, the intracellular signal domain of CD137 and the primary signal domain of CD3ζ;
  The antibody of the first or second aspect of the present invention, the transmembrane region of CD28, the intracellular signal domain of CD28, and the primary signal domain of CD3ζ; or
  The antibody of the first or second aspect of the present invention, the transmembrane region of CD28, the intracellular signal domain of CD28, the intracellular signal domain of CD137, and the primary signal domain of CD3ζ.

In a preferred embodiment, the chimeric antigen receptor has the sequence shown in SEQ ID NO: 9, 10, 55, 56, 57, 58, 59, 60, 61, 62, 63, 64, 65 or 66.

In the eleventh aspect, the present invention provides a nucleic acid encoding the chimeric antigen receptor of the tenth aspect of the present invention.

In the twelfth aspect, the present invention provides an expression vector comprising the nucleic acid of the eleventh aspect of the present invention.

In the thirteenth aspect, the present invention provides a virus comprising the vector of the twelfth aspect of the present invention.

In a preferred embodiment, the virus is a lentivirus or a retrovirus.

In the fourteenth aspect, the present invention provides the use of the chimeric antigen receptor of the tenth aspect of the present invention, or the nucleic acid of the eleventh aspect of the present invention, or the expression vector of the twelfth aspect of the present invention, or the virus of the thirteenth aspect of the invention for preparing a medicament for treating tumors. Preferably, the medicament is a medicament containing genetically modified immune cells.

In a preferred embodiment, the tumor is acute myeloid leukemia (AML), chronic myeloid leukemia (CML), chronic myeloid-monocytic leukemia (CMML), myelodysplastic syndrome (MDS), multiple myeloma or myelofibrosis.

In a preferred embodiment, the tumor is a CLL1-positive tumor.

In the fifteenth aspect, the present invention provides a genetically modified immune cell transduced with the nucleic acid of the eleventh aspect of the present invention, or the expression vector of the twelfth aspect of the present invention, or the virus of the thirteenth aspect of the present invention; or expressing the chimeric antigen receptor of the tenth aspect of the present invention.

In a preferred embodiment, the immune cells are preferably T lymphocytes, NK cells or NKT cells.

In a preferred embodiment, the genetically modified immune cell also expresses a second sequence other than the chimeric antigen receptor of the tenth aspect of the present invention, and the second sequence includes a cytokine, or another chimeric antigen receptor, or chemokine receptor, or siRNA that reduces PD-1 expression, or protein that blocks PD-L1, or TCR, or safety switch;
  Preferably, the cytokine includes one or more of IL-12, IL-15, IL-21 and type I interferon;
  Preferably, the chemokine receptor includes one or more of CCR2, CCR5, CXCR2 and CXCR4;
  Preferably, the safety switch includes one or more of iCaspase-9, Truncated EGFR and RQR8.

In the sixteenth aspect, the present invention provides the use of the immune cell of the seventeenth aspect of the present invention, and the genetically modified immune cell is used to prepare a medicament for treating tumors.

In a preferred embodiment, the tumor is acute myeloid leukemia (AML), chronic myeloid leukemia (CML), chronic myelomonocytic leukemia (CMML), myelodysplastic syndrome (MDS), multiple myeloma or myelofibrosis.

In a preferred embodiment, the tumor is a CLL1-positive tumor.

In a seventeenth aspect, the present invention provides a pharmaceutical composition comprising:
  The antibody of the first or second aspect of the present invention or the nucleic acid encoding the antibody; or
  The immunoconjugate of the seventh aspect of the present invention or the nucleic acid encoding the conjugate; or
  The genetically modified immune cell of the fifteenth aspect of the present invention.

It should be understood that within the scope of the present invention, the above-mentioned technical features of the present invention and the technical features specifically described in the following (such as the embodiments) can be combined with each other to form a new or preferred technical solution. Due to space limitations, I will not repeat them here.

DESCRIPTION OF THE DRAWINGS

FIG. 1. shows the ELISA results of antibodies 4F2 and 25H8.

FIG. 2. shows Biacore™ assay results of antibodies 4F2 and 25H8.

MODES FOR CARRYING OUT THE INVENTION

Figure 3:
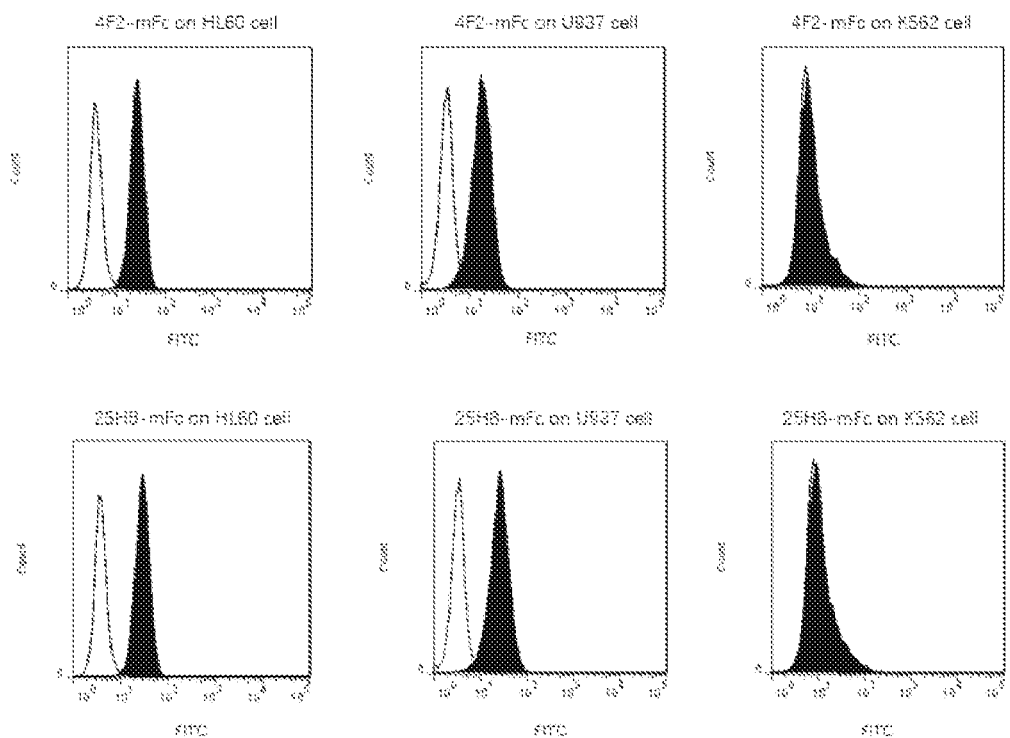
FIG. 3. shows the binding of 4F2 and 25H8 antibodies to HL60/U937 cells and k562 detected by FACs.

After extensive and in-depth research, the inventor developed an anti-CLL1 antibody with a high specificity and good binding ability, based on which the present invention was completed.

The scientific and technological terms used herein have the same or similar meanings as those commonly understood by those skilled in the art. To facilitate the understanding of the present invention, some terms are defined as follows.

The term "CLL1" in the present invention refers to "C-Type Lectin-Like Molecule-1", which is a type II transmembrane protein. In a specific embodiment, CLL1 refers to human CLL1.

The term "antibody" herein refers to an antigen binding protein of the immune system. The term "antibody" as mentioned herein includes a complete full-length antibody having an antigen-binding region and any fragment thereof having the "antigen-binding portion" or "antigen-binding region" being retained therein, or a single chain thereof, such as a single-chain variable fragment (scFv). A natural antibody refers to a glycoprotein comprising at least two heavy (H) chains and two light (L) chains or antigen-binding fragments thereof interconnected by disulfide bonds. The term "antibody" also includes all recombinant forms of an antibody (especially the antibody described herein), such as an antibody expressed in prokaryotic cells, unglycosylated antibody, and antigen-bound antibody fragments and derivatives described below. Each heavy chain consists of a heavy chain variable region (abbreviated as VH herein) and a heavy chain constant region. Each light chain consists of a light chain variable region (abbreviated as VL herein) and a light chain constant region. VH and VL can be further subdivided into hypervariable regions called complementarity determining regions (CDR), which are interspersed in more conserved regions called framework regions (FR). Each VH and VL consists of three CDRs and four FRs, which are arranged in the following order from the amino terminal to the carboxy terminal: FR1, CDR1, FR2, CDR2, FR3, CDR3, FR4. The variable regions of the heavy and light chains contain a binding domain interacting with antigens. The constant region of the antibody can mediate the binding of the immunoglobulin to host tissues or factors, including various cells of the immune system (such as effector cells) and the first component (C1q) of the classical complement system.

Antibody fragments include but are not limited to: (i) Fab fragments consisting of VL, VH, CL and CH1 domains, including Fab' and Fab'-SH, (ii) Fd fragments consisting of VH and CH1 domains, (iii) Fv fragment consisting of VL and VH domains of a single antibody; (iv) dAb fragment consisting of a single variable region (Ward et al., 1989, Nature 341:544-546); (v) F(ab')$_2$ fragment, a bivalent fragment containing two linked Fab fragments; (vi) a single-chain Fv molecule antigen binding site (Bird et al., 1988, Science 242:423-426; Huston et al., 1988, Proc. Natl. Acad. Sci. USA 85:58795883); (vii) a bispecific single-chain Fv dimer (PCT/US92/09965); (viii) "disome" or "trisome", multivalent or multispecific fragment constructed by gene fusion (Tomlinson et al., 2000, Methods Enzymol. 326:461-479; WO94/1380; Holliger et al., 1993, Proc. Natl. Acad. Sci. USA 90:6444-6448); and (ix) scFv genetically fused with the same or different antibodies (Coloma & Morrison, 1997, Nature Biotechnology 15,159163).

The term "parent antibody" or "parent immunoglobulin" as used herein includes an unmodified antibody, which can be further modified to produce variants. The parent antibody may be a naturally-occurring antibody, or a variant or engineered version of a naturally-occurring antibody. The parent antibody may refer to an antibody itself, a composition comprising the parent antibody, or the encoding amino acid sequence thereof. The term "parent antibody" or "parent immunoglobulin" as used herein includes a murine antibody which can be further modified to produce a humanized antibody or a chimeric antibody.

The term "variant antibody" or "antibody variant" as used herein includes an antibody sequence that differ from the parent antibody sequence due to at least one amino acid modification compared with the parent. The variant antibody sequence herein preferably has at least about 80%, most preferably at least about 90%, and more preferably at least about 95% amino acid sequence identity with the parent antibody sequence. Antibody variants can refer to the antibody itself, a composition comprising the parent antibody, or the encoding amino acid sequence thereof.

The term "variant" as used herein includes an antibody sequence that differs from the parent antibody sequence due to at least one amino acid modification compared with the parent. In a specific embodiment, the variant antibody sequence herein has at least about 80%, preferably at least about 90%, more preferably at least about 95%, more preferably at least about 97%, more preferably at least about 98%, and most preferably at least about 99% amino acid sequence identity with the parent antibody sequence. Antibody variants can refer to the antibody itself, a composition comprising the parent antibody, or the encoding amino acid sequence thereof. The term "amino acid modification" includes amino acid substitutions, additions, and/or deletions, and "amino acid substitution" refers to replacing an amino acid at a specific position in the parent polypeptide sequence with another amino acid. For example, the substitution R94K refers to the replacement of arginine at position 94 by lysine, and "amino acid insertion" as used herein refers to the addition of an amino acid at a specific position in the parent polypeptide sequence. "Amino acid deletion" or "deletion" as used herein refers to the removal of an amino acid at a specific position in the parent polypeptide sequence.

All positions in the immunoglobulin heavy chain constant region discussed in the present invention are numbered according to Kabat's EU index (Kabat et al., 1991, sequences of proteins of immunological interest, 5th edition, United States Public Health Service, National Institutes of Health, Bethesda, integrated by reference). "Kabat's EU index" refers to the residue numbering of the human IgG1 EU antibody, as described in Edelman et al., 1969, Biochemistry 63:78-85.

The term "antigenic determinant" used herein is also called an epitope, which can be composed of a continuous sequence of the CLL1 protein sequence, or can be composed of a three-dimensional structure in which the CLL1 protein sequence is not continuous.

The term "single domain antibody" refers to an antibody fragment comprising all or part of the heavy chain variable domain of an antibody, or an antibody fragment comprising all or part of the light chain variable domain. For example, only one heavy chain variable region (VHH) is included.

The term "immune cells", also known as "immune effector cells", refers to cells that participate in immune responses and produce immune effects, such as T cells, B cells, natural killer (NK) cells, natural killer T (NKT) cells, and dendritic cells, CIK cells, macrophages, mast cells, and the like. In some embodiments, the immune effector cells are T cells, NK cells, NKT cells. In some embodiments, the T cell may be an autologous T cell, a heterologous T cell, or an allogeneic T cell. In some embodiments, the NK cells may be allogeneic NK cells.

The term "chimeric antigen receptor" or "CAR" as used herein refers to a polypeptide comprising an extracellular domain capable of binding an antigen, a transmembrane domain, and a polypeptide that transmits cytoplasmic signals to the structural domain (i.e., intracellular signal domain). Signal domain refers to a protein that transmits information into the cell to regulate cell activity by generating a second messenger through a certain signal transduction pathway, or a protein that functions as an effector by corresponding to such a messenger, including the primary signal domain. And a CAR may include functional signal transduction domains derived from the stimulatory molecules defined below (i.e., co-stimulatory signal domains). The intracellular signal domain generates signals that can promote the immune effector function of CAR cells (such as CAR T cells). Examples of immune effector functions, such as in CAR T cells, include cytolytic activity and auxiliary activity, including cytokine secretion.

The term "primary signal domain" modulates the initial activation of a TCR complex in a stimulating manner. On the one hand, the primary signal domain is triggered by, for example, the binding of the TCR/CD3 complex and peptide-loaded MHC molecules, thereby mediating T cell responses (including but not limited to proliferation, activation, differentiation, etc.). The primary signaling domain that acts in a stimulatory manner may contain an immunoreceptor tyrosine activation motif or the signaling motif of ITAM. Examples of ITAM-containing primary signal domains that are particularly useful in the present invention include, but are not limited to, a sequence derived from TCRξ, FcRγ, FcRβ, CD3γ, CD3δ, CD3ε, CD5, CD22, CD79a, CD79b, CD278 (also known as "ICOS") and CD66d. In a specific CAR of the present invention, the intracellular signaling domain in any one or more of the CARs of the present invention includes an intracellular signaling sequence, such as the primary signaling domain of CD3ι.

The term "co-stimulatory signal domain" refers to a "co-stimulatory molecule", which is a related binding partner on T cells and specifically binds to a costimulatory ligand, thereby mediating the co-stimulatory response of T cells, for example, but not limited to, proliferation. Co-stimulatory molecules are non-antigen receptor cell surface molecules or ligands thereof required for effective immune response. Co-stimulatory molecules include, but are not limited to, MHC I molecules, BTLA and Toll ligand receptors, and OX40, CD2, CD27, CD28, CDS, ICAM-1, LFA-1 (CD11a/CD18) and 4-1BB (CD137).

In the present invention, in one aspect, the CAR comprises a chimeric fusion protein comprising an extracellular antigen recognition domain, a transmembrane domain, and an intracellular signaling domain, and the intracellular signaling domain contains a functional signaling domain derived from a stimulatory molecule. In one aspect, the CAR comprises a chimeric fusion protein, the protein comprising an extracellular antigen recognition domain, a transmembrane domain, and an intracellular signaling domain, and the intracellular signaling domain contains a functional signaling domain derived from a co-stimulatory molecule and a functional signaling domain derived from a stimulatory molecule. In one aspect, the CAR comprises a chimeric fusion protein comprising an extracellular antigen recognition domain, a transmembrane domain, and an intracellular signaling domain, and the intracellular signaling domain comprises at least two functional signaling domains derived from one or more co-stimulatory molecules and a functional signaling domain derived from a stimulating molecule. In one aspect, the CAR contains an optional leader sequence at the amino acid (ND end) of the CAR fusion protein. In one aspect, the CAR also contains a leader sequence at the N-terminus of the extracellular antigen recognition domain, where the leader sequence is optionally cut from the antigen recognition domain (such as scFv) during the cellular processing and localization of the CAR to the cell membrane.

The term "CD3ξ" herein is defined as the protein provided by GenBan accession number BAG36664.1, or equivalent residues from non-human species such as mice, rodents, monkeys, apes and the like. "CD3ξ domain" is defined as the amino acid residues from the cytoplasmic domain of the ξ chain, which are sufficient to functionally transmit the initial signal required for T cell activation. On the one hand, the cytoplasmic domain of ξ includes residues 52 to 164 of GenBan accession number BAG36664.1, and equivalent residues of functional orthologues thereof from non-human species such as mice, rodents, monkeys, apes, etc.

The term "4-1BB" herein refers to a member of the TNFR superfamily, which has the amino acid sequence of GenBankAcc.No.AAA62478.2, or equivalent residues from non-human species such as mice, rodents, monkeys, apes, etc.; "4-1BB co-stimulatory domain" is defined as the amino acid sequence 214-255 of GenBankACC.No.AAA62478.2, or equivalent residues from non-classified species such as mice, rodents, monkeys, apes, etc. In one aspect, the "4-1BB co-stimulatory domain" is the sequence provided in SEQ ID NO: 23, or equivalent residues from a non-human species, such as mouse, rodent, monkey, ape and the like.

The term "interferon" as used herein refers to a full-length interferon, or interferon fragments (truncated interferon) or interferon mutants substantially retaining the biological activity of full-length wild-type interferon (e.g., at least 80%, preferably at least 90%, more preferably at least 95%, 98%, or 99%). Interferons include type I interferon (e.g., interferon α and interferon β) and type II interferon (e.g., interferony).

In some cases, "T cells" may be pluripotent stem cells derived from bone marrow, which differentiate and mature into mature T cells with immunological activity in the thymus. In some cases, "T cells" may be cell populations with specific phenotypic characteristics, or mixed cell populations with different phenotypic characteristics, for example, "T cells" may be cells containing at least one T cell subpopulation: stem cell-like memory T cells (Tscm cells), central memory T cells (Tcm), effector T cells (Tef, Teff), regulatory T cells (tregs) and/or effector memory T cells (Tem). In some cases, "T cells" may be T cells of a specific subtype, such as γδ T cells.

T cells can be obtained from many sources, including PBMC, bone marrow, lymph node tissue, umbilical cord blood, thymus tissue, and tissue from infection sites, ascites, pleural effusion, spleen tissue, and tumors. In some cases, any number of techniques known to a skilled person in the art, such as Ficoll™ isolation, can be used to obtain T cells from blood collected from an individual. In one embodiment, cells from the circulating blood of the individual are obtained by apheresis collection. Apheresis products usually contain lymphocytes, including T cells, monocytes, granulocytes, B cells, other nucleated white blood cells, red blood cells and platelets. In one embodiment, the cells collected by apheresis collection can be washed to remove plasma molecules and placed in a suitable buffer or medium for subsequent processing steps. Alternatively, cells can be derived from healthy donors, from patients diagnosed with cancer.

The antibody or variants thereof of the present invention can be applied to prepare various targeted anti-tumor drugs and drugs for diagnosis of tumors, especially to prepare immune effector cells targeting CLL1.

Antibody Against CLL1

In the present disclosure, antigen binding proteins with scFv-based antigen binding regions are described, including antibodies. The scFv can be selected from the human scFv phage display library. These molecules display fine specificity. For example, the antibody can stably recognize HL60 and U937 cells, but not k562 cells.

In some embodiments, the present invention includes an antibody having a scFv sequence, which is fused to one or more heavy chain constant regions to form an antibody with human immunoglobulin Fc regions to produce bivalent proteins, thereby increasing the overall affinity and stability of the antibody. In addition, the Fc part allows other molecules (including but not limited to fluorescent dyes, cytotoxins, radioisotopes, etc.) to be directly conjugated with an antibody used in antigen quantification studies, so as to immobilize antibodies for affinity measurement and for targeted delivery of therapeutic drugs, the use of immune effector cells to test Fc-mediated cytotoxicity and many other applications.

The results provided herein highlight the specificity, sensitivity and utility of the antibodies of the invention in targeting CLL1.

The molecules of the present invention are based on the use of phage display to identify and select single-chain variable fragments (scFv), the amino acid sequence of which renders the molecule specificity for CLL1 and forms the basis of all antigen binding proteins of the present disclosure. Therefore, the scFv can be used to design a series of different "antibody" molecules, including, for example, full-length antibodies, fragments such as Fab and F(ab')2, fusion proteins (including scFv_Fc), multivalent antibodies, that is, antibodies with more than one specificities to the same antigen or different antigens, for example, bispecific T cell-binding antibodies (BiTE™), tri-antibodies, etc. (Cuesta et al., Multivalent antibodies: when design surpasses evolution, Trends in Biotechnology 28:355-362, 2010).

In an embodiment where the antigen binding protein is a full-length antibody, the heavy and light chains of the antibody of the invention may be full-length (for example, the antibody may include at least one and preferably two complete heavy chains, and at least one and preferably two complete light chains) or may include an antigen binding portion (Fab, F(ab')2, Fv or scFv). In other embodiments, the heavy chain constant region of an antibody is selected from, for example, IgG1, IgG2, IgG3, IgG4, IgM, IgA1, IgA2, IgD, or IgE. The selection of antibody type will depend on the immune effector function to be triggered by the designed antibody. When constructing recombinant immunoglobulins, suitable amino acid sequences of the constant regions of various immunoglobulin isotypes and methods for generating a wide variety of antibodies are known to a skilled person in the art.

In the first aspect, the present invention provides an antibody or fragment thereof binding to CLL1, wherein the antibody comprises:

HCDR1 shown in $SYX_1MX_2$, HCDR2 shown in $X_3X_4X_5X_6SGGSTX_7YAX_8X_9X_{10}X_{11}G$ (SEQ ID NO. 74), HCDR3 shown in SEQ ID NO: 40 or 41, and LCDR1 shown in $RASQSISSX_{12}LX_{13}$ (SEQ ID NO. 75), LCDR2 shown in $X_{14}ASX_{15}LX_{16}S$ (SEQ ID NO: 80), LCDR3 shown in $QQX_{17}YSX_{18}PX_{19}X_{20}T$ (SEQ ID NO: 81), in which, $X_1$ is selected from A or Y, $X_2$ is selected from S or H, $X_3$ is A or I, $X_4$ is selected from I or F, $X_5$ is selected from S or N, $X_6$ is selected from G or P, $X_7$ is selected from Y or S, $X_8$ is selected from D or Q, $X_9$ is selected from S or K, $X_{10}$ is selected from V or F, $X_{11}$ is selected from K or Q, $X_{12}$ is selected from W or Y, $X_{13}$ is selected from A or N, $X_{14}$ is selected from D or V, $X_{15}$ is selected from N or S, $X_{16}$ is selected from E or Q, $X_{17}$ is selected from Y or S, $X_{18}$ is selected from Y or T, $X_{19}$ is selected from M or L, $X_{20}$ is selected from I or absent.

In a preferred embodiment, it comprises a heavy chain CDR1 comprising any amino acid sequence of SEQ ID NO: 35, 36, and/or a heavy chain CDR2 comprising any amino acid sequence of SEQ ID NO: 37, 38, 39, and/or a heavy chain CDR3 comprising any amino acid sequence of SEQ ID NO: 40 and 41. In another aspect, the present invention provides an antibody binding to CLL1 or a fragment thereof, which comprises a light chain CDR1 comprising any amino acid sequence of SEQ ID NO: 42, 43, 44, and/or comprises a light chain CDR2 of any amino acid sequence of SEQ ID NO: 45, 46, 47, 48, and/or a light chain CDR3 of any amino acid sequence of SEQ ID NO: 49, 50. In another aspect, the present invention provides an antibody binding to CLL1 or a fragment thereof, which comprises a heavy chain CDR1 comprising any amino acid sequence of SEQ ID NO: 35, 36, and/or a heavy chain CDR2 comprising any amino acid sequence of SEQ ID NO: 37, 38, 39, and/or a heavy chain CDR3 comprising any amino acid sequence of SEQ ID NO:

40, 41, and/or a light chain CDR1 comprising any amino acid sequence of SEQ ID NO: 42, 43, 44, and/or a light chain CDR2 comprising any amino acid sequence of SEQ ID NO: 45, 46, 47, 48, and/or a light chain CDR3 comprising any amino acid sequence of SEQ ID NO: 49, 50. Preferably, the antibody binding to CLL1 or a fragment thereof comprises a heavy chain CDR1 comprising any amino acid sequence of SEQ ID NO: 35, 36, a heavy chain CDR2 comprising any amino acid sequence of SEQ ID NO: 37, 38, 39, and a heavy chain CDR3 comprising any amino acid sequence of SEQ ID NO: 40, 41, and/or a light chain CDR1 comprising any amino acid sequence of SEQ ID NO: 42, 43, 44, a light chain CDR2 comprising any amino acid sequence of SEQ ID NO: 45, 46, 47, 48, and a light chain CDR3 of any amino acid sequence of SEQ ID NO: 49, 50. More preferably, the antibody binding to CLL1 or a fragment thereof comprises a heavy chain CDR1 comprising any amino acid sequence of SEQ ID NO: 35, 36, a heavy chain CDR2 comprising any amino acid sequence of SEQ ID NO: 37, 38, 39, a heavy chain CDR3 comprising any amino acid sequence of SEQ ID NO: 40, 41, and a light chain CDR1 comprising any amino acid sequence of SEQ ID NO: 42, 43, 44, a light chain CDR2 of any amino acid sequence of SEQ ID NO: 45, 46, 47, 48, and a light chain CDR3 of any amino acid sequence of SEQ ID NO: 49, 50.

In another aspect, the present invention provides an antibody binding to CLL1 or a fragment thereof, which comprises a heavy chain variable region sequence selected from SEQ ID NO: 1, 5, 13, 67, 68, 69.

In another aspect, the present invention provides an antibody binding to CLL1 or a fragment thereof, which comprises a light chain variable region sequence selected from the group consisting of SEQ ID NO: 3, 7, 11, and 15.

Considering that each of these heavy chain and light chain variable region sequences can bind to CLL1, the heavy chain and light chain variable region sequences can be "mixed and matched" to produce an anti-CLL1 binding molecule of the present invention.

In another aspect, the invention provides variants of an antibody binding to CLL1 or a fragment thereof. Therefore, the present invention provides an antibody or a fragment thereof having heavy and/or light chain variable regions that are at least 80% identical to the variable region sequence of the heavy chain or light chain. Preferably, the amino acid sequence identity of the heavy chain and/or light chain variable region is at least 85%, preferably at least 90%, more preferably at least 95%, more preferably 96%, more preferably 97%, more preferably 98%, the most preferably 99%, including, for example, 80%, 81%, 82%, 83%, 84%, 85%, 86%, 87%, 88%, 89%, 90%, 91%, 92%, 93%, 94%, 95%, 96%, 97%, 98%, 99% and 100%. Variants can be obtained by methods such as yeast library screening, phage library screening, and point mutation using the antibody described in the present application as a parent antibody.

In another aspect, the antibody LCDR1 provided in the present invention is mutated from RASQSISSX$_{12}$LX$_{13}$ (SEQ ID NO. 75) to RASQWIARX$_{12}$LX$_{13}$ (SEQ ID NO. 79). For example, the sequence of the mutated LCDR1 is shown in SEQ ID NO: 44.

In another aspect, the X$_3$X$_4$X$_5$X$_6$ in the antibody HCDR2 "X$_3$X$_4$X$_5$X$_6$SGGSTX$_7$YAX$_8$X$_9$X$_{10}$X$_{11}$G" (SEQ ID NO. 74) provided in the present invention is selected from AISG (SEQ ID NO. 76) or IFNP (SEQ ID NO. 77).

In another aspect, the antibody HCDR2 is mutated from X$_3$X$_4$X$_5$X$_6$SGGSTX$_7$YAX$_8$X$_9$X$_{10}$X$_{11}$G (SEQ ID NO. 74) to X$_3$X$_4$X$_5$X$_6$GGGSTX$_7$YAX$_8$X$_9$X$_{10}$X$_{11}$G (SEQ ID NO. 78). For example, the sequence of the mutated HCDR2 is shown in SEQ ID NO: 39.

In another aspect, the heavy chain variable region of the antibody of the present invention can be mutated. For example, the heavy chain variable region is mutated from SEQ ID NO: 13 to SEQ ID NO: 67, 68, or 69.

In another aspect, the present invention provides an antibody recognizing the same epitope as the aforementioned anti-CLL1 antibody.

Properties of Anti-CLL1 Antibody

Standard assays to assess the binding ability of antibodies, such as antibodies against CLL1, are known in the art and include, for example, ELISA, Biacore™, Western blot, and flow cytometry analysis. Suitable assays are described in detail in the examples.

Nucleic Acids, Vectors and Host Cells

The present invention also provides isolated nucleic acids and vectors encoding antibodies that bind to CLL1 and fragments thereof, and host cells containing the nucleic acids or vectors. The nucleic acid can be located in intact cells, in a cell lysate, or in a partially purified or substantially purified form.

Standard molecular biology techniques can be used to obtain the nucleic acid of the present invention. For example, standard PCR amplification or cloning techniques can be used to obtain cDNAs encoding the light chain and heavy chain of an antibody or encoding the VH and VL segments. For antibodies obtained from an immunoglobulin gene library (for example, using phage display technology), one or more nucleic acids encoding the antibody can be recovered from the library. The method for introducing exogenous nucleic acids into a host cell is generally known in the art and can vary with the host cell used.

Preferred nucleic acid molecules of the present invention are those selected from SEQ ID NO: 2, 6, 14 that encode the variable region of the heavy chain, and/or those selected from SEQ ID NO: 4, 8, 12, 16 that encode the variable region of the light chain. More preferred are nucleic acid molecules comprising the sequence of SEQ ID NO: 2 encoding the heavy chain, and the sequence of SEQ ID NO: 4 encoding the light chain or the sequence of SEQ ID NO: 6 encoding the heavy chain, and comprising the SEQ ID NO: 8 sequence encoding the light chain or the SEQ ID NO: 2 sequence encoding the heavy chain, and the SEQ ID NO: 12 sequence encoding the light chain or the SEQ ID NO: 14 sequence encoding the heavy chain, and the SEQ ID NO: 16 sequence encoding the light chain.

For expressing a protein, the nucleic acid encoding the antibody of the present invention can be integrated into an expression vector. A variety of expression vectors can be used for protein expression. Expression vectors can include self-replicating extrachromosomal vectors, or vectors integrated into the host genome. Expression vectors used in the present invention include, but are not limited to, those that can be used to express a protein in mammalian cells, bacteria, insect cells, yeast, and in vitro systems. As known in the art, a variety of expression vectors are commercially available or otherwise. It can be used in the present invention to express antibodies.

Immunoconjugate

The present invention also provides a multifunctional immunoconjugate, comprising the antibody described herein and further comprising at least one other type of functional molecule. The functional molecules are selected from but not limited to: molecules targeting tumor surface markers, tumor-suppressing molecules, molecules targeting immune cell surface markers or detectable markers. The antibody and the functional molecule can form a conjugate by covalent connection, coupling, attachment, cross-linking and the like.

As a preferred embodiment, the immunoconjugate may comprise: the antibody of the present invention and at least one molecule targeting a tumor surface marker or a tumor-inhibiting molecule. The tumor-inhibiting molecule may be an anti-tumor cytokine or an anti-tumor toxin; and preferably, the cytokine includes (but not limited to): IL-2, IL-7, IL-12, IL-15, Type I IFN, TNF-alpha. In a specific embodiment, the molecule targeting a tumor surface marker is a molecule targeting the same tumor surface marker as that targeted by the antibody of the present invention. For example, the tumor surface marker-targeting molecule may be an antibody or a ligand binding to the tumor surface marker, and for example, it can act synergistically with the antibody of the present invention to more accurately target tumor cells.

As a preferred embodiment, the immunoconjugate may comprise: the antibody of the present invention and a detectable label. The detectable labels include, but are not limited to: fluorescent labels, chromogenic labels; such as: enzymes, prosthetic groups, fluorescent materials, luminescent materials, bioluminescent materials, radioactive materials, positron emitting metals, and non-radioactive paramagnetic metal ions. More than one markers can be also comprised. The label used to label the antibody for the detection and/or analysis and/or diagnostic purposes depends on the used specific detection/analysis/diagnostic technique and/or method, such as immunohistochemical staining (tissue), flow cytometry, etc. Suitable labels for detection/analysis/diagnostic techniques and/or methods known in the art are well known to a skilled person in the art.

As a preferred embodiment, the immunoconjugate may comprise: the antibody of the present invention and a molecule targeting the surface marker of immune cells. The molecule targeting the surface markers of immune cells can be an antibody or a ligand binding to the surface markers of immune cells, and can recognize immune cells. The molecule will carry the antibody of the present invention to reach immune cells, and the antibody of the present invention can be used for targeting immune cells to tumor cells, thereby triggering specifically killing to tumors by immune cells. The immune cell surface marker can be selected from CD3, CD16, CD28, and more preferably, the antibody binding to the immune cell surface marker is an anti-CD3 antibody. Immune cells can be selected from T cells, NK cells, or NKT cells.

As a way of chemically producing immunoconjugates by direct or indirect (for example, through a linker) conjugation, the immunoconjugates can be produced as a fusion protein, and the fusion protein comprises the antibody of the present invention and suitable others protein. The fusion protein can be recombinantly produced by methods known in the art, for example, by constructing a nucleic acid molecule and then expressing the nucleic acid molecule. The nucleic acid molecule comprises a nucleotide sequence encoding an antibody in frame and a nucleotide sequence encoding a suitable label.

In another aspect, the present invention provides a nucleic acid molecule encoding at least one antibody the present invention, a functional variant or immunoconjugate thereof. Once the relevant sequence is obtained, the recombination method can be used to obtain the relevant sequence in large quantities. The nucleic acid molecule is usually cloned into a vector, the vector is transferred into a cell, and then the relevant sequence is isolated from the proliferated host cell by conventional methods.

The present invention also relates to a vector containing the above-mentioned appropriate DNA sequence and an appropriate promoter or control sequence. These vectors can be used to transform appropriate host cells so as to express proteins. The host cell can be a prokaryotic cell, such as a bacterial cell; or a lower eukaryotic cell, such as a yeast cell; or a higher eukaryotic cell, such as a mammalian cell.

Chimeric Antigen Receptor Containing Anti-CLL1 Antibody

The present invention also provides a variety of chimeric antigen receptors (CAR) comprising the antibody or antibody fragments of the present invention, and the CAR-T cell exhibits anti-tumor properties. In some embodiments, a viral vector encoding CAR is used to transduce cells (such as T cells). In some embodiments, the viral vector is a lentiviral vector. In some embodiments, the cell can stably express CAR(s).

In a preferred embodiment, the CLL1-binding portion of a CAR is a scFv antibody fragment, which maintains equivalent affinity compared with the IgG antibody from which it is derived. For example, it binds to the same antigen with comparable efficacy. The antibody fragment is functional, thereby providing biochemical reactions, such as activating an immune response, inhibiting the initiation of signal transduction from a target antigen, inhibiting kinase activity, and the like. Therefore, the present invention provides a CLL1-CAR comprising a CCL1 binding domain that is engineered into T cells, and a method for using it in the adoptive immunotherapy.

In one aspect, the anti-CLL1 antigen-binding domain of the CAR is a humanized scFv antibody fragment compared with the murine sequence scFv from which it is derived.

In one aspect, the CAR of the present invention combines the antigen-binding domain of a specific antibody and intracellular signaling molecules. For example, in some aspects, intracellular signaling molecules include, but are not limited to, CD3g chains, 4-1BB and CD28 signaling modules, and combinations thereof.

In one aspect, CLL1-CAR comprises at least one intracellular signaling domain, which is selected from CD137 (4-1BB) signaling domain, CD28 signaling domain, CD3g signaling domain, and any combination thereof. In one aspect, CLL1-CAR comprises at least one intracellular signaling domain derived from one or more non-CD137 (4-1BB) or CD28 co-stimulatory molecules.

As an example, the sequence of CLL1-CAR may be 4F2 28Z (SEQ ID NO: 55), 4F2 BBZ (SEQ ID NO: 56), 4F2 28BBZ (SEQ ID NO: 57), 25H8 28Z (SEQ ID NO: 58)), 25H8 BBZ (SEQ ID NO: 59), 25H8 28BBZ (SEQ ID NO: 60), 7F8 28Z (SEQ ID NO: 61), 7F8 BBZ (SEQ ID NO: 62), 7F8 28BBZ (SEQ ID NO: 63), 12G4m 28Z (SEQ ID NO: 64), 12G4m BBZ (SEQ ID NO: 65), 12G4m 28BBZ (SEQ ID NO: 66), 12G4m (M1331) 28Z (SEQ ID NO: 73), 12G4m (M1331) BBZ (SEQ ID NO: 9), 12G4m (M1331) 28BBZ (SEQ ID NO: 10), and the transmembrane domain and intracellular of the above-mentioned SEQ ID NO: 55-66, SEQ ID NO: 73, SEQ ID NO: 9-10 can be replaced by conventional transmembrane domains and intracellular domains which can be selected by a skilled person in the art, both of which will fall within the protection scope of the present application.

Chimeric Antigen Receptor-Modified T Cell

The present invention also provides immune cells comprising the chimeric antigen receptor of the present invention.

In another aspect, the chimeric antigen receptor-modified T cell provided in the present invention also carries a coding sequence of an exogenous cytokine; preferably, the cytokine includes: IL-12, IL-15 or IL-21. The immune cells are preferably T lymphocytes, NK cells or NKT cells.

On the other hand, the chimeric antigen receptor-modified T cell provided in the present invention also carries a PD-L1 blocker or a protein blocking PD-L1, such as natural PD-1, or a mutant PD-1 capable of binding to PD-L1, or fragments of natural or mutant PD-1 capable of binding to PD-L1, or anti-PD-L1 antibodies.

Pharmaceutical Composition

The antibody of the present invention, the immune conjugate comprising the antibody and the genetically modified immune cell can be applied to the preparation of a pharmaceutical composition or diagnostic reagent. In addition to an effective amount of the antibody, immune conjugate or immune cell, the composition may also include a pharmaceutically acceptable carrier. The term "pharmaceutically acceptable" means that, when the molecular entity and composition are properly administered to animals or humans, it will not produce adverse, allergic or other adverse reactions.

Specific examples of some substances that can be used as pharmaceutically acceptable carriers or components thereof are sugars, such as lactose, glucose, and sucrose; starches, such as corn starch and potato starch; cellulose and derivatives thereof, such as carboxymethyl celluose sodium, ethyl cellulose and methyl cellulose; tragacanth powder; malt; gelatin; talc; solid lubricants, such as stearic acid and magnesium stearate; calcium sulfate; vegetable oils, such as peanut oil, cottonseed oil, sesame oil, olive oil, corn oil, and cocoa butter; polyols, such as propylene glycol, glycerin, sorbitol, mannitol, and polyethylene glycol; alginic acid; emulsifiers, such as Tween; wetting agents, such as sodium lauryl sulfate; Coloring agents; flavoring agents; tablet presses, stabilizers; antioxidants; preservatives; pyrogen-free water; isotonic salt solutions; and phosphate buffers, etc.

The composition of the present invention can be prepared into various dosage forms according to needs, and a doctor can determine the beneficial dosage for a patient according to factors such as the patient's type, age, weight, general disease condition, and administration method. The mode of administration can be, for example, injection or other treatment methods.

Advantages of the Present Invention

1. The present invention provides specific antibodies against CLL1;
2. The antibody of the present invention exhibits a high affinity for CLL1, and after being prepared into a chimeric antigen receptor-modified T cell, it exhibits significant killing effects on cells expressing CLL1; and
3. The present invention provides a chimeric antigen receptor-modified T cell prepared by using the antibody. Therefore, the antibody and immune effector cell of the present invention can be safely and effectively used to treat acute myeloid leukemia.

The present invention will be further explained below in conjunction with specific embodiments. It should be understood that these embodiments are only used to illustrate the present invention and not to limit the scope of the present invention. The experimental methods that do not specify specific conditions in the following examples are usually based on conventional conditions such as those described in J. Sambrook et al., Molecular Cloning Experiment Guide, Third Edition, Science Press, 2002, or in accordance with the conditions described in manufacturing The conditions suggested by the manufacturer.

Example 1: Screening scFv Specific to CLL1 Using a Fully Human Phage Display Library The phage display library used in the present invention was a fully human natural scFv phage library constructed by the applicant, with a storage capacity of 1E+11. Using screening methods known to a skilled person in the art, scFv fragments that are highly specific to CLL1 were obtained. In short, 10 μg/ml of antigen CLL1-huFc (prepared by affinity purification of culture supernatant using protein A filler after eukaryotic expression) and human Fc segment were coated in immunotubes, respectively. For reducing the influence of the Fc segment, the phage library was added to the immunotubes coated with the human Fc segment for 1 hr. The supernatant was taken and added into a CLL1-huFc-coated immune tube for 1.5 hours, then the non-specific phages were washed off, and the bound phage were eluted, and used to infect E. coli TG1 in the logarithmic growth phase. The eluted phages were expanded and the expanded phage library was purified by PEG/NaCl precipitation for the next round of screening. The panning was performed for 3-4 cycles to enrich scFv phage clones specifically binding to CLL1. The positive clones were determined by the standard ELISA method for CLL1-huFc, and the ELISA detection map is shown in FIG. 1. In ELISA, human Fc fragment was used as an irrelevant antigen to verify the specificity of antibodies.

After screening, two clones specifically binding to HL60 and U937 cells (HL60/U937 are CLL1 positive cells, k562 are CLL1 negative cells) were obtained (FIG. 3), named 4F2 and 25H8. Biacore™ maps of 4F2 and 25H8 are shown in FIG. 2. After sequencing analysis, the heavy chain variable region of 4F2 is the amino acid sequence shown in SEQ ID NO: 1, the light chain variable region is the amino acid sequence shown in SEQ ID NO: 3; the heavy chain variable region of 25H8 is the amino acid sequence shown in SEQ ID NO: 5, and the light chain variable region is the amino acid sequence shown in SEQ ID NO: 7.

According to Kabat's EU index analysis, the amino acid sequence of HCDR1 of 4F2 is shown in SEQ ID NO: 35, the amino acid sequence of HCDR2 is shown in SEQ ID NO: 37, the amino acid sequence of HCDR3 is shown in SEQ ID NO: 40, the amino acid sequence of HCDR1 is shown in SEQ ID NO: 40, the amino acid sequence of LCDR1 is shown in SEQ ID NO: 42, the amino acid sequence of LCDR2 is shown in SEQ ID NO: 45, and the amino acid sequence of LCDR3 is shown in SEQ ID NO: 49.

The amino acid sequence of HCDR1 of 25H8 is shown in SEQ ID NO: 36, the amino acid sequence of HCDR2 is shown in SEQ ID NO: 38, the amino acid sequence of HCDR3 is shown in SEQ ID NO: 41, the amino acid sequence of LCDR1 is shown in SEQ ID NO: 43, the amino acid sequence of LCDR2 is shown in SEQ ID NO: 46, and the amino acid sequence of LCDR3 is shown in SEQ ID NO: 50.

Example 2: Affinity Maturation of Antibodies

Affinity maturation was performed by using phage display technology.

4F2 and 25H8 were used as parent antibodies, and random mutations were made in LCDR1 and LCDR2 of the light chain variable region, respectively, to construct a phage library with mature affinity. After two rounds of screening, single clones were selected for ELISA detection, and positive clones were sequenced and expressed and purified. Based on the above experiments, two antibodies, which have high affinity and specifically bind to human CLL1 were obtained, named 7F8 (derived from 4F2) and 12G4 (derived from 25H8) were obtained.

After sequencing analysis, the heavy chain variable region of 7F8 is the amino acid sequence shown in SEQ ID NO: 1, the light chain variable region is the amino acid sequence shown in SEQ ID NO: 11; the amino acid sequence of the heavy chain variable region of 12G4 is the amino acid sequence shown in SEQ ID NO: 5, and the light chain variable region is the amino acid sequence shown in SEQ ID NO: 15.

The sequence of LCDR1 of 7F8 is shown in SEQ ID NO: 44, the sequence of LCDR2 is shown in SEQ ID NO: 47, and the sequences of LCDR3 and the CDR regions of the heavy chain are the same as that of the parent antibody (4F2).

The sequence of LCDR1 of 12G4 is the same as that of 25H8, the sequence of LCDR2 is shown in SEQ ID NO: 48, and the sequences of LCDR3 and the CDR regions of heavy chain are the same as that of the parent antibody (25H8).

Among them, 12G4 comprises a glycosylation site in the CDR2 region of the heavy chain. After serine was mutated to glycine, a new antibody was obtained, named 12G4m, and the sequence of HCDR2 of 12G4m is shown in SEQ ID NO: 39.

The heavy chain variable region of 12G4m is the amino acid sequence shown in SEQ ID NO: 13, and the light chain variable region is the amino acid sequence shown in SEQ ID NO: 15.

Figure 4:
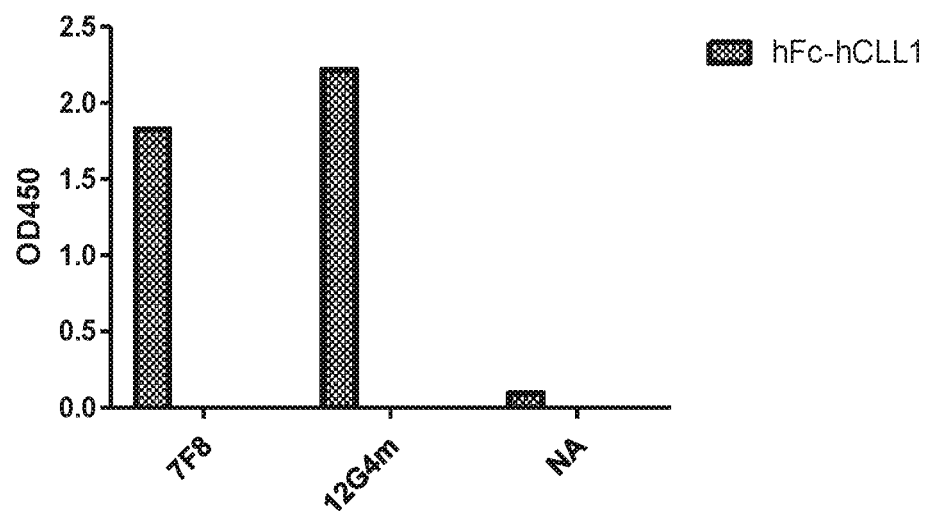
FIG. 4. shows the of ELISA results of antibodies 7F8 and 12G4m.

The binding of 7F8 and 12G4m scFV to human CLL1 was detected by ELISA, showing significant binding (see FIG. 4).

Figure 5:
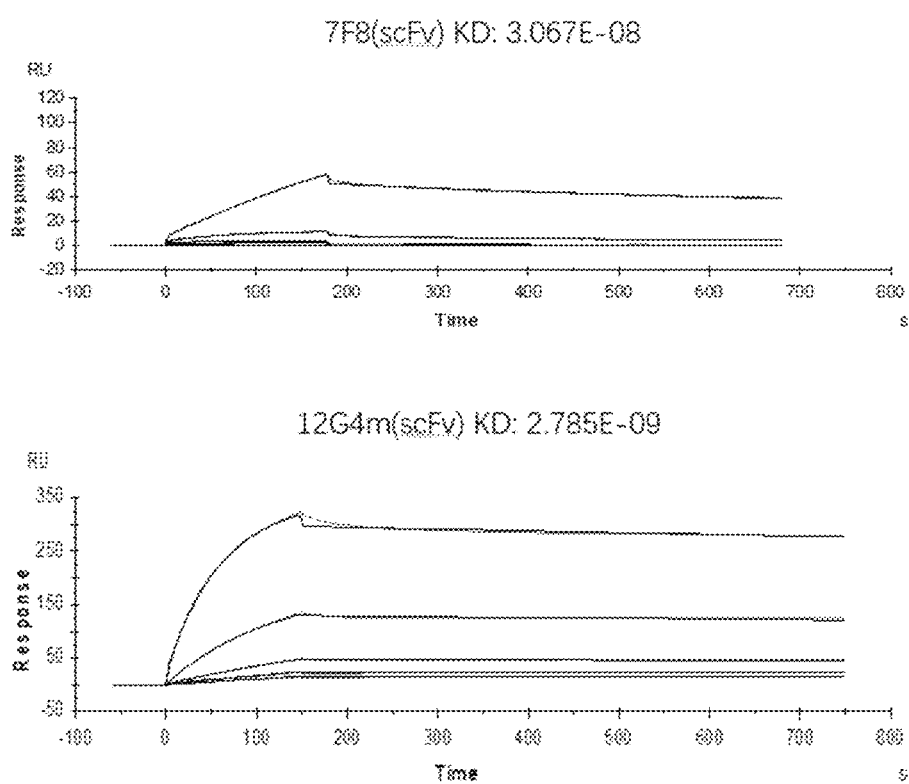
FIG. 5. shows Biacore™ assay results of antibodies 7F8 and 12G4m.

The 7F8 and 12G4m scFv were tested by Biacore™. The results are shown in FIG. 5, which show that the affinity is about 10 times higher than that of the parent antibody.

Figure 6:
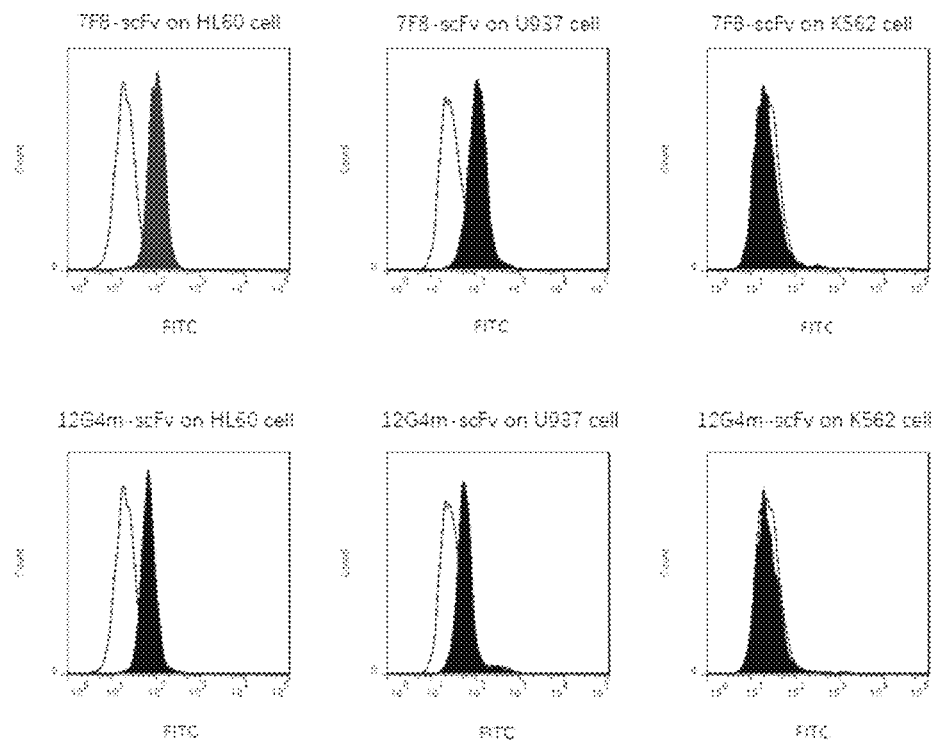
FIG. 6. shows the binding of antibodies 7F8 and 12G4m to HL60/U937 cells and k562 detected by FACs.

In ELISA, human Fc fragment was used as an irrelevant antigen to verify the specificity of antibodies. The specific binding of scFv of antibodies 7F8 and 12G4m to CLL1-positive cells is shown in FIG. 6. It can be seen that the antibodies can specifically bind to positive cells but not negative cells (HL60 and U937 are CLL1-positive cells, k562 are negative cells, which does not express CLL1).

Figure 7:
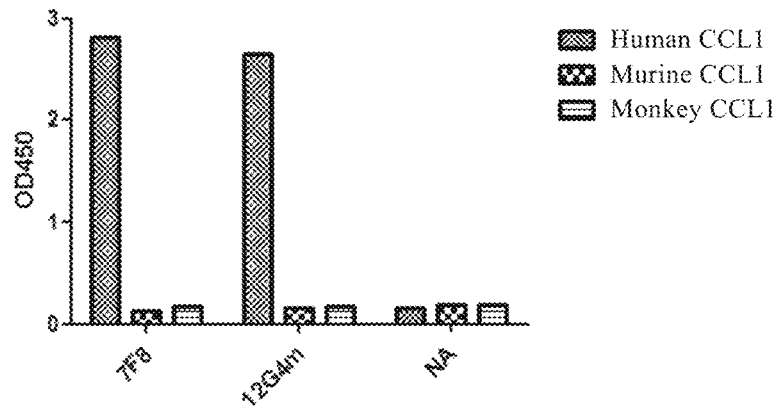
FIG. 7. shows ELISA results of the binding of antibodies 7F8 and 12G4m to human CLL1.

Example 3: Binding of 7F8 and 12G4m Antibodies to CLL1 of Different Species Detected by ELISA The species specificity of antibodies 7F8 and 12G4m was detected by standard ELISA. ELISA plates were coated with 1 μg/ml of Human CLL1-hFc, mouse CLL1-hFc, monkey CLL1-hFc at 4° C. overnight, blocked with 2% MPBS for 1-2 hours at room temperature, and 200 nM antibody 7F8/12G4m (scFv) was added to incubate at room temperature for 1 hour. The secondary antibody was diluted at 1:1000 with anti-His mouse monoclonal antibody, and the third antibody was goat anti-mouse-HRP diluted at 1:2000. After incubating for 1 hour at room temperature, the plates were developed and read at OD450 after quenching with 1 M concentrated sulfuric acid, as shown in FIG. 7. Antibodies 7F8 and 12G4m only bind to human CLL1, but not to murine CLL1 and monkey CLL1.

Figure 8:
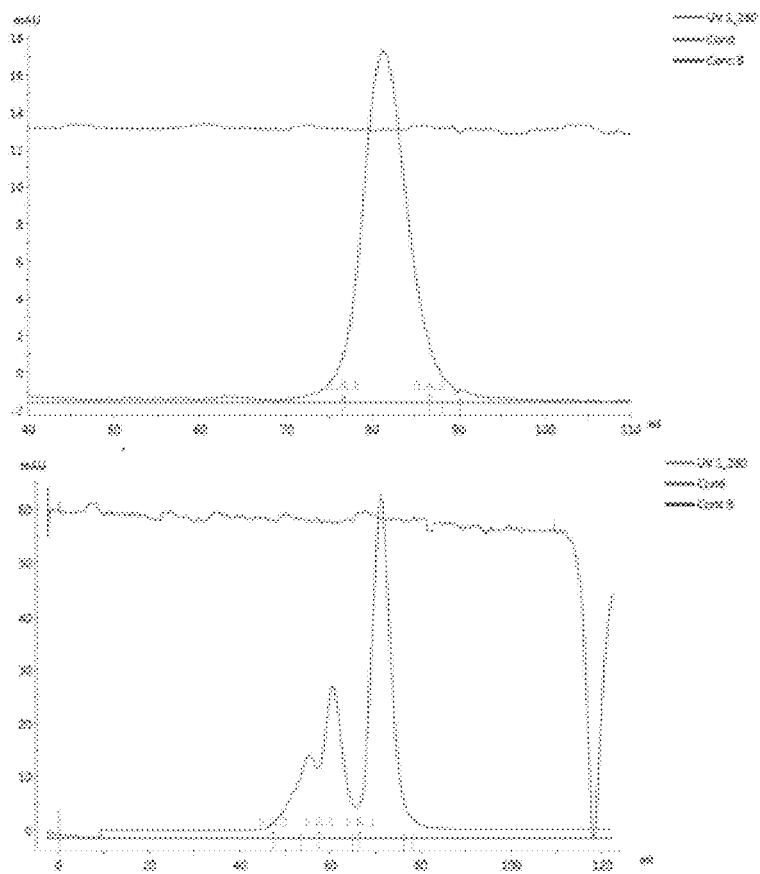
FIG. 8. shows the detection results of the monomer ratio of antibodies 7F8 and 12G4m.

Example 4: Construction of CLL1 Antibody scFv-Fc Format and Detection of Monomer Rate The anti-CLL1 antibodies 7F8 and 12G4m were fused with the Fc fragment of human IgG and expressed, and 293F cells were transfected with 293Fectin transfection reagent. The supernatant was collected on day 6, and the protein A was used for affinity purification. The purified protein was passed through GE XK16/40 empty chromatographic column, monomer peaks were collected, and monomer ratio was detected, wherein the monomer ratio of antibody 7F8 is 99.30%, and the monomer ratio of antibody 12G4m is 58.50%. The results are shown in FIG. 8.

Figure 9:
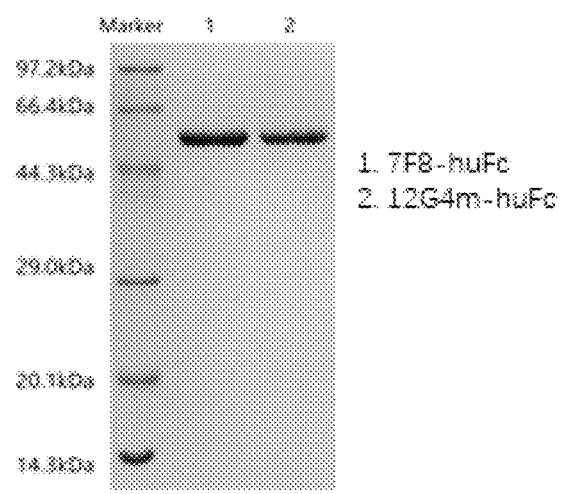
FIG. 9. shows the anti-CLL1 scFv_Fc antibody purified by SDS PAFE analysis (reducing conditions).

The antibody 7F8 protein was concentrated with a millipore ultrafiltration tube with a cut-off value of 10 KD, and the concentration was measured by OD280/extinction coefficient. The results are shown in Table 1; samples were taken for SDS-PAGE, and the results are shown in FIG. 9.

TABLE 1

| Protein | Volume (ml) | Concentration (mg/ml) | Total amount (mg) | Before molecular sieve (mg) | Recovery rate | monomer ratio |
|---|---|---|---|---|---|---|
| 7F8-huFc | 0.57 | 0.22 | 0.12 | 2.15 | 5.60% | 99.30% |
| 12G4m-huFc | 0.54 | 1.57 | 0.85 | 2.6 | 32.70% | 58.50% |

The 12G4m was modified to reduce polymerization. A 3D model of 12G4m was established through Discovery studio software, potential aggregation sites were analyzed and point mutations were performed on these sites through software prediction. The mutant antibody was fused with the Fc fragment of human IgG in a form of scFv-Fc and expressed in 293F cells. The expressed product was purified by SEC to detect the monomer rate. The results showed that three mutants with a monomer rate significantly better than that of 12G4m were obtained, in which the alanine at position 9 of the heavy chain variable region was mutated to proline (12G4m-A9P), valine at position 93 to isoleucine (12G4m-V93I), and methionine at position 113 to leucine (12G4m-M133I). Among them, the monomer rate of 12G4m-M133I was higher than 95%.

All of the mutation sites of 12G4m-A9P, 12G4m-V93I and 12G4m-M133I were present in the heavy chain variable region, and the sequences of the heavy chain variable region are shown in SEQ ID NO: 67, 68, 69, respectively.

The scFv sequence of 12G4m-A9P is shown in SEQ ID NO: 70, the scFv sequence of 12G4m-V93I is shown in SEQ ID NO: 71, and the scFv sequence of 12G4m-M133I is shown in SEQ ID NO: 72.

Example 5: Determining the Binding EC50 of Antibodies to U937 Cells by FACs

Figure 10:
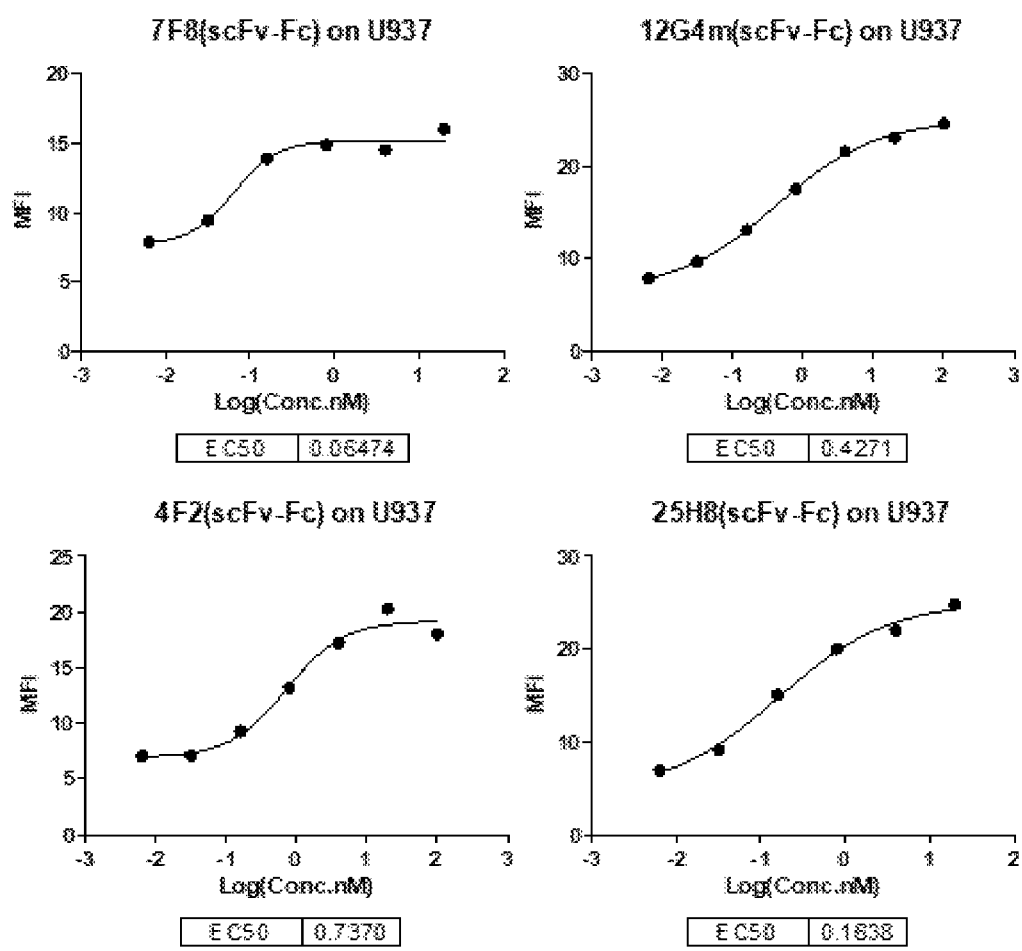
FIG. 10. shows the EC50 of antibodies 7F8, 12G4m, 4F2, 25H8 binding to U937 cells detected by FACs.

The EC50 of the anti-CLL1 antibody was detected by FACs using the scFv-Fc fusion protein obtained in Example 4. In particular 1×10$^5$ cells/well of U937 cells were added to a 96-well U-shaped bottom plate, and blocked with FcR blocking reagent at 4° for 30 mins. The cells were washed twice with 300 μL/well of 1% FBS, then 100 μL of gradient-diluted CLL1 antibody 7F8, 12G4m, 4F2, 25H8 (starting concentration of 1000 nmol/mL, 5-fold dilution, 7 concentration gradients) were added, mixed, and incubated at 4° C.

for 45 mins, and centrifuged to remove the supernatant. The cells were washed twice with 300 μL/well of 1% FBS. FITC-labeled Goat anti human Fc (Jackson ImmunoResearch, Code number: 109-095-098) was diluted for 200 times with 1% FBS and added to the cells, incubated at 4° C. for 45 minutes, and centrifuged to remove the supernatant. Cells were washed twice with 1% FBS at 300 L/well. Finally, the cells were resuspended in 1% FBS at 200 L/well and used for flow cytometry. As shown in FIG. 10, the EC50 values of the anti-human CLL1 antibodies 7F8, 12G4m, 4F2, and 25H8 were 0.06474 nM, 0.4271 nM, 0.7370 nM and 0.1638 nM, respectively, and all of the EC50 values were less than 1 nM, showing good cell binding effects.

Example 6: Construction of Anti-CLL1 Chimeric Antigen Receptor Plasmid (CAR)

a. Construction of Anti-CLL1 Antibody 7F8 Chimeric Antigen Receptor Plasmid

Lentiviral plasmids expressing the second-generation of chimeric antigen receptor of antibody 7F8 were constructed by using PRRLSIN-cPPT.EF-1α (purchased from Addgene) as a vector, including PRRLSIN-cPPT.EF-1α-7F8-28Z, PRRLSIN-cPPT.EF-1α-7F8-BBZ and PRRLSIN-cPPT.EF-1α-7F8-28BBZ.

The 7F8-28Z sequence consists of CD8α signal peptide (SEQ ID NO: 17), 7F8scFV (SEQ ID NO: 31), CD8 hinge (SEQ ID NO: 19), CD28 transmembrane region (SEQ ID NO: 51) and intracellular signaling domain (SEQ ID NO: 53) and CD3ξ (SEQ ID NO: 25); 7F8-BBZ sequence consists of CD8α signal peptide (SEQ ID NO: 17), 7F8scFV (SEQ ID NO: 31), CD8 hinge (SEQ ID NO: ID NO: 19), transmembrane region (SEQ ID NO: 21), CD137 intracellular signaling domain (SEQ ID NO: 23) and CD3ξ (SEQ ID NO: 25); and 7F8-28BBZ sequence consists of CD8α signal peptide (SEQ ID NO: 17), 7F8scFV (SEQ ID NO: 31), CD8 hinge (SEQ ID NO: 19), CD28 transmembrane region (SEQ ID NO: 51), intracellular signaling domain (SEQ ID NO: 53), CD137 intracellular signaling domain (SEQ ID NO: 23) and CD3ξ (SEQ ID NO: 25).

b. Construction of Chimeric Antigen Receptor Plasmid of Anti-CLL1 Antibody 12G4m Lentiviral plasmids expressing the second-generation of chimeric antigen receptor of antibody 12G4m were constructed by using PRRLSIN-cPPT.EF-1a as a vector, including PRRLSIN-cPPT.EF-1a-12G4m-28Z, PRRLSIN-cPPT.EF-1a-12G4m-BBZ and PRRLSIN-cPPT.EF-1a-12G4m-28BBZ.

The 12G4m-28Z sequence consists of CD8α signal peptide (SEQ ID NO: 17), 12G4m scFV (SEQ ID NO: 33), CD8 hinge (SEQ ID NO: 19), CD28 transmembrane region (SEQ ID NO: 51), intracellular signaling domain (SEQ ID NO: 53) and CD3ξ (SEQ ID NO: 25); 12G4m-BBZ sequence consists of CD8α signal peptide (SEQ ID NO: 17), 12G4m scFV (SEQ ID NO: 33), CD8 hinge (SEQ ID NO: 19), transmembrane region (SEQ ID NO: 21), CD137 intracellular signaling domain (SEQ ID NO: 23) and CD3ξ (SEQ ID NO: 25); and 12G4m-28BBZ sequence consists of CD8α signal peptide (SEQ ID NO: 17), 12G4m scFV (SEQ ID NO: 33), CD8 hinge (SEQ ID NO: 19), transmembrane region (SEQ ID NO: 21), CD137 intracellular signaling domain (SEQ ID NO: 23) and CD3ξ (SEQ ID NO: 25).

c. Construction of the Chimeric Antigen Receptor Plasmid of Anti-CLL1 Antibody 12G4m-M1331 (Also Written as 12G4m (M1331) Herein)

Lentiviral plasmids expressing the second-generation chimeric antigen receptor of antibody 12G4m-M1331 were constructed by using PRRLSIN-cPPT.EF-1α as a vector, namely PRRLSIN-cPPT.EF-1a-12G4m (M1331)-BBZ. The 12G4m (M1331)-28Z sequence consists of CD8α signal peptide (SEQ ID NO: 17), 12G4m (M1331) scFV (SEQ ID NO: 72), CD8 hinge (SEQ ID NO: 19), CD28 transmembrane region (SEQ ID NO: 51), intracellular signaling domain (SEQ ID NO: 53) and CD3% (SEQ ID NO: 25); 12G4m (M1331)-BBZ sequence consists of CD8α signal peptide (SEQ ID NO: 17), 12G4m (M1331)) scFV (SEQ ID NO: 72), CD8 hinge (SEQ ID NO: 19), transmembrane region (SEQ ID NO: 21), CD137 intracellular signaling domain (SEQ ID NO: 23) and CD3ξ (SEQ ID NO: 25); and 12G4m (M1331)-28BBZ sequence consists of CD8α signal peptide (SEQ ID NO: 17), 12G4m (M1331) scFV (SEQ ID NO: 72), CD8 hinge (SEQ ID NO: 19), CD137 intracellular signaling domain (SEQ ID NO: 23) and CD3ξ (SEQ ID NO: 25).

Example 7: Packaging of CLL1-Specific CAR Virus and Detection of the Positive Rate of CAR T Infection Firstly, the lentivirus was packaged by the calcium phosphate method, and the virus supernatant was purified with PEG8000/NaCl. After purification, the virus was tested for titer by FACS method. According to the results of flow cytometry, titers of 7F8-CART, 12G4m-CART and 12G4m-M1331 CART virus were 2.37E+08, 1.41E+08 and 7.99E+07, respectively.

Figure 11:
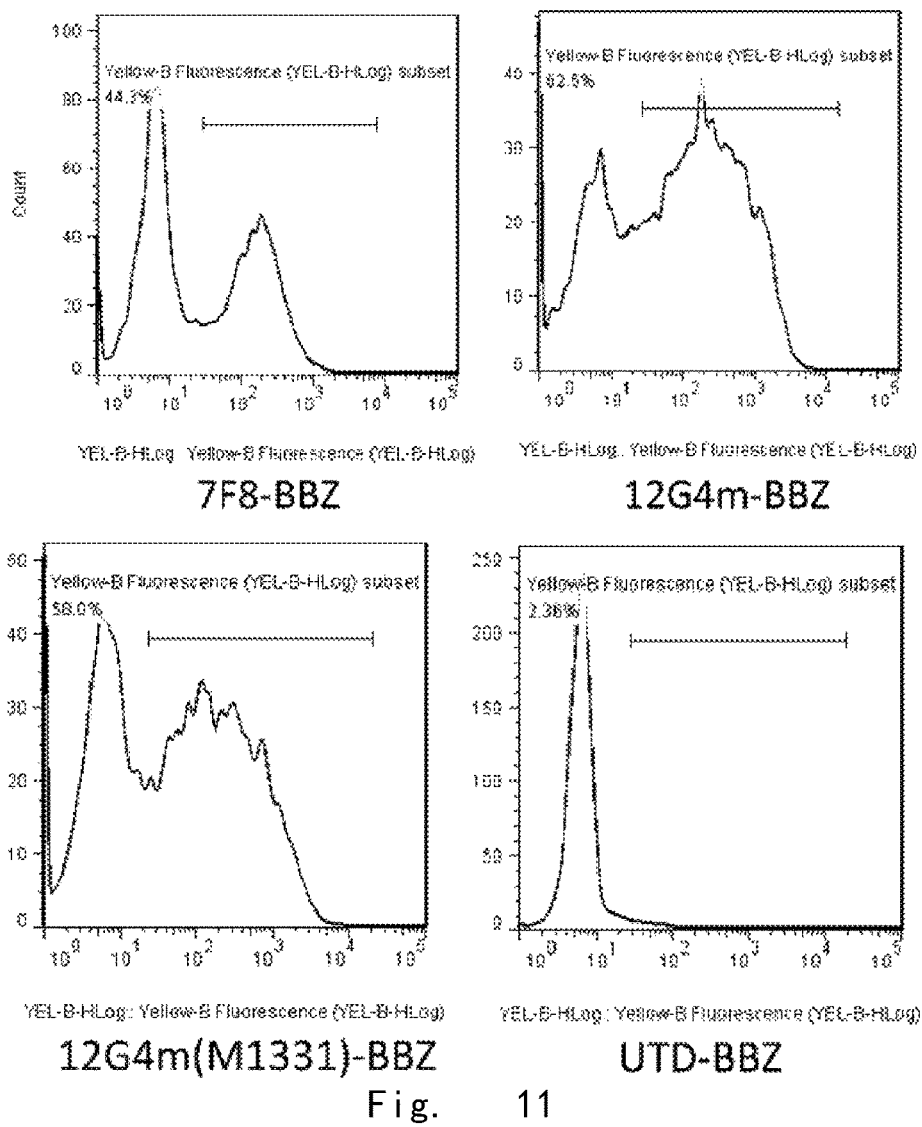
FIG. 11. shows the positive rate of CLL1-CAR T virus-infected T lymphocytes detected by FACs.

Afterwards, T cells activates with CD3/CD28 magnetic beads for 48 hours were infected with virus, and the virus volume (mL)=number of cells×MOI value (MOI=10)/titer, so as to obtain 7F8-BBZ CAR T, 12G4m-BBZ CAR T And 12G4m (M1331)-BBZ-CART cells. The positive rate of CAR expression was detected [d] by FACS method on the 9th day after infection. The result is shown in FIG. 11. The CAR positive rate of 7F8-BBZ CAR T was 41.94%, and the CAR positive rate of 12G4m-BBZ CAR T was 60.14%, and the CAR positive rate of 12G4m (M1331)-BBZ CAR T was 55.64%.

Example 8: In Vitro Killing Toxicity Detection of Positive Cells Targeting CLL1

The antibody M26 (CN104736562B) reported in the prior art was selected as a positive control, and M26-BBZ CAR T was prepared using a conventional protocol. CytoTox 96 non-radioactive cytotoxicity detection kit (Promega) was used. The specific method can be found in the instruction of CytoTox 96 non-radioactive cytotoxicity detection kit.

Effector cells: Untransduced (UTD) T cells, 7F8-BBZ CART cells, and 12G4m-BBZ CART cells were inoculated in 96-well plates at an effector target ratio of 3:1, 1:1, 1:3 and 1:9, respectively.

Target cells: 50 μL of 2×10⁵/mL of HL-60 and U937 cells with positive expression of CLL1 and K562 cells with negative expression of CLL1 were inoculated to the corresponding 96-well plates.

Figure 12:
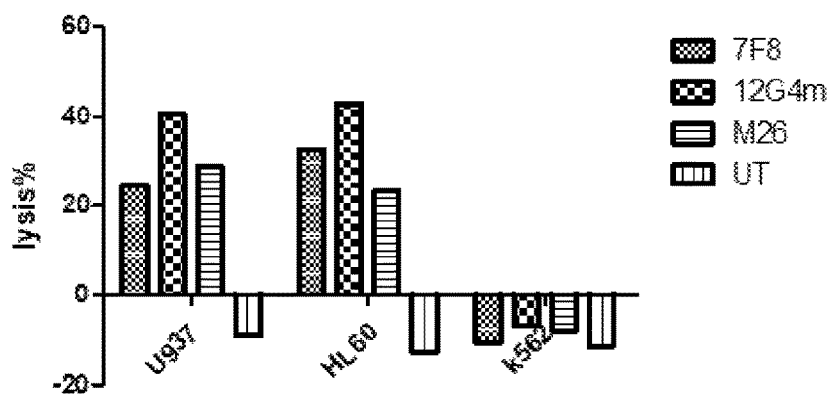
FIG. 12. shows the results of the in vitro killing toxicity test of the antibody of the present invention and the prior art antibody FIG. 13. shows the results of the in vitro killing toxicity test of the antibody of the present invention.

The experimental results are shown in FIG. 12. Compared with the control group UTD, the 7F8-BBZ CAR T and 12G4m-BBZ CAR T of the present invention have significant toxic killing effects on HL-60 and U937 cells with positive expression of CLL1 at a effector target ratio of 3:1, 1:1 and 1:3, but almost no killing effects on K562 cells with negative expression for CLL1. In addition, 12G4m-BBZ CAR T has better killing effects on HL-60 and U937 cells with positive expression of CLL1, compared with the prior art M26-BBZ CAR T, while 7F8-BBZ CAR T has better killing effects on HL-60 than M26-BBZ CAR T.

Example 9: In Vivo Cell Killing Experiment in Mice

1) Experimental grouping: 6-8 weeks old female NPG mice were randomly divided into 4 groups, each with 6 mice, namely Untransduced T (UTD), 12G4m-BBZ CART group ($1.0\times10^6$/mouse), 12G4m-BBZ CART group ($2.0\times10^6$/mouse), 12G4m-BBZ CART ($4.0\times10^6$/mouse) cell treatment group.

2) Inoculation of subcutaneous transplanted tumor: HL-60 cells in logarithmic growth phase and good growth condition were collected, the cell density was adjusted to $1.5\times10^7$/mL, and the cells were inoculated into the subcutaneous part of the right axillary of NPG mice with a volume of 200 μL cell suspension, that is, each mouse was inoculated with $3.0\times10^6$ tumor cells, and the day of inoculation was recorded as day 0.

3) re-infusion of CAR-T cells: When the average tumor volume was about 122 mm3, that is, on the day 8 after tumor inoculation, the corresponding number of 12G4m BBZ cells or untransduced T cell control were injected. The results showed that 14 days after CAR T injection, compared with the UTD control group, each group had significant antitumor effects. When the concentration of 12G4m-BBZ cells was $2.0\times10^6$, the tumor inhibition rate was 57.35%; and when the concentration of 12G4m-BBZ cells was $4.0\times10^6$, the tumor inhibition rate was 72.89%. At the same time, the weight of the mice did not significantly change compared with the UTD control group.

Example 10: In Vitro Killing Results of 12G4m (M1331)-BBZ CART

The in vitro killing effects of 12G4m (M1331)-BBZ CART were tested according to the method of Example 8.

Effector cells: Untransduced (UTD) T cells, 7F8-BBZ CART cells, 12G4m-BBZ CART cells, and 12G4m (M1331)-BBZ CART cells were inoculated in 96 wells at an effector target ratio of 9:1, 3:1, and 1:1, respectively.

Target cells: 50 μL of $2\times10^5$/mL of HL-60 and U937 cells with positive expression of CLL1 and K562 cells with negative expression of CLL1 were inoculated into the corresponding 96-well plates, respectively.

Figure 13:
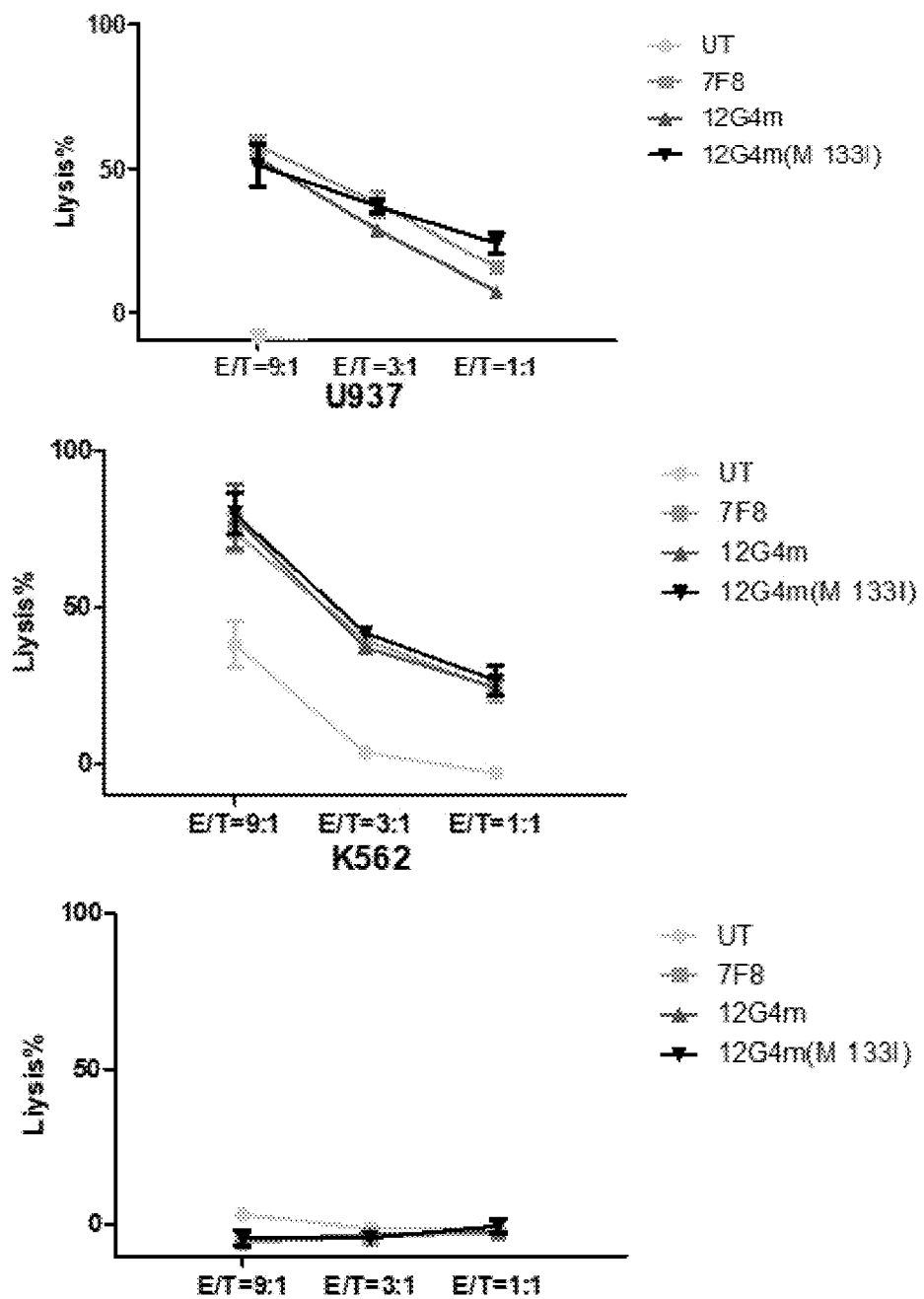

The experimental results are shown in FIG. 13, and the experimental results are shown in FIG. 13. The results show that, compared with the UTD of the control group, both of the 7F8-BBZ CAR T, 12G4m-BBZ CAR T, and 12G4m (M1331)-BBZ CART of the present invention have significant toxic killing effects on HL-60 and U937 cells with positive expression of CLL1, while almost no killing effects on K562 cells with negative expression of CLL1.

All documents mentioned in the present invention are cited as references in this application, as if each document was individually cited as a reference. In addition, it should be understood that after reading the above teaching content of the present invention, those skilled in the art can make various changes or modifications to the present invention, and these equivalent forms also fall within the scope defined by the appended claims of the present application.

The sequences used in the present invention are summarized in the following table:

| SEQ ID NO: | Name | Sequence |
|---|---|---|
| 1 | Amino acid sequence of 4F2, 7F8 heavy chain variable region | EVQLLESGGGLVQPGGSLRLSCAASGFTFSSYAMSWVRQAPGKGLEW VSAISGSGGSTYYADSVKGRFTISRDNSKNTLYLQMNSLRAEDTAVY YCAKEYYFGYYGYLDYWGQGTLVTVSS |
| 2 | Nucleotide sequence of 4F2, 7F8 heavy chain variable region | gaggtgcaattgctggagtctgggggaggcttggtacagcctggggggtccctgagactctcctg tgcagcctccggattcacctttagcagttatgccatgagctgggtccgccaggctccagggaagg ggctggagtgggtctcagctattagtggtagtggtggtagcacatactacgcagactccgtgaag ggccggttcaccatctccagagacaattccaagaacacgctgtatctgcagatgaacagcctgag agccgaggacacggccgtatattactgtgcgaaagaatacttcggttactacggttacctgg actactggggccaaggaaccctggtcaccgtctcgagt |
| 3 | Amino acid sequence of 4F2 light chain variable region | DIQMTQSPSTLSASVGDRVTITCRASQSISSWLAWYQQKPGKAPKLLI YDASSLESGVPSRFSGSGSGTEFTLTISSLQPDDFATYYCQQYYSYPMI TFGQGTKVEIKR |
| 4 | Nucleotide sequence of 4F2 light chain variable region | gacatccagatgacccagtctcctccaccctgtctgcatctgtaggagaccgtgtcaccatcac ttgccgtgccagtcagagtattagtagctggttggcctggtatcagcagaaaccagggaaagccc ctaagctcctgatctatgatgcctccagtttggaaagtggggtcccatcacgtttcagcggcagt ggatccgggacagaattcactctcaccatcagcagcttgcagcctgatgattttgcaacttata ctgccaacagtactactcttacccaatgatcacgtttggccagggcaccaaagtcgagatcaagc gt |
| 5 | Amino acid sequence of 25H8 heavy chain variable region | EVQLVQSGAEVKKPGASVKVSCKASGYTFNSYYMHWVRQAPGQGL EWMGIFNPSGGSTSYAQKFQGRVTMTRDTSTSTVYMELSSLRSEDTA VYYCARGTTSDAFDIWGQGTMVTVSS |
| 6 | Nucleotide sequence of 25H8 heavy chain variable region | gaggtgcagctggtgcagtctggggctgaggtgaagaagcctggggcctcagtgaaggtttcctg caaggcatctggatacaccttcaacagctactatatgcactgggtgcgacaggcccctggacaag ggcttgagtggatgggaatattcaaccctagtggtggtagcacaagctacgcacagaagttccag ggcagagtcaccatgaccagggacacgtccacgagcacagtctacatggagctgagcagcctgag atctgaggacacggccgtgtattactgtgcgagaggaactacatccgatgcttttgatatctggg gccaagggacaatggtcaccgtctcgagt |

| SEQ ID NO: | Name | Sequence |
|---|---|---|
| 7 | Amino acid sequence of 25H8 light chain variable region | DIQMTQSPSSLSASVGDRVTITCRASQSISSYLNWYQQKPGKAPKLLIY AASSLQSGVPSRFSGSGSGTDFTLTISSLQPEDFATYYCQQSYSTPLTFG GGTKVEIKR |
| 8 | Nucleotide sequence of 25H8 light chain variable region | gacatccagatgacccagtctccatcctccctgtctgcatctgtaggagacagagtcaccatcac ttgccgggcaagtcagagcattagcagctatttaaattggtatcagcagaaaccagggaaagccc ctaagctcctgatctatgctgcatccagtttgcaaagtggggtcccatcaaggttcagtggcagt ggatctgggacagatttcactctcaccatcagcagtctgcaacctgaagattttgcaacttacta ctgtcaacagagttacagtaccctctcactttcggcggagggaccaaggtggagatcaaacgt |
| 9 | 12G4m(M1331) BBZ | EVQLVQSGAEVKKPGASVKVSCKASGYTFNSYYMHWVRQAPGQGL EWMGIFNPGGGSTSYAQKFQGRVTMTRDTSTSTVYMELSSLRSEDTA VYYCARGTTSDAFDIWGQGTLVTVSSGGGGSGGGGSGGGGSDIQMT QSPSSLSASVGDRVTITCRASQSISSYLNWYQQKPGKAPKLLIDVASSL QSGVPSRFSGSGSGTDFTLTISSLQPEDFATYYCQQSYSTPLTFGGGTK VEIKRTTTPAPRPPTPAPTIASQPLSLRPEACRPAAGGAVHTRGLDFAC DIYIWAPLAGTCGVLLLSLVITLYCKRGRKKLLYIFKQPFMRPVQTTQ EEDGCSCRFPEEEEGGCELRVKFSRSADAPAYKQGQNQLYNELNLGR REEYDVLDKRRGRDPEMGGKPRRKNPQEGLYNELQKDKMAEAYSEI GMKGERRRGKGHDGLYQGLSTATKDTYDALHMQALPPR |
| 10 | 12G4m(M1331) 28BBZ | EVQLVQSGAEVKKPGASVKVSCKASGYTFNSYYMHWVRQAPGQGL EWMGIFNPGGGSTSYAQKFQGRVTMTRDTSTSTVYMELSSLRSEDTA VYYCARGTTSDAFDIWGQGTLVTVSSGGGGSGGGGSGGGGSDIQMT QSPSSLSASVGDRVTITCRASQSISSYLNWYQQKPGKAPKLLIDVASSL QSGVPSRFSGSGSGTDFTLTISSLQPEDFATYYCQQSYSTPLTFGGGTK VEIKRTTTPAPRPPTPAPTIASQPLSLRPEACRPAAGGAVHTRGLDFAC DFWVLVVVGGVLACYSLLVTVAFIIFWVRSKRSRLLHSDYMNMTPRR PGPTRKHYQPYAPPRDFAAYRSKRGRKKLLYIFKQPFMRPVQTTQEE DGCSCRFPEEEEGGCELRVKFSRSADAPAYQQGQNQLYNELNLGRRE EYDVLDKRRGRDPEMGGKPQRRKNPQEGLYNELQKDKMAEAYSEIG MKGERRRGKGHDGLYQGLSTATKDTYDALHMQALPPR |
| 11 | Amino acid sequence of 7F8 light chain variable region | DIQMTQSPSTLSASVGDRVTITCRASQWIARWLAWYQQKPGKAPKLL IKDASNLESGVPSRFSGSGSGTEFTLTISSLQPDDFATYYCQQYYSYPM ITFGQGTKVEIKR |
| 12 | Nucleotide sequence of 7F8 light chain variable region | gacatccagatgacccagtctccttccaccctgtctgcatctgtaggagaccgtgtcaccatcac ttgccgtgccagtcagtggattgctcgatggttggcctggtatcagcagaaaccagggaaagccc ctaagctcctgatcaaggacgcttccaattttggaaagtggggtcccatcacgtttcagcggcagt ggatccgggacagaattcactctcaccatcagcagcttgcagcctgatgattttgcaacttatta ctgccaacagtactactcttacccaatgatcacgtttggccagggcaccaaagtcgagatcaagc gt |
| 13 | Amino acid sequence of 12G4m heavy chain variable region | EVQLVQSGAEVKKPGASVKVSCKASGYTFNSYYMHWVRQAPGQGL EWMGIFNPGGGSTSYAQKFQGRVTMTRDTSTSTVYMELSSLRSEDTA VYYCARGTTSDAFDIWGQGTMVTVSS |
| 14 | Nucleotide sequence of 12G4m heavy chain variable region | gaggtgcagctggtgcagtctggggctgaggtgaagaagcctggggcctcagtgaaggtttcctg caaggcatctggatacaccttcaacagctactatatgcactgggtgcgacaggcccctggacaag ggcttgagtggatgggaatattcaaccctggtggtggtagcacaagctacgcacagaagttccag ggcagagtcaccatgaccagggacacgtccacgagcacagtctacatggagctgagcagcctgag atctgaggacacggccgtgtattactgtgcgagaggaactacatccgatgcttttgatatctggg gccaagggacaatggtcaccgtctcgagt |
| 15 | Amino acid sequence of 12G4, 12G4m light chain variable region | DIQMTQSPSSLSASVGDRVTITCRASQSISSYLNWYQQKPGKAPKLLID VASSLQSGVPSRFSGSGSGTDFTLTISSLQPEDFATYYCQQSYSTPLTFG GGTKVEIKR |
| 16 | Nucleotide sequence of 12G4, 12G4m light chain variable region | gacatccagatgacccagtctccatcctccctgtctgcatctgtaggagacagagtcaccatcac ttgccgggcaagtcagagcattagcagctatttaaattggtatcagcagaaaccagggaaagccc ctaagctcctgatcgatgtcgcatccagtttgcaaagtggggtcccatcaaggttcagtggcagt ggatctgggacagatttcactctcaccatcagcagtctgcaacctgaagattttgcaacttacta ctgtcaacagagttacagtaccctctcactttcggcgga gggaccaaggtggagatcaaacgt |
| 17 | CD8α signal peptide | MALPVTALLLPLALLLHAARP |

| SEQ ID NO: | Name | Sequence |
|---|---|---|
| 18 | CD8α signal peptide | atggccttaccagtgaccgccttgctcctgccgctggccttgctgctccacgccgccaggccg |
| 19 | CD8 hinge | TTTPAPRPPTPAPTIASQPLSLRPEACRPAAGGAVHTRGLDFACD |
| 20 | CD8 hinge | accacgacgccagcgccgcgaccaccaacaccggcgccaccatcgcgtcgcagcccctgtccct gcgcccagaggcgtgccggccagcggcggggggcgcagtgcacacgaggggctggacttcgcct gtgat |
| 21 | CD8 transmembrane domain | IYIWAPLAGTCGVLLLSLVIT |
| 22 | CD8 transmembrane domain | Atctacatctgggcgcccttggccgggacttgtggggtccttctcctgtcactggttatcacc |
| 23 | CD137 intracellular domain | KRGRKKLLYIFKQPFMRPVQTTQEEDGCSCRFPEEEEGGCEL |
| 24 | CD137 intracellular domain | aaacggggcagaaagaaactcctgtatatattcaaacaaccatttatgagaccagtacaaactac tcaagaggaagatggctgtagctgccgatttccagaagaagaagaaggaggatgtgaactg |
| 25 | CD3Z domain | RVKFSRSADAPAYQQGQNQLYNELNLGRREEYDVLDKRRGRDPEMG GKPQRRKNPQEGLYNELQKDKMAEAYSEIGMKGERRRGKGHDGLY QGLSTATKDTYDALHMQALPPR |
| 26 | CD3Z domain | agagtgaagttcagcaggagcgcagacgcccccgcgtaccagcagggccagaaccagctctataa cgagctcaatctaggacgaagagaggagtacgatgttttggacaagagacgtggccgggaccctg agatgggggaaagccgcagagaaggaagaaccctcaggaaggcctgtacaatgaactgcagaaa gataagatggcggaggcctacagtgagattgggatgaaaggcgagcgccggaggggcaagggca cgatggccttaccagggtctcagtacagccaccaaggacacctacgacgcccttcacatgcagg cccctgcccctcgc |
| 27 | 4F2 scFv | EVQLLESGGGLVQPGGSLRLSCAASGFTFSSYAMSWVRQAPGKGLEW VSAISGSGGSTYYADSVKGRFTISRDNSKNTLYLQMNSLRAEDTAVY YCAKEYYFGYYGYLDYWGQGTLVTVSSGGGGSGGGGSGGGGSDIQ MTQSPSTLSASVGDRVTITCRASQSISSWLAWYQQKPGKAPKLLIYDA SSLESGVPSRFSGSGSGIEFTLTISSLQPDDFATYYCQQYYSYPMITFGQ GTKVEIKR |
| 28 | 4F2 scFv | GAGGTGCAATTGCTGGAGTCTGGGGGAGGCTTGGTACAGCCTGGG GGGTCCCTGAGACTCTCCTGTGCAGCCTCCGGATTCACCTTTAGCA GTTATGCCATGAGCTGGGTCCGCCAGGCTCCAGGGAAGGGGCTGG AGTGGGTCTCAGCTATTAGTGGTAGTGGTGGTAGCACATACTACGC AGACTCCGTGAAGGGCCGGTTCACCATCTCCAGAGACAATTCCAA GAACACGCTGTATCTGCAGATGAACAGCCTGAGAGCCGAGGACAC GGCCGTATATTACTGTGCGAAAGAATACTACTTCGGTTACTACGGT TACCTGGACTACTGGGGCCAAGGAACCCTGGTCACCGTCTCGAGTG GTGGAGGCGGTTCAGGCGGAGGTGGTTCTGGCGGTGGCGGATCGG ACATCCAGATGACCCAGTCTCCTTCCACCCTGTCTGCATCTGTAGG AGACCGTGTCACCATCACTTGCCGTGCCAGTCAGAGTATTAGTAGC TGGTTGGCCTGGTATCAGCAGAAACCAGGGAAAGCCCCTAAGCTC CTGATCTATGATGCCTCCAGTTTGGAAAGTGGGGTCCCATCACGTT TCAGCGGCAGTGGATCCGGGACAGAATTCACTCTCACCATCAGCA GCTTGCAGCCTGATGATTTTGCAACTTATTACTGCCAACAGTACTA CTCTTACCCAATGATCACGTTTGGCCAGGGCACCAAAGTCGAGATC AAGCGT |
| 29 | 25H8 scFv | EVQLVQSGAEVKKPGASVKVSCKASGYTFNSYYMHWVRQAPGQGL EWMGIFNPSGGSTSYAQKFQGRVTMTRDTSTSTVYMELSSLRSEDTA VYYCARGTTSDAFDIWGQGTMVTVSSGGGGSGGGGSGGGGSDIQMT QSPSSLSASVGDRVTITCRASQSISSYLNWYQQKPGKAPKLLIYAASSL QSGVPSRFSGSGSGTDFTLTISSLQPEDFATYYCQQSYSTPLTFGGGTK VEIKR |
| 30 | 25H8 scFv | GAGGTGCAGCTGGTGCAGTCTGGGGCTGAGGTGAAGAAGCCTGGG GCCTCAGTGAAGGTTTCCTGCAAGGCATCTGGATACACCTTCAACA GCTACTATATGCACTGGGTGCGACAGGCCCCTGGACAAGGGCTTG AGTGGATGGGAATATTCAACCCTAGTGGTGGTAGCACAAGCTACG CACAGAAGTTCCAGGGCAGAGTCACCATGACCAGGGACACGTCCA CGAGCACAGTCTACATGGAGCTGAGCAGCCTGAGATCTGAGGACA |

| SEQ ID NO: | Name | Sequence |
|---|---|---|
| | | CGGCCGTGTATTACTGTGCGAGAGGAACTACATCCGATGCTTTTGA<br>TATCTGGGGCCAAGGGACAATGGTCACCGTCTCGAGTGGTGGAGG<br>CGGTTCAGGCGGAGGTGGTTCTGGCGGTGGCGGATCGGACATCCA<br>GATGACCCAGTCTCCATCCTCCCTGTCTGCATCTGTAGGAGACAGA<br>GTCACCATCACTTGCCGGGCAAGTCAGAGCATTAGCAGCTATTTAA<br>ATTGGTATCAGCAGAAACCAGGGAAAGCCCCTAAGCTCCTGATCT<br>ATGCTGCATCCAGTTTGCAAAGTGGGGTCCCATCAAGGTTCAGTGG<br>CAGTGGATCTGGGACAGATTTCACTCTCACCATCAGCAGTCTGCAA<br>CCTGAAGATTTTGCAACTTACTACTGTCAACAGAGTTACAGTACCC<br>CTCTCACTTTCGGCGGAGGGACCAAGGTGGAGATCAAACGT |
| 31 | 7F8 scFv | EVQLLESGGGLVQPGGSLRLSCAASGFTFSSYAMSWVRQAPGKGLEW<br>VSAISGSGGSTYYADSVKGRFTISRDNSKNTLYLQMNSLRAEDTAVY<br>YCAKEYYFGYYGYLDYWGQGTLVTVSSGGGGSGGGGSGGGGSDIQ<br>MTQSPSTLSASVGDRVTITCRASQWIARWLAWYQQKPGKAPKLLIKD<br>ASNLESGVPSRFSGSGSGIEFTLTISSLQPDDFATYYCQQYYSYPMITF<br>GQGTKVEIKR |
| 32 | 7F8 scFv | GAGGTGCAATTGCTGGAGTCTGGGGGAGGCTTGGTACAGCCTGGG<br>GGGTCCCTGAGACTCTCCTGTGCAGCCTCCGGATTCACCTTTAGCA<br>GTTATGCCATGAGCTGGGTCCGCCAGGCTCCAGGGAAGGGGCTGG<br>AGTGGGTCTCAGCTATTAGTGGTAGTGGTGGTAGCACATACTACGC<br>AGACTCCGTGAAGGGCCGGTTCACCATCTCCAGAGACAATTCCAA<br>GAACACGCTGTATCTGCAGATGAACAGCCTGAGAGCCGAGGACAC<br>GGCCGTATATTACTGTGCGAAAGAATACTACTTCGGTTACTACGGT<br>TACCTGGACTACTGGGGCCAAGGAACCCTGGTCACCGTCTCGAGTG<br>GTGGAGGCGGTTCAGGCGGAGGTGGTTCTGGCGGTGGCGGATCGG<br>ACATCCAGATGACCCAGTCTCCTTCCACCCTGTCTGCATCTGTAGG<br>AGACCGTGTCACCATCACTTGCCGTGCCAGTCAGTGGATTGCTCGA<br>TGGTTGGCCTGGTATCAGCAGAAACCAGGGAAAGCCCCTAAGCTC<br>CTGATCAAGGACGCTTCCAATTTGGAAAGTGGGGTCCCATCACGTT<br>TCAGCGGCAGTGGATCCGGGACAGAATTCACTCTCACCATCAGCA<br>GCTTGCAGCCTGATGATTTTGCAACTTATTACTGCCAACAGTACTA<br>CTCTTACCCAATGATCACGTTTGGCCAGGGCACCAAAGTCGAGATC<br>AAGCGT |
| 33 | 12G4m scFv | EVQLVQSGAEVKKPGASVKVSCKASGYTFNSYYMHWVRQAPGQGL<br>EWMGIFNPGGGSTSYAQKFQGRVTMTRDTSTSTVYMELSSLRSEDTA<br>VYYCARGTTSDAFDIWGQGTMVTVSSGGGGSGGGGSGGGGSDIQMT<br>QSPSSLSASVGDRVTITCRASQSISSYLNWYQQKPGKAPKLLIDVASSL<br>QSGVPSRFSGSGSGTDFTLTISSLQPEDFATYYCQQSYSTPLTFGGGTK<br>VEIKR |
| 34 | 12G4m scFv | gaggtgcagctggtgcagtctggggctgaggtgaagaagcctggggcctcagtgaaggtttcctg<br>caaggcatctggatacaccttcaacagctactatatgcactgggtgcgacaggcccctggacaag<br>ggcttgagtggatgggaatattcaaccctggtggtggtagcacaagctacgcacagaagttccag<br>ggcagagtcaccatgaccagggacacgtccacgagcacagtctacatggagctgagcctgag<br>atctgaggacacggccgtgtattactgtgcgagaggaactacatccgatgcttttgatatctggg<br>gccaagggacaatggtcaccgtctcgagtggtggaggcggttcaggcggaggtggttctggcggt<br>ggcggatcggacatccagatgacccagtctccatcctccctgtctgcatctgtaggagacagagt<br>caccatcacttgccgggcaagtcagagcattagcagctatttaaattggtatcagcagaaaccag<br>ggaaagcccctaagctcctgatcgatgtcgcatccagtttgcaaagtggggtcccatcaaggttc<br>agtggcagtggatctgggacagatttcactctcaccatcagcagtctgcaacctgaagattttgc<br>aacttactactgtcaacagagttacagtacccctctcactttcggcggagggaccaaggtggaga<br>tcaaacgt |
| 35 | 4F2, 7F8 HCDR1 | SYAMS |
| 36 | 25H8, 12G4, 12G4m HCDR1 | SYYMH |
| 37 | 4F2, 7F8 HCDR2 | AISGSGGSTYYADSVKG |
| 38 | 25H8, 12G4, HCDR2 | IFNPSGGSTSYAQKFQG |
| 39 | 12G4m HCDR2 | IFNPGGGSTSYAQKFQG |
| 40 | 4F2, 7F8 HCDR3 | EYYFGYYGYLDY |
| 41 | 25H8, 12G4, 12G4m HCDR3 | GTTSDAFDI |

| SEQ ID NO: | Name | Sequence |
|---|---|---|
| 42 | 4F2 LCDR1 | RASQSISSWLA |
| 43 | 25H8, 12G4, 12G4m LCDR1 | RASQSISSYLN |
| 44 | 7F8 LCDR1 | RASQWIARWLA |
| 45 | 4F2 LCDR2 | DASSLES |
| 46 | 25H8 LCDR2 | AASSLQS |
| 47 | 7F8 LCDR2 | DASNLES |
| 48 | 12G4, 12G4m LCDR2 | VASSLQS |
| 49 | 4F2, 7F8 LCDR3 | QQYYSYPMIT |
| 50 | 25H8, 12G4, 12G4m LCDR3 | QQSYSTPLT |
| 51 | CD28 transmembrane domain | Fwvlvvvggvlacysllvtvafiiifwv |
| 52 | CD28 transmembrane domain | ttttgggtgctggtggtggttggtggagtcctggcttgctatagcttgctagtaacagtggcctttattattttctgggtg |
| 53 | CD28 intracellular domain | Rskrsrllhsdymnmtprrpgptrkhyqpyapprdfaayrs |
| 54 | CD28 intracellular domain | Aggagtaagaggagcaggctcctgcacagtgactacatgaacatgactccccgcgccccgggccaacccgcaagcattaccagccctatgccccaccacgcgacttcgcagcctatcgctcc |
| 55 | 4F2 28Z | EVQLLESGGGLVQPGGSLRLSCAASGFTFSSYAMSWVRQAPGKGLEWVSAISGSGGSTYYADSVKGRFTISRDNSKNTLYLQMNSLRAEDTAVYYCAKEYYFGYYGYLDYWGQGTLVTVSSGGGGSGGGGSGGGGSDIQMTQSPSTLSASVGDRVTITCRASQSISSWLAWYQQKPGKAPKLLIYDASSLESGVPSRFSGSGSGIEFTLTISSLQPDDFATYYCQQYYSYPMITFGQGTKVEIKRTTTPAPRPPTPAPTIASQPLSLRPEACRPAAGGAVHTRGLDFACDFWVLVVVGGVLACYSLLVTVAFIIFWVRSKRSRLLHSDYMNMTPRRPGPTRKHYQPYAPPRDFAAYRSRVKFSRSADAPAYQQGQNQLYNELNLGRREEYDVLDKRRGRDPEMGGKPQRRKNPQEGLYNELQKDKMAEAYSEIGMKGERRRGKGHDGLYQGLSTATKDTYDALHMQALPPR |
| 56 | 4F2 BBZ | EVQLLESGGGLVQPGGSLRLSCAASGFTFSSYAMSWVRQAPGKGLEWVSAISGSGGSTYYADSVKGRFTISRDNSKNTLYLQMNSLRAEDTAVYYCAKEYYFGYYGYLDYWGQGTLVTVSSGGGGSGGGGSGGGGSDIQMTQSPSTLSASVGDRVTITCRASQSISSWLAWYQQKPGKAPKLLIYDASSLESGVPSRFSGSGSGIEFTLTISSLQPDDFATYYCQQYYSYPMITFGQGTKVEIKRTTTPAPRPPTPAPTIASQPLSLRPEACRPAAGGAVHTRGLDFACDIYIWAPLAGTCGVLLLSLVITLYCKRGRKKLLYIFKQPFMRPVQTTQEEDGCSCRFPEEEEGGCELRVKFSRSADAPAYKQGNQLYNELNLGRREEYDVLDKRRGRDPEMGGKPRRKNPQEGLYNELQKDKMAEAYSEIGMKGERRRGKGHDGLYQGLSTATKDTYDALHMQALPPR |
| 57 | 4F2 28BBZ | EVQLLESGGGLVQPGGSLRLSCAASGFTFSSYAMSWVRQAPGKGLEWVSAISGSGGSTYYADSVKGRFTISRDNSKNTLYLQMNSLRAEDTAVYYCAKEYYFGYYGYLDYWGQGTLVTVSSGGGGSGGGGSGGGGSDIQMTQSPSTLSASVGDRVTITCRASQSISSWLAWYQQKPGKAPKLLIYDASSLESGVPSRFSGSGSGIEFTLTISSLQPDDFATYYCQQYYSYPMITFGQGTKVEIKRTTTPAPRPPTPAPTIASQPLSLRPEACRPAAGGAVHTRGLDFACDFWVLVVVGGVLACYSLLVTVAFIIFWVRSKRSRLLHSDYMNMTPRRPGPTRKHYQPYAPPRDFAAYRSKRGRKKLLYIFKQPFMRPVQTTQEEDGCSCRFPEEEEGGCELRVKFSRSADAPAYQQGQNQLYNELNLGRREEYDVLDKRRGRDPEMGGKPQRRKNPQEGLYNELQKDKMAEAYSEIGMKGERRRGKGHDGLYQGLSTATKDTYDALHMQALPPR |
| 58 | 25H8 28Z | EVQLVQSGAEVKKPGASVKVSCKASGYTFNSYYMHWVRQAPGQGLEWMGIFNPSGGSTSYAQKFQGRVTMTRDTSTSTVYMELSSLRSEDTAVYYCARGTTSDAFDIWGQGTMVTVSSGGGGSGGGGSGGGGSDIQMT |

| SEQ ID NO: | Name | Sequence |
|---|---|---|
| | | QSPSSLSASVGDRVTITCRASQSISSYLNWYQQKPGKAPKLLIYAASSL QSGVPSRFSGSGSGTDFTLTISSLQPEDFATYYCQQSYSTPLTFGGGTK VEIKRTTTPAPRPPTPAPTIASQPLSLRPEACRPAAGGAVHTRGLDFAC DFWVLVVVGGVLACYSLLVTVAFIIFWVRSKRSRLLHSDYMNMTPRR PGPTRKHYQPYAPPRDFAAYRSVKFSRSADAPAYQQGQNQLYNELN LGRREEYDVLDKRRGRDPEMGGKPQRRKNPQEGLYNELQKDKMAE AYSEIGMKGERRRGKGHDGLYQGLSTATKDTYDALHMQALPPR |
| 59 | 25H8 BBZ | EVQLVQSGAEVKKPGASVKVSCKASGYTFNSYYMHWVRQAPGQGL EWMGIFNPSGGSTSYAQKFQGRVTMTRDTSTSTVYMELSSLRSEDTA VYYCARGTTSDAFDIWGQGTMVTVSSGGGGSGGGGSGGGGSDIQMT QSPSSLSASVGDRVTITCRASQSISSYLNWYQQKPGKAPKLLIYAASSL QSGVPSRFSGSGSGTDFTLTISSLQPEDFATYYCQQSYSTPLTFGGGTK VEIKRTTTPAPRPPTPAPTIASQPLSLRPEACRPAAGGAVHTRGLDFAC DIYIWAPLAGTCGVLLLSLVITLYCKRGRKKLLYIFKQPFMRPVQTTQ EEDGCSCRFPEEEEGGCELRVKFSRSADAPAYKQGQNQLYNELNLGR REEYDVLDKRRGRDPEMGGKPRRKNPQEGLYNELQKDKMAEAYSEI GMKGERRRGKGHDGLYQGLSTATKDTYDALHMQALPPR |
| 60 | 25H8 28BBZ | EVQLVQSGAEVKKPGASVKVSCKASGYTFNSYYMHWVRQAPGQGL EWMGIFNPSGGSTSYAQKFQGRVTMTRDTSTSTVYMELSSLRSEDTA VYYCARGTTSDAFDIWGQGTMVTVSSGGGGSGGGGSGGGGSDIQMT QSPSSLSASVGDRVTITCRASQSISSYLNWYQQKPGKAPKLLIYAASSL QSGVPSRFSGSGSGTDFTLTISSLQPEDFATYYCQQSYSTPLTFGGGTK VEIKRTTTPAPRPPTPAPTIASQPLSLRPEACRPAAGGAVHTRGLDFAC DFWVLVVVGGVLACYSLLVTVAFIIFWVRSKRSRLLHSDYMNMTPRR PGPTRKHYQPYAPPRDFAAYRSKRGRKKLLYIFKQPFMRPVQTTQEE DGCSCRFPEEEEGGCELRVKFSRSADAPAYQQGQNQLYNELNLGRRE EYDVLDKRRGRDPEMGGKPQRRKNPQEGLYNELQKDKMAEAYSEIG MKGERRRGKGHDGLYQGLSTATKDTYDALHMQALPPR |
| 61 | 7F8 28Z | EVQLLESGGGLVQPGGSLRLSCAASGFTFSSYAMSWVRQAPGKGLEW VSAISGSGGSTYYADSVKGRFTISRDNSKNTLYLQMNSLRAEDTAVY YCAKEYYFGYYGYLDYWGQGTLVTVSSGGGGSGGGGSGGGGSDIQ MTQSPSTLSASVGDRVTITCRASQWIARWLAWYQQKPGKAPKLLIKD ASNLESGVPSRFSGSGSGIEFTLTISSLQPDDFATYYCQQYYSYPMITF GQGTKVEIKRTTTPAPRPPTPAPTIASQPLSLRPEACRPAAGGAVHTRG LDFACDFWVLVVVGGVLACYSLLVTVAFIIFWVRSKRSRLLHSDYMN MTPRRPGPTRKHYQPYAPPRDFAAYRSRVKFSRSADAPAYQQGQNQL YNELNLGRREEYDVLDKRRGRDPEMGGKPQRRKNPQEGLYNELQKD KMAEAYSEIGMKGERRRGKGHDGLYQGLSTATKDTYDALHMQALPP R |
| 62 | 7F8 BBZ | EVQLLESGGGLVQPGGSLRLSCAASGFTFSSYAMSWVRQAPGKGLEW VSAISGSGGSTYYADSVKGRFTISRDNSKNTLYLQMNSLRAEDTAVY YCAKEYYFGYYGYLDYWGQGTLVTVSSGGGGSGGGGSGGGGSDIQ MTQSPSTLSASVGDRVTITCRASQWIARWLAWYQQKPGKAPKLLIKD ASNLESGVPSRFSGSGSGIEFTLTISSLQPDDFATYYCQQYYSYPMITF GQGTKVEIKRTTTPAPRPPTPAPTIASQPLSLRPEACRPAAGGAVHTRG LDFACDIYIWAPLAGTCGVLLLSLVITLYCKRGRKKLLYIFKQPFMRP VQTTQEEDGCSCRFPEEEEGGCELRVKFSRSADAPAYKQGQNQLYNE LNLGRREEYDVLDKRRGRDPEMGGKPRRKNPQEGLYNELQKDKMAE AYSEIGMKGERRRGKGHDGLYQGLSTATKDTYDALHMQALPPR |
| 63 | 7F8 28BBZ | EVQLLESGGGLVQPGGSLRLSCAASGFTFSSYAMSWVRQAPGKGLEW VSAISGSGGSTYYADSVKGRFTISRDNSKNTLYLQMNSLRAEDTAVY YCAKEYYFGYYGYLDYWGQGTLVTVSSGGGGSGGGGSGGGGSDIQ MTQSPSTLSASVGDRVTITCRASQWIARWLAWYQQKPGKAPKLLIKD ASNLESGVPSRFSGSGSGIEFTLTISSLQPDDFATYYCQQYYSYPMITF GQGTKVEIKRTTTPAPRPPTPAPTIASQPLSLRPEACRPAAGGAVHTRG LDFACDFWVLVVVGGVLACYSLLVTVAFIIFWVRSKRSRLLHSDYMN MTPRRPGPTRKHYQPYAPPRDFAAYRSKRGRKKLLYIFKQPFMRPVQ TTQEEDGCSCRFPEEEEGGCELRVKFSRSADAPAYQQGQNQLYNELN LGRREEYDVLDKRRGRDPEMGGKPQRRKNPQEGLYNELQKDKMAE AYSEIGMKGERRRGKGHDGLYQGLSTATKDTYDALHMQALPPR |
| 64 | 12G4m 28Z | EVQLVQSGAEVKKPGASVKVSCKASGYTFNSYYMHWVRQAPGQGL EWMGIFNPSGGSTSYAQKFQGRVTMTRDTSTSTVYMELSSLRSEDTA VYYCARGTTSDAFDIWGQGTMVTVSSGGGGSGGGGSGGGGSDIQMT QSPSSLSASVGDRVTITCRASQSISSYLNWYQQKPGKAPKLLIDVASSL QSGVPSRFSGSGSGTDFTLTISSLQPEDFATYYCQQSYSTPLTFGGGTK VEIKRTTTPAPRPPTPAPTIASQPLSLRPEACRPAAGGAVHTRGLDFAC DFWVLVVVGGVLACYSLLVTVAFIIFWVRSKRSRLLHSDYMNMTPRR PGPTRKHYQPYAPPRDFAAYRSVKFSRSADAPAYQQGQNQLYNELN LGRREEYDVLDKRRGRDPEMGGKPQRRKNPQEGLYNELQKDKMAE |

| SEQ ID NO: | Name | Sequence |
|---|---|---|
| | | AYSEIGMKGERRRGKGHDGLYQGLSTATKDTYDALHMQALPPR |
| 65 | 12G4m BBZ | EVQLVQSGAEVKKPGASVKVSCKASGYTFNSYYMHWVRQAPGQGL EWMGIFNPGGGSTSYAQKFQGRVTMTRDTSTSTVYMELSSLRSEDTA VYYCARGTTSDAFDIWGQGTMVTVSSGGGGSGGGGSGGGGSDIQMT QSPSSLSASVGDRVTITCRASQSISSYLNWYQQKPGKAPKLLIDVASSL QSGVPSRFSGSGSGTDFTLTISSLQPEDFATYYCQQSYSTPLTFGGGTK VEIKRTTTPAPRPPTPAPTIASQPLSLRPEACRPAAGGAVHTRGLDFAC DIYIWAPLAGTCGVLLLSLVITLYCKRGRKKLLYIFKQPFMRPVQTTQ EEDGCSCRFPEEEEGGCELRVKFSRSADAPAYKQGQNQLYNELNLGR REEYDVLDKRRGRDPEMGGKPRRKNPQEGLYNELQKDKMAEAYSEI GMKGERRRGKGHDGLYQGLSTATKDTYDALHMQALPPR |
| 66 | 12G4m 28BBZ | EVQLVQSGAEVKKPGASVKVSCKASGYTFNSYYMHWVRQAPGQGL EWMGIFNPGGGSTSYAQKFQGRVTMTRDTSTSTVYMELSSLRSEDTA VYYCARGTTSDAFDIWGQGTMVTVSSGGGGSGGGGSGGGGSDIQMT QSPSSLSASVGDRVTITCRASQSISSYLNWYQQKPGKAPKLLIDVASSL QSGVPSRFSGSGSGTDFTLTISSLQPEDFATYYCQQSYSTPLTFGGGTK VEIKRTTTPAPRPPTPAPTIASQPLSLRPEACRPAAGGAVHTRGLDFAC DFWVLVVVGGVLACYSLLVTVAFIIFWVRSKRSRLLHSDYMNMTPRR PGPTRKHYQPYAPPRDFAAYRSKRGRKKLLYIFKQPFMRPVQTTQEE DGCSCRFPEEEEGGCELRVKFSRSADAPAYQQGQNQLYNELNLGRRE EYDVLDKRRGRDPEMGGKPQRRKNPQEGLYNELQKDKMAEAYSEIG MKGERRRGKGHDGLYQGLSTATKDTYDALHMQALPPR |
| 67 | Amino acid sequence of 12G4m A9P heavy chain variable region | Evqlvqsgpevkkpgasvkvsckasgytfnsyymhwvrqapgqglewmgifnpgggstsyaqkfq grvtmtrdtststvymelsslrsedtavyycargttsdafdiwgqgtmvtvss |
| 68 | Amino acid sequence of 12G4m V93I heavy chain variable region | Evqlvqsgaevkkpgasvkvsckasgytfnsyymhwvrqapgqglewmgifnpgggstsyaqkfq grvtmtrdtststvymelsslrsedtaiyycargttsdafdiwgqgtmvtvss |
| 69 | Amino acid sequence of 12G4m M133I heavy chain variable region | Evqlvqsgaevkkpgasvkvsckasgytfnsyymhwvrqapgqglewmgifnpgggstsyaqkfq grvtmtrdtststvymelsslrsedtavyycargttsdafdiwgqgtlvtvss |
| 70 | 12G4m A9P scFv | Evqlvqsgpevkkpgasvkvsckasgytfnsyymhwvrqapgqglewmgifnpgggstsyaqkfq grvtmtrdtststvymelsslrsedtavyycargttsdafdiwgqgtmvtvssggggsggggsgg ggsdiqmtqspsslsasvgdrvtitcmsqsissylnwyqqkpgkapkllidvasslqsgvpsrfs gsgsgtdftltisslqpedfatyycqqsystpltfgggtkveikr |
| 71 | 12G4m V93I scFv | Evqlvqsgaevkkpgasvkvsckasgytfnsyymhwvrqapgqglewmgifnpgggstsyaqkfq grvtmtrdtststvymelsslrsedtaiyycargttsdafdiwgqgtmvtvssggggsggggsgg ggsdiqmtqspsslsasvgdrvtitcmsqsissylnwyqqkpgkapkllidvasslqsgvpsrfs gsgsgtdfatisslqpedfatyycqqsystpltfgggtkveikr |
| 72 | 12G4m M133I scFv | Evqlvqsgaevkkpgasvkvsckasgyttnsyymhwvrqapgqglewmgifnpgggstsyaqkfq grvtmtrdtststvymelsslrsedtavyycargttsdafdiwgqgtlvtvssggggsggggsgg ggsdiqmtqspsslsasvgdrvtitcrasqsissylnwyqqkpgkapkllidvasslqsgvpsrf sgsgsgtdftltisslqpedfatyycqqsystpltfgggtkveikr |
| 73 | 12G4m(M133I) 28Z | EVQLVQSGAEVKKPGASVKVSCKASGYTFNSYYMHWVRQAPGQGL EWMGIFNPGGGSTSYAQKFQGRVTMTRDTSTSTVYMELSSLRSEDTA VYYCARGTTSDAFDIWGQGTLVTVSSGGGGSGGGGSGGGGSDIQMT QSPSSLSASVGDRVTITCRASQSISSYLNWYQQKPGKAPKLLIDVASSL QSGVPSRFSGSGSGTDFTLTISSLQPEDFATYYCQQSYSTPLTFGGGTK VEIKRTTTPAPRPPTPAPTIASQPLSLRPEACRPAAGGAVHTRGLDFAC DFWVLVVVGGVLACYSLLVTVAFIIFWVRSKRSRLLHSDYMNMTPRR PGPTRKHYQPYAPPRDFAAYRSRVKFSRSADAPAYQQGQNQLYNELN LGRREEYDVLDKRRGRDPEMGGKPQRRKNPQEGLYNELQKDKMAE AYSEIGMKGERRRGKGHDGLYQGLSTATKDTYDALHMQALPPR |

The invention claimed is:

1. An antibody targeting CLL1 having:

HCDR1 shown in SYX$_1$MX$_2$, HCDR2 shown in X$_3$X$_4$X$_5$X$_6$SGGSTX$_7$YAX$_8$X$_9$X$_{10}$X$_{11}$G (SEQ ID NO. 74), HCDR3 shown in SEQ ID NO: 40 or 41, and LCDR1 shown in RASQSISSX$_{12}$LX$_{13}$ (SEQ ID NO. 75), LCDR2 shown in X$_{14}$ASX$_{15}$LX$_{16}$S (SEQ ID NO: 80), LCDR3 shown in QQX$_{17}$YSX$_{18}$PX$_{19}$X$_{20}$T (SEQ ID NO: 81), wherein, X$_1$ is selected from A or Y, X$_2$ is selected from S or H, X$_3$ is A or I, X$_4$ is selected from I or F, X$_5$ is selected from S or N, X$_6$ is selected from G or P, X$_7$ is selected from Y or S, X$_8$ is selected from D or Q, X$_9$ is selected from S or K, X$_{10}$ is selected from V or F, X$_{11}$ is selected from K or Q, X$_{12}$ is selected from W or Y, X$_{13}$ is selected from A or N, X$_{14}$ is selected from D or V, X$_{15}$ is selected from N or S, X$_{16}$ is selected from E or Q, X$_{17}$ is selected from Y or S, X$_{18}$ is selected from Y or T, X$_{19}$ is selected from M or L, and X$_{20}$ is I or absent.

2. An antibody targeting CLL1, comprising a heavy chain variable region and a light chain variable region, wherein the heavy chain variable region comprises HCDR1 shown in SEQ ID NO: 35 or 36, HCDR2 shown in SEQ ID NO: 37, 38 or 39, and HCDR3 shown in SEQ ID NO: 40 or 41, and the light chain variable region comprises LCDR1 shown in SEQ ID NO: 42, 43 or 44, LCDR2 shown in SEQ ID NO: 45, 46, 47 or 48, and LCDR3 shown in SEQ ID NO: 49 or 50.

3. The antibody of claim 1, wherein the X$_3$X$_4$X$_5$X$_6$ of the HCDR2 of the antibody is AISG (SEQ ID NO. 76) or IFNP (SEQ ID NO. 77).

4. An antibody targeting CLL1 having:

HCDR1 shown in SYX$_1$MX$_2$, HCDR2 shown in X$_3$X$_4$X$_5$X$_6$GGGSTX$_7$YAX$_8$X$_9$X$_{10}$X$_{11}$G (SEQ ID NO. 78), HCDR3 shown in SEQ ID NO: 40 or 41, and LCDR1 shown in RASQSISSX$_{12}$LX$_{13}$ (SEQ ID NO. 75), LCDR2 shown in X$_{14}$ASX$_{15}$LX$_{16}$S (SEQ ID NO: 80), LCDR3 shown in QQX$_{17}$YSX$_{18}$PX$_{19}$X$_{20}$T (SEQ ID NO: 81), wherein, X$_1$ is selected from A or Y, X$_2$ is selected from S or H, X$_3$ is A or I, X$_4$ is selected from I or F, X$_5$ is selected from S or N, X$_6$ is selected from G or P, X$_7$ is selected from Y or S, X$_8$ is selected from D or Q, X$_9$ is selected from S or K, X$_{10}$ is selected from V or F, X$_{11}$ is selected from K or Q, X$_{12}$ is selected from W or Y, X$_{13}$ is selected from A or N, X$_{14}$ is selected from D or V, X$_{15}$ is selected from N or S, X$_{16}$ is selected from E or Q, X$_{17}$ is selected from Y or S, X$_{18}$ is selected from Y or T, X$_{19}$ is selected from M or L, and X$_{20}$ is I or absent.

5. The antibody of claim 2, wherein the antibody is selected from any one of the following groups:

(1) an antibody comprising HCDR1 shown in SEQ ID NO: 35, HCDR2 shown in SEQ ID NO: 37, HCDR3 shown in SEQ ID NO: 40, and LCDR1 shown in SEQ ID NO: 42, LCDR2 shown in SEQ ID NO: 45 and LCDR3 shown in SEQ ID NO: 49;

(2) an antibody comprising the HCDR1 shown in SEQ ID NO: 36, HCDR2 shown in SEQ ID NO: 38, HCDR3 shown in SEQ ID NO: 41, and LCDR1 shown in SEQ ID NO: 43, LCDR2 shown in SEQ ID NO: 46, LCDR3 shown in SEQ ID NO: 50;

(3) an antibody comprising HCDR1 shown in SEQ ID NO: 35, HCDR2 shown in SEQ ID NO: 37, HCDR3 shown in SEQ ID NO: 40, and LCDR1 shown in SEQ ID NO: 44, LCDR2 shown in SEQ ID NO: 47, LCDR3 shown in SEQ ID NO: 49;

(4) an antibody comprising the HCDR1 shown in SEQ ID NO: 36, HCDR2 shown in SEQ ID NO: 38, HCDR3 shown in SEQ ID NO: 41, and LCDR1 shown in SEQ ID NO: 43, LCDR2 shown in SEQ ID NO: 48, LCDR3 shown in SEQ ID NO: 50; and (5) an antibody comprising the HCDR1 shown in SEQ ID NO: 36, HCDR2 shown in SEQ ID NO: 39, HCDR3 shown in SEQ ID NO: 41, and LCDR1 shown in SEQ ID NO: 43, LCDR2 shown in SEQ ID NO: 48, LCDR3 shown in SEQ ID NO: 50.

6. The antibody of claim 2, wherein the antibody:
comprises a heavy chain variable region and a light chain variable region, wherein the heavy chain variable region comprises the amino acid sequence shown in SEQ ID NO: 1, the amino acid sequence shown in SEQ ID NO: 5, the amino acid sequence shown in SEQ ID NO: 13, the amino acid sequence shown in SEQ ID NO: 67, the amino acid sequence shown in SEQ ID NO: 68, or the amino acid sequence shown in SEQ ID NO: 69, and the light chain variable region comprises the amino acid sequence shown in SEQ ID NO: 3, the amino acid sequence shown in SEQ ID NO: 7, the amino acid sequence shown in SEQ ID NO: 11, or the amino acid sequence shown in SEQ ID NO: 15.

7. The antibody of claim 6, wherein the antibody is selected from:
(1) an antibody, wherein the heavy chain variable region of the antibody has the amino acid sequence shown in SEQ ID NO: 1 and the light chain variable region of the antibody has the amino acid sequence shown in SEQ ID NO: 3;
(2) an antibody, wherein the heavy chain variable region of the antibody has the amino acid sequence shown in SEQ ID NO: 5 and the light chain variable region of the antibody has the amino acid sequence shown in SEQ ID NO: 7;
(3) an antibody, wherein the heavy chain variable region of the antibody has the amino acid sequence shown in SEQ ID NO: 1 and the light chain variable region of the antibody has the amino acid sequence shown in SEQ ID NO: 11;
(4) an antibody, wherein the heavy chain variable region of the antibody has the amino acid sequence shown in SEQ ID NO: 13 and the light chain variable region of the antibody has the amino acid sequence shown in SEQ ID NO: 15;
(5) an antibody, wherein the heavy chain variable region of the antibody has the amino acid sequence shown in SEQ ID NO: 5 and the light chain variable region of the antibody has the amino acid sequence shown in SEQ ID NO: 15;
(6) an antibody, wherein the heavy chain variable region of the antibody has the amino acid sequence shown in SEQ ID NO: 67 and the light chain variable region of the antibody has the amino acid sequence shown in SEQ ID NO: 15;
(7) an antibody, wherein the heavy chain variable region of the antibody has the amino acid sequence shown in SEQ ID NO: 68 and the light chain variable region of the antibody has the amino acid sequence shown in SEQ ID NO: 15; and
(8) an antibody, wherein the heavy chain variable region of the antibody has the amino acid sequence shown in SEQ ID NO: 69 and the light chain variable region of the antibody has the amino acid sequence shown in SEQ ID NO: 15.

8. The antibody of claim 2, wherein the light chain variable region of the antibody has LCDR1 shown in SEQ ID NO: 43, LCDR2 shown in SEQ ID NO: 48, and LCDR3 shown in SEQ ID NO: 50.

9. The antibody of claim 2, wherein the antibody is a fully human antibody; or selected from the group consisting of a full antibody, scFv, Fab fragment, Fv fragment, and F(ab')$_2$ fragment.

10. A nucleic acid, an expression vector, or a host cell, wherein the nucleic acid encodes the antibody of claim 2;
the expression vector comprises the nucleic acid; and
the host cell comprises the expression vector having the nucleic acid integrated into the genome.

11. A method for treating tumors or for diagnosing tumors in a subject in need thereof, comprising administering a therapeutically effective amount of the antibody of claim 2 to the subject.

12. An immunoconjugate, comprising:
The antibody of claim 2, and a functional molecule connected thereto; and the functional molecule is selected from: a molecule targeting tumor surface markers, a tumor-inhibiting molecule, a molecule targeting immune cell surface markers, and a detectable marker.

13. The immunoconjugate of claim 12, wherein the tumor-inhibiting molecule is an anti-tumor cytokine or an anti-tumor toxin.

14. A chimeric antigen receptor, wherein the chimeric antigen receptor comprises the antibody of claim 2.

15. A genetically modified immune cell, expressing the chimeric antigen receptor of claim 14.

16. A method for treating tumors in a subject in need thereof, comprising administering a therapeutically effective amount of the genetically modified immune cell of claim 15 to the subject.

17. A pharmaceutical composition comprising: the antibody claim 2.

18. The antibody of claim 5, wherein the antibody is a scFv which comprises the amino acid sequence of SEQ ID NO: 27, 29, 31, 33, 70, 71 or 72.

19. The chimeric antigen receptor of claim 14, wherein chimeric antigen receptor comprises the antibody, a transmembrane region and an intracellular signal region connected in the following order:
the antibody, the transmembrane region of CD8, and the primary signal region of CD3ζ;
the antibody, the transmembrane region of CD8, the intracellular signal region of CD137 and the primary signal region of CD3ζ;
the antibody, the transmembrane region of CD28 molecule, the intracellular signal region of CD28 and the primary signal region of CD3ζ; or
the antibody, the transmembrane region of CD28 molecule, the intracellular signal region of CD28, the intracellular signal region of CD137 and the primary signal region of CD3ζ.

20. The chimeric antigen receptor of claim 19, wherein chimeric antigen receptor comprises the amino acid sequence of SEQ ID NO: 9, 10, 55, 56, 57, 58, 59, 60, 61, 62, 63, 64, 65, 66 or 73.

* * * * *